(12) United States Patent  
Nelson

(10) Patent No.: US 12,106,180 B2  
(45) Date of Patent: Oct. 1, 2024

(54) MACHINE LEARNING AND COMPUTER-BASED GENERATION OF STANDARD WORK MATRICES FOR IMPROVING EXECUTION OF A STANDARD WORK

(71) Applicant: oneFiveFIFTY LLC, Taylors, SC (US)

(72) Inventor: Michael T. Nelson, Taylors, SC (US)

( * ) Notice: Subject to any disclaimer, the term of this patent is extended or adjusted under 35 U.S.C. 154(b) by 466 days.

(21) Appl. No.: 17/194,168

(22) Filed: Mar. 5, 2021

(65) Prior Publication Data

US 2021/0279629 A1  Sep. 9, 2021

Related U.S. Application Data

(60) Provisional application No. 62/985,703, filed on Mar. 5, 2020.

(51) Int. Cl.
| | | |
|---|---|---|
| *G06N 10/00* | (2022.01) | |
| *G06F 9/54* | (2006.01) | |
| *G06F 11/34* | (2006.01) | |
| *G06N 3/02* | (2006.01) | |

(52) U.S. Cl.
CPC ............. *G06N 10/00* (2019.01); *G06F 9/547* (2013.01); *G06F 11/3428* (2013.01); *G06N 3/02* (2013.01)

(58) Field of Classification Search
CPC . G06N 10/00; G06N 3/02; G06N 3/08; G06F 9/547; G06F 11/3428; G06Q 10/103
See application file for complete search history.

(56) References Cited

U.S. PATENT DOCUMENTS

| | | | |
|---|---|---|---|
| 10,268,978 B2 * | 4/2019 | Gajdzinski | ....... G06Q 10/06375 |
| 2012/0053978 A1 * | 3/2012 | Andersen | ............... G06Q 10/06 |
| | | | 705/7.14 |
| 2016/0189078 A1 * | 6/2016 | Gajdzinski | ....... G06Q 10/06375 |
| | | | 705/7.37 |
| 2021/0279629 A1 * | 9/2021 | Nelson | ................ G06F 11/3428 |

\* cited by examiner

*Primary Examiner* — Stacy Whitmore
(74) *Attorney, Agent, or Firm* — Terrence J. Edwards; TechLaw Ventures, PLLC

(57) ABSTRACT

Methods and computer program products for organization and improvement of systems, processes, and operations for performing work. A system includes a database for storing metric data, a quantum computer in communication with the database, and a server in communication with the database and the quantum computer. Instructions implemented by the server include providing the metric data associated with the plurality of projects to the quantum computer for the quantum computer to quantify metrics for each of the plurality of projects and receiving quality improvement analysis from the quantum computer for the plurality of projects. The instructions include identifying five or fewer projects of the plurality of projects based on which of the plurality of projects fails a quality threshold for the metric data by a greatest margin.

20 Claims, 46 Drawing Sheets

| Standard Work Matrix 300 | Commit 312 | Hyper-Focus 314 | Act 316 | New Skills 318 | Get Results 320 | Establish New Normal 322 |
|---|---|---|---|---|---|---|
| Define 302 | One Project 402 | | | | | |
| Execute 304 | Feedback For One Project 404 | | | | | |
| Learn 306 | Five Projects 406 | | | | | |
| Train 308 | Feedback For Five Projects 408 | | | | | |
| Advance 310 | Feedback For Fifty Projects 410 | | | | | |

FIG. 3D

Standard Work Matrix 300

| | Commit 312 | Hyper-Focus 314 | Act 316 | New Skills 318 | Get Results 320 | Establish New Normal 322 |
|---|---|---|---|---|---|---|
| Define 302 | One Project 402 | | | | | |
| Execute 304 | Feedback For One Project 404 | | | | | |
| Learn 306 | Five Projects 406 | | | | | |
| Train 308 | Feedback For Five Projects 408 | | | | | |
| Advance 310 | Feedback For Fifty Projects 410 | | | | | |

FIG. 3E

| Standard Work Matrix 300 | Commit 312 | Hyper-Focus 314 | Act 316 | New Skills 318 | Get Results 320 | Establish New Normal 322 |
|---|---|---|---|---|---|---|
| Define 302 | One Project 402 | | | | | |
| Execute 304 | Feedback For One Project 404 | | | | | |
| Learn 306 | Five Projects 406 | | | | | |
| Train 308 | Feedback For Five Projects 408 | | | | | |
| Advance 310 | Feedback For Fifty Projects 410 | | | | | |

FIG. 3F

| Standard Work Matrix 300 | Commit 312 | Hyper-Focus 314 | Act 316 | New Skills 318 | Get Results 320 | Establish New Normal 322 |
|---|---|---|---|---|---|---|
| Define 302 | One Project 402 | | | | | |
| Execute 304 | Feedback For One Project 404 | | | | | |
| Learn 306 | Five Projects 406 | | | | | |
| Train 308 | Feedback For Five Projects 408 | | | | | |
| Advance 310 | Feedback For Fifty Projects 410 | | | | | |

Defining A Standard Work To Be Implemented By An Organization, Wherein The Standard Work Comprises One Or More Of A System, A Process, A Procedure, Or A Task.
502

Receiving Feedback Data Comprising Information On Execution Of The System, The Process, The Procedure, And/Or The Task.
504

Determining Whether The Execution Of The System, The Process, The Procedure, And/Or The Task Meets A Threshold Based On The Feedback Data.
506

Advancing The Standard Work To Comprise A New Task In Response To The Execution Of The System, The Process, The Procedure, And/Or The Task Meeting The Threshold.
508

FIG. 5

| FACTUAL™ Step | Exit Criteria | Sponsor Questions |
|---|---|---|
| Focus | Extreme Parts Defined | What Is The Business Impact? |
| Approach | Pass Isoplot®, Largest Contrast Defined Using Strategy Diagram | What Is Your Discrimination Ratio? Are You Dedicated Full Time? |
| Converge | Suspect's Guilt Supported By Rationale | What Is The Largest Contrast? |
| Test | Experiment Passes At Chosen Confidence | Did An Experiment Confirm The Red X® At The Chosen Confidence Level? |
| Understand | Parallelogram Is Additional Confirmation, Red X® Tolerance Established | Can You Control The Red X® To This Tolerance? Is Pink X™ FACTUAL™ Needed? |
| Apply | The REDX® Is Controlled, Otherwise Start KCC FACTUAL™ Investigation | Can You Put In An Irreversible Action? |
| Leverage | 3 Legged – 5 Why Ends With Better Detection, Systemic Problems Are Fixed | Does The Green Y® Run Chart Confirm Effectiveness? |

FIG. 12

Driving CHANGE Self-Evaluation Matrix

← Worst ——————————————————————— Best →

| | | | | | | |
|---|---|---|---|---|---|---|
| C | Commit (1) | Define SW "one" (2) | Execute SW "one" (3) | Learn SW "Five" (4) | Train SW "Five" (5) | Advance SW "FIFTY" (6) |
| H | Hyper-Focus (1) | ALIGN (2) | FACTUAL™ (3) | DRIVE (4) | AA²SS² (5) | CHANGE (6) |
| A | Act (1) | Don't Care About SW (2) | Watch Others Do SW (3) | Approve The Use Of SW (4) | Engage In The Use Of SW (5) | Champion The Use Of SW (6) |
| N | New Skills (1) | Unaware (2) | Knowledgeable (3) | Coaching Experience (4) | Understand (5) | Master (6) |
| G | Goals Set (1) | One Project (2) | One In Each Strategic Area (3) | Rolling Top 5® Projects (4) | Rolling Top 5® Projects In Areas (5) | More Initiatives Individual Aggregate (6) |
| E | Establish New Normal (1) | One Team (2) | One Team (3) | Rolling Top 5® Projects (4) | Rolling Top 5® Teams (5) | More Initiatives (6) |

FIG. 13

| System Input | System Black Box | System Output |
|---|---|---|

| Input | Process | Output |
|---|---|---|
| Process Input 1 | Process 1 | Process Output 1 |
| Process Input 2 (Process Output 1) | Process 2 | Process Output 2 |
| Process Input 3 (Process Output 2) | Process 3 | Process Output 3 |
| Process Input 4 (Process Output 3) | Process 4 | Process Output 4 |
| Process Input 5 (Process Output 4) | Process 5 | Process Output 5 |
| Process Input 6 (Process Output 5) | Process 6 | Process Output 6 |

FIG. 15A

| Process Input | Process Black Box | Process Output |
|---|---|---|

| Input | Process | Output |
|---|---|---|
| Step 1 Input | Step 1 | Step 1 Output |
| Step 2 Input (Step 1 Output) | Step 2 | Step 2 Output |
| Step 3 Input (Step 2 Output) | Step 3 | Step 3 Output |
| Step 4 Input (Step 3 Output) | Step 4 | Step 4 Output |
| Step 5 Input (Step 4 Output) | Step 5 | Step 5 Output |
| Step 6 Input (Step 5 Output) | Step 6 | Step 6 Output |

FIG. 15B

| System Input Quality Problems | Quality Improvement System | System Output Quality Improvements |
|---|---|---|
| INPUT | PROCESSES | OUTPUT |
| Aim | ALIGN | Projects |
| Projects | FACTUAL™/DMAIC Processes | Improvements |
| Improvements | DRIVE | Explain Improvements |
| Explain Improvements | AA²SS² | Exploit Improvements |
| Exploit Improvements | Take Action To Compound RCCARA Discoveries | OneFiveFIFTY™ Process |
| Deployment Strategy For One Or More Projects | OnfiveFIFTY™ Process | Results From One Or More Projects |

FIG. 16B

| | | |
|---|---|---|
| | RECOVER | |
| Input | Process | Output |
| Denial | Receive Help And Acknowledge A Problem | Treatment |
| Take Medication | End Non Compliance | End A Bipolar Extreme |
| Start To Function | Care For Individuals | Stop Thinking Of 'Me' |
| Venture Out | Outline A Schedule | See Improvement |
| Look For Things To Do | Volunteer | Meet Group Needs And Interact |
| Search For Purpose | Establish Purpose | Purpose Leads To Action |
| Desire To Race Again | Return To Known Skill | Master And Share Skill |

FIG. 17

Select Process
1810

| System Input | System Black Box | System Output |
|---|---|---|

| Input | Process | Output |
|---|---|---|
| Aim Input | Aim | Aim Output |
| Link Input (Aim Output) | Link | Link Output |
| Intent Input (Link Output) | Intent | Intent Output |
| Goals Input (Intent Output) | Goals | Goals Output |
| New Projects Input (Goals Output) | New Projects | New Projects Output |

FIG. 18A

Improve Process
1820

| System Input | System Black Box | System Output |
|---|---|---|

| Input | Process | Output |
|---|---|---|
| Focus Input | Focus | Focus Output |
| Approach Input (Focus Output) | Approach | Approach Output |
| Converge Input (Approach Output) | Converge | Converge Output |
| Test Input (Converge Output) | Test | Test Output |
| Understand Input (Test Output) | Understand | Understand Output |
| Apply Input (Understand Output) | Apply | Apply Output |
| Leverage Input (Apply Output) | Leverage | Leverage Output |

FIG. 18B

Explain Process
1830

| Input | Process | Output |
|---|---|---|
| System Input | System Black Box | System Output |

| Input | Process | Output |
|---|---|---|
| Define Input | Define | Define Output |
| Reason Input (Define Output) | Reason | Reason Output |
| Implement Input (Reason Output) | Implement | Implement Output |
| Verify Input (Implement Output) | Verify | Verify Output |
| Explain Input (Verify Output) | Explain | Explain Output |

FIG. 18C

Exploit Process
1840

| System Input | System Black Box | System Output |
|---|---|---|

| Input | Process | Output |
|---|---|---|
| Focus Input | Focus | Focus Output |
| $Aa^2ss^2$ Input | $Aa^2ss^2$ | $Aa^2ss^2$ output |
| $aA^2ss^2$ Input ($Aa^2ss^2$ Output) | $aA^2ss^2$ | $aA^2ss^2$ Output |
| $aa^2Ss^2$ Input ($aA^2ss^2$ Output) | $aa^2Ss^2$ | $aa^2Ss^2$ Output |
| $aa^2sS^2$ Input ($aa^2Ss^2$ Output) | $aa^2sS^2$ | $aa^2sS^2$ Output |

FIG. 18D

| Acronym | Meaning | Steps |
|---|---|---|
| FACTUAL™ | Based On Facts | Focus, Approach, Converge, Test, Understand, Apply, Leverage |
| DELTA | Make A Difference | Define, Execute, Learn, Train, Advance |
| ALIGN (Rolling Top 5®) | Align Projects To The Aim | Aim, Link Metrics To Aim, Intent Communicated, Goals Set, Need Projects |
| CHANGE | Drive Change | Commit, Hyper-Focus, Act, New Skills, Get Results, Establish New Normal |
| DRIVE | Drive Read Across | Define The Problem, Reason Determined |
| AA²SS² | Deploying Read Across, Compounding | Address Read Across In The Area The Investigation Was Conducted, Address Read Across In All Areas, Address Read Across Of Systemic Issues In Area The Problem Was Worked, Address Read Across Of System Issues In All Areas. |
| PUSH Cycles | Push To Perform | Perform, Understand, Share, Hope |
| oneFiveFIFTY™ | Scaled Deployment | One Project, Five Projects, Fifty Projects |
| RECOVER | Managing Mental Illness | Receive Help, Exhibit Compliance, Care For Others, Outline Scheduling Plan, Volunteer, Establish Purpose, Return To What You Know |
| GIFTED | Dyslexic Gifts | Gifts Defined, Ingenuity To Overcome, Focus On Mastering Gifts, Teaching Everyone The Gifts, Establish New Normal, Disruptive Technology |
| PLEASE | Training Material For Small Group | Pray, Love, Equip, Accept, Salvation, Eternal |

FIG. 19

| Rolling Top 5® | Project Name |
|---|---|
| 1 | Project 1 Area B |
| 2 | Project 1 Area A |
| 3 | Project 1 Area D |
| 4 | Project 2 Area A |
| 5 | Project 2 Area D |

FIG. 34

| Read Across – Wide Spread | Magnification Enabled By Standard Work |
|---|---|
| AREA 1<br><br>$A^2SS^2$<br>Applications In An Area | A1 To An →|
| ALL AREAS 1 To n<br><br>$A^2SS^2$ – Applications Across Areas | $A^2$1 To $A^2$n →|
| SYSTEMIC AREA 1<br><br>$A^2SS^2$ – Systemic In An Area | S1 To Sn →|
| SYSTEMIC AREA 1 To n<br><br>$AA^2SS^2$ – Systemic In All Areas | $S^2$1 To $S^2$n →|

Each Rolling Top 5® Project Goes Through the Following Process (Read From Left to Right and Top to Bottom)

| DESCRIBE<br>Best Of Best<br>And<br>Worst Of Worst | REASON<br>5 Why? |
|---|---|
| IMPLEMENT<br>5 How? | VERIFY<br>Run Chart<br>Showing<br>Progress |

EXPLAIN
Entire Rolling Top 5 Investigation

FIG. 37

MACHINE LEARNING AND COMPUTER-BASED GENERATION OF STANDARD WORK MATRICES FOR IMPROVING EXECUTION OF A STANDARD WORK

CROSS-REFERENCE TO RELATED APPLICATIONS

This application claims the benefit of U.S. Provisional Patent Application No. 62/985,703 filed Mar. 5, 2020, titled "METHOD FOR ORGANIZATION AND IMPROVEMENT OF SYSTEMS, PROCESSES, AND OPERATIONS FOR PERFORMING WORK," which is incorporated herein by reference in its entirety, including but not limited to those portions that specifically appear hereinafter, the incorporation by reference being made with the following exception: In the event that any portion of the above-referenced provisional application is inconsistent with this application, this application supersedes the above-referenced provisional application.

TECHNICAL FIELD

This disclosure is directed to computer-implemented products and is particularly directed to improving processes and system-wide execution of a standard work.

BACKGROUND

There is a constant need to improve the processes, tools, and systems implemented by people and entities. Organizations across all fields can benefits from improving the efficiency and effectiveness of how work is completed. Sales teams can benefit from generating efficient and system-wide practices that can be implemented by numerous agents. Business organizations as a whole can benefit from processes, tools, and systems for running the organization, divvying out tasks, measuring feedback on those tasks, and so forth. However, it is exceptionally challenging and expensive to generate these improved processes. Therefore, there is a need for computer-based products for generating standard work matrices for improving processes, systems, and tools implemented by an organization and/or an individual.

In light of the foregoing, disclosed herein are systems, methods, and devices for machine learning, quantum processing, and other computer-based products for generating standard work matrices for improving execution of a standard work.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where:

FIGS. 3B-3G illustrate progression step-by-step through the DELTA-CHANGE standard work matrix;

FIG. 5 is a schematic flow chart diagram of a method for implementing and improving upon a standard work;

FIG. 12 is a schematic diagram illustrating the steps, exit criteria, and sponsor questions for implementing the FACTUAL™ process;

FIG. 13 is a schematic block diagram of the CHANGE self-evaluation matrix;

FIG. 15A is a schematic block diagram illustrating the system input, process, and system output for a feedback loop when implementing and improving a standard work;

FIG. 15B is a schematic block diagram illustrating the system input, process step, and system output for a feedback loop when implementing and improving a standard work;

FIG. 16B is a table illustrating the system inputs, quality improvement systems, and system outputs of a quality improvement system;

FIG. 17 is a schematic block diagram of an input, process, and output chart for implementing the RECOVER process for improving mental illness;

FIG. 18A is a schematic block diagram illustrating inputs, processes, and outputs for the select process;

FIG. 18B is a schematic block diagram illustrating inputs, processes, and outputs for the improve process;

FIG. 18C is a schematic block diagram illustrating inputs, processes, and outputs for the explain process;

FIG. 18D is a schematic block diagram illustrating inputs, processes, and outputs for the exploit process;

FIG. 19 is a chart illustrating the acronyms and processes for implementing and improving a standard work, including the FACTUAL™ process, DELTA ALIGN (Rolling Top 5®) projects), CHANGE, DRIVE, $AA^2SS^2$, PUSH Cycles, the oneFiveFIFTY™ process flow, RECOVER, GIFTED, and PLEASE processes;

FIG. 34 is a table illustrating the problem ranks and project names of the projects included in the Rolling Top 5® projects;

FIG. 37 is a schematic block diagram of a process for implementing the FACTUAL™ and DRIVE processes.

DETAILED DESCRIPTION

Figure 1A:
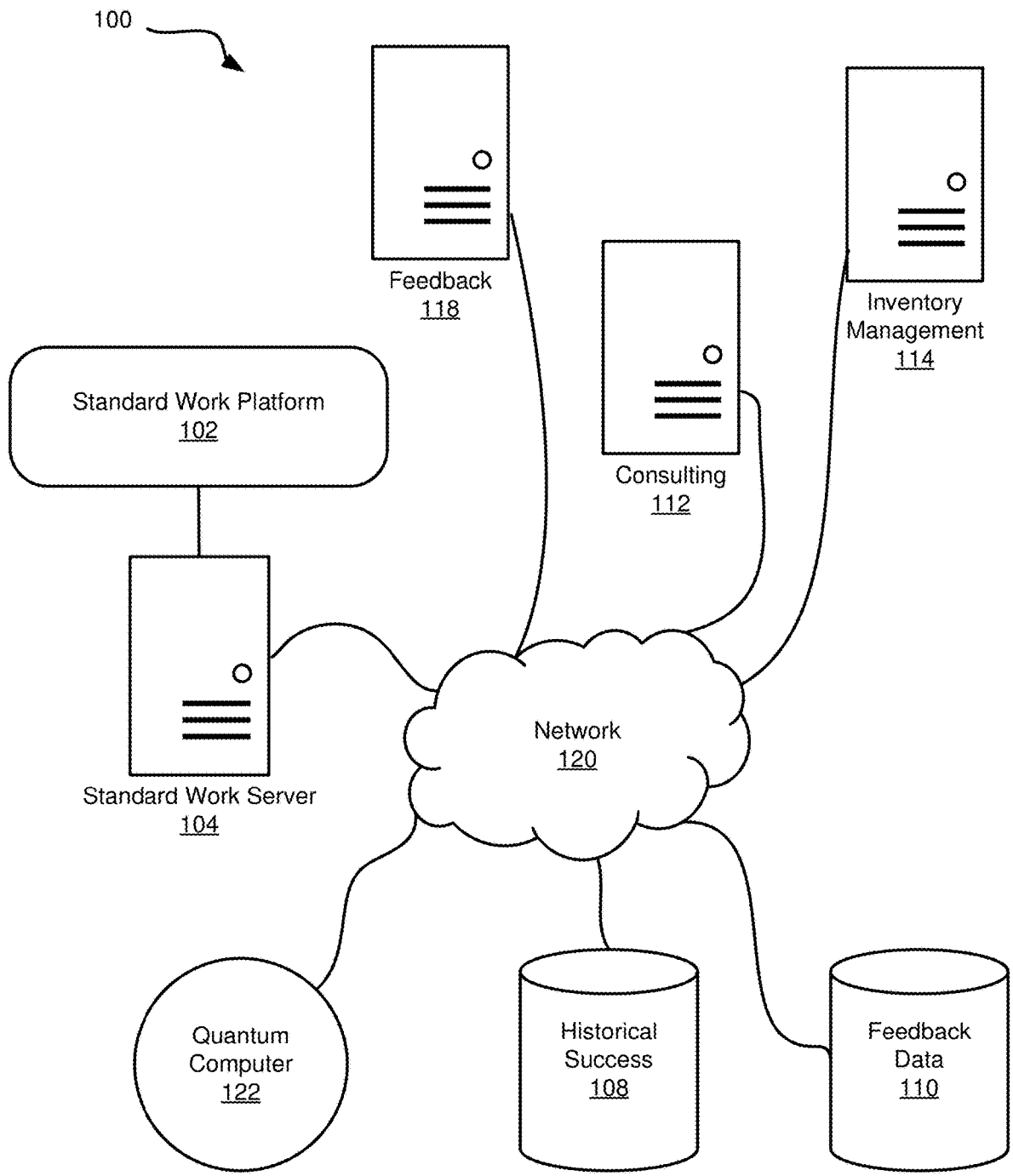
FIG. 1A is a schematic diagram of a system for computer-implemented processes and analyses for defining and improving upon a standard work.

Disclosed herein are systems, methods, and devices for process improvement and optimization. Embodiments of the disclosure can be leveraged to improve the execution of a standard work. Many organizations, including operations and manufacturers, use standard work for improving execution of processes, tasks, and projects. A standard work includes the best practices for performing a process, implementing a tool, implementing a system, and so forth. The standard work can be continually improved upon to reflect the current and most up-to-date best practices. Standard work may additionally serve as a framework for recording and assessing small changes that have been made to a process, tool, or system. The standardization of the standard work allows for the distribution of knowledge and progression across a workforce, and therefore enables all persons to enter a mindset of continuous improvement and optimization. The systems, methods, and devices disclosed herein can be leveraged to generate standard work matrices based on a standard work and further to assess feedback for processes implemented in furtherance of the standard work.

In many settings, including large-scale and complex manufacturing settings, the task of improving efficiency, reducing waste, and improving processes is initially a data-management issue. Manufacturing facilities and other building projects, such as those for building computers, automobiles, aircraft, properties, and so forth, generate enormous sums of data relating to the successful manufacturing of individual parts, the amount of scrap generated during production, and failure points in the final product. This data cannot reasonably be analyzed by human beings or conventional computer systems. Large-scale manufacturing facilities output an enormous quantity of data that cannot be effectively assessed by traditional means of data analysis. In light of the foregoing, disclosed herein are sophisticated algorithms to be deployed on quantum computers for large-scale data analysis. The results of the data analysis described herein provide insight into the projects that should be improved to acquire the greatest benefit by the most efficient means.

Further, in large-scale manufacturing settings, it is challenging to implement process improvements in an efficient way to increase the accuracy of production, reduce waste during production, and increase cost-based and workforce-based efficiencies. Described herein are means for identifying the projects and areas that are most in need of process improvement, and for implementing process improvements to successfully reduce waste and improve the accuracy of manufacturing production. The processes described herein are computer-generated based on historical data indicating the most effective means for improving certain manufacturing processes and further based real-time data indicating the effectiveness of the implemented processes.

The systems, methods, and devices described herein include quantum computing and quantum processors. The process improvement systems leverage quantum processors to analyze enormous sums of data, including big data, and identify areas for improvement. The process improvement systems described herein are implemented on big data and include extensive analysis of and information extraction from very large sums of data that are too large or complex to be dealt with by traditional data processing application software. The data may include manufacturing metrics, fault codes, historical data, user feedback data, quality control metrics, and so forth. The data may include numerous fields to offer greater statistical power while introducing increased complexity. The big data analysis described herein includes capturing the data, storing the data, analyzing the data with quantum processors, searching the data, transferring the data to other processing resources, and generating tables or other visualization tools for assessing the data.

The data analysis described herein is executed with quantum computers. The quantum computers described herein leverage quantum mechanical phenomena to manipulate information. The quantum computers rely on quantum bits, which may alternatively be referred to as "qubits." The quantum computers leverage quantum properties to compute and find the most desirable solution among many possible solutions. The algorithms deployed by the quantum computer may be based on the quantum circuit model and can offer more than a polynomial speedup over classical computers.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, an "organization" may include a single person, a group of persons, a business, a department, a charitable organization, a non-profit organization, a think tank, a manufacturing entity, or any other entity. Additionally, as used herein, the term organization may include a single machine or computing resource, a grouping of machines or computing resources, or a combination of persons and machines or computing resources. The term organization as used herein is non-limiting and may refer to any person, machine, or other entity.

In an embodiment, a standard work server defines or generates a standard work. The standard work may include a process, tool, or system, or some other means for driving improvement by an organization. A standard work, i.e., a standardized process, tool, or system, can be created for any industry. The standard work can be referenced for setting a baseline for improvement and quality. For example, repetitive tasks such as assembly and manufacturing can benefit from standardization, and additionally the individual tasks going into assembly and manufacturing can themselves also be standardized with a "standard work." Implementation of a standard work can realize numerous benefits for an organization. For example, implementing a standard work makes waste more visible and illustrates process inefficiencies and allows wasteful activities to surface. Additionally, the standard work can be used to train employees more effectively and assist new employees in understanding processes, tools, and systems more quickly. Additionally, the standard work can be used to reduce defects and process variation such that individuals within the organization have a clear understanding of where their actions deviate from the accepted practice. Additionally, the standard work can be used to increase agility and scale quickly such that an organization can rely on documented standards to scale procedures and train others quickly. Additionally, the standard work can be used to streamline problem solving and give individuals within an organization an equal understanding of the current state of the art and how changes will impact process workflow. Additionally, the standard work can be used to promote innovation by contextualizing process improvement ideas by creating a baseline for how feedback is given, assessed, and implemented. Additionally, the standard work can be used to reduce waste and prevent rework by implementing standards to provide an accurate account of the materials quality levels needed to maintain proper workflows. Additionally, the standard work can be used to lower operational costs where process bottlenecks exist and clearly define the minimum work in progress to maintain efficient flow.

In some instances, the standard work can revolutionize the work process for persons with dyslexia. The standard work can be leveraged as a planning tool that can be particularly useful for increasing the efficiency and effectiveness of persons with dyslexia. The standard work can revolutionize how persons are heard, measured, educated, valuated, and leveraged in the workplace. The standard work can specifically be used to assist persons with dyslexia in overcoming struggles with inconsistency. This can be performed by generating detailed actions plans in furtherance of a standard work that use detailed means for harnessing and assessing feedback to revise and optimize the standard work matrix and the standard work itself.

Referring now to the figures, FIG. 1A is a schematic diagram of a system 100 for process improvement and task generation. The system includes a standard work platform 102 that is operated and processed by a standard work server 104. The standard work server 104 is in communication with a network 120, such as the Internet or other cloud computing network. The standard work server 104 receives and/or retrieves information from a historical success 108 datastore and a feedback data 110 datastore. The standard work server 104 communicates with one or more internal or external parties by way of the network 120 connection. In an embodiment, the standard work server 104 communicates with a feedback 118 system, a consulting 112 platform, and/or an inventory management 114 platform. The standard work server 104 communicates with a quantum computer 122 and receives data analysis from the quantum computer 122.

The standard work platform 102 provides a user interface that may be accessed by a user, administrator, or other individual or computer-implemented product. The standard work platform 102 provides informational updates on standard works, standard work matrices, feedback data, and other information applicable to improving and standardizing process flows to be implemented by an organization. The standard work platform 102 is operated by the standard work server 104. The standard work server 104 may include memory and one or more processors for executing instructions.

The historical success 108 datastore may include information on standard works, standard work matrices, philosophies, and other discoveries that are useful in generating new standard work matrices and standard works. The historical success 108 datastore may include information on "industry giants" or individuals that are considered to have made significant discoveries or improvements within an industry. The historical success 108 information within the datastore may be linked to certain industries or area of work that are applicable to those improvements and discoveries.

The feedback data 110 includes feedback information from an organization implementing a standard work. The feedback data 110 may include sensor data, manufacturing data, sales data, fault codes or other fault data, reported data, survey data, consumer report data, internal report data, external report data, consulting data, and so forth. The feedback data 110 may be assessed by the standard work server 104 to determine whether adjustments should be made to a standard work and/or standard work matrix. The feedback data 110 constitutes an enormous sum of data that can only be efficiently analyzed by the quantum computer 122. The feedback data 110 is provided to the quantum computer 122 for analysis. The quantum computer 122 assesses the feedback data 110 to identify different data entries that refer to the same problem or fault (e.g., different fault codes with different wording or descriptions). The quantum computer 122 analyzes the vast sums of feedback data 110 to generate reports indicating one or more problems causing the greatest issue or bottleneck for an organization.

The feedback 118 platform may include an internal or external server for managing feedback collection. In an example the feedback 118 platform includes a server for automatically requesting and receiving feedback surveys, reports, and log histories. In an example, the feedback 118 platform includes one or processors for receiving, categorizing, and storing feedback information including sensor data, consumer report data, survey data, review data, and so forth.

The consulting 112 platform may include an internal or external server for providing consulting information on improving a standard work and/or standard work matrix. The consulting information may be manually input by a user or other party familiar with the standard work and/or standard work matrix.

The inventory management 114 platform may include an internal or external server for managing process flow and success of manufacturing tasks and/or service tasks. For example, the inventory management 114 platform may track information on manufacturing process and the success of tasks implemented in furtherance of manufacturing products or providing services. The standard work server 104 may communicate with the inventory management 114 platform to determine whether the standard work and/or standard work matrix is successful in improving manufacturing processes.

The standard work server 104 includes a neural network and is configured to execute a machine learning algorithm, and/or is in communication with a neural network or some other computing resource configured to execute machine learning. The machine learning algorithm constitutes artificial intelligence. The neural network is trained on a dataset comprising information about standard works, standard work matrices, processes, tasks, and projects that have been implemented in the past, along with the feedback data for those standard works, standard work matrices, processes, tasks, and projects. The training dataset for the neural network additionally includes information about numerous factors pertaining to the success of the standard works and associated projects and/or tasks. Such factors may include information about the industry in which the standard work was implemented, the number of individuals executing the standard work, the expertise of the individuals executing the standard work, the type of organization executing the standard work, and detailed feedback information about the success of the standard work. The neural network may be trained to receive information about a certain organization, a goal to be achieved by the organization, an issue present in the organization, and/or a standard work to be implemented by the organization. The neural network may then automatically generate a detailed standard work matrix comprising one or more tasks to be executed in furtherance of executing a standard work. The neural network may generate this detailed standard work matrix based at least in part by analyzing the successes of past standard works and projects.

The standard work server 104 communicates with the quantum computer 122. The quantum computer leverages quantum phenomena such as superposition and entanglement to perform computation. The quantum computer 122 includes one or more of a quantum circuit model, a quantum Turing machine, an adiabatic quantum computer, a one-way quantum computer, and quantum cellular automata. The quantum computer 122 analyzes the feedback data 110 and identifies one or more problems or areas within an organization that cause the greatest setbacks or bottlenecks. The quantum computer 122 may be specifically leveraged to analyze fault codes and other manufacturing data within a manufacturing plant. The quantum computer 122 analyzes the enormous sum of feedback data 110, including historical feedback data, to identify the greatest pain points that should be improved up by way of the standard work matrix. The standard work server 104 communicates with the quantum computer 122, receives a report from the quantum computer 122, and selects one or more issues to be addressed by the standard work. The standard work server 104 defines the standard work based on the data analysis performed by the quantum computer 122. The standard work server 104 selects one more standard works based on the greatest pain points or bottlenecks identified by the analysis performed by the quantum computer 122.

The standard work server 104 generates a standard work matrix for executing a primary task. This standard work matrix may be determined by executing a "DELTA" process, wherein DELTA is an acronym for: (a) Defining the standard work; (b) Executing the standard work; (c) Learning the standard work; (d) Training the standard work; and (e) Advancing using the standard work. The DELTA process represents making a difference and improving the standard work.

The standard work server 104 generates a standard work matrix for executing the primary task. The standard work matrix may be determined by executing a "CHANGE" process, wherein CHANGE is an acronym for: (a) Commit; (b) Hyper-focus; (c) Act; (d) New skills; (e) Get results; and (f) Establish a new normal. The DELTA process and the CHANGE process may represent a synergistic relationship. The steps in the DELTA process may define rows in a standard work matrix while the steps in the CHANGE process define the columns of the standard work matrix. The CHANGE process represents driving change by executing the standard work.

In an embodiment, the standard work server 104 generates the standard work matrix 300 to include processes for implementing the Root Cause and Corrective Action (RCCA) process. When a root cause for a problem is identified in an area, the standard work matrix 300 may include a process for identifying a corrective action for overcoming the root cause. In an embodiment, the standard work server 104 monitors process of execution of the standard work matrix 300, and the standard work server 104 automatically identifies a root cause based on feedback data. Additionally, the standard work server 104 may generate a corrective action for overcoming the root cause. In an embodiment, the standard work server 104 communicates with a neural network and receives from the neural network an indication of a corrective action for overcoming the root cause. In such an embodiment, the neural network may be trained on a dataset comprising feedback data for numerous industries, common issues identified based on the feedback data, and identified root causes for the identified issues. The neural network may additionally be trained to generate a corrective action for overcoming the root cause based on, for example, the number of persons executing the standard work matrix 300, the severity of the issues related to the root cause, the industry associated with the root cause, the duration the issues associated with the root cause have been occurring, and so forth. Further, the standard work server 104 may generate the standard work matrix 300 to include steps for reading across the corrective action. Effective read across can be leveraged to fix systemic issues in an area of an organization and within other areas of the organization. In an embodiment, the standard work matrix 300 includes tasks for implementing the corrective action across multiple departments or areas of an organization or other entity.

In an embodiment, the standard work server 104 deploys Six Sigma problem solving methodology. In such an embodiment, the standard work server 104 deploys the Define, Measure, Analyze, Improve, and Control (DMAIC) methodology. The standard work server 104 may deploy the DMAIC methodology to develop acronyms for specific service offerings. Additionally, the standard work server 104 may deploy the DMAIC methodology to generate training curriculum and methodologies for different areas or departments within an organization. For example, the standard work server 104 may generate different training curriculums for the human resources department of an organization versus the marketing, sales, or research and development departments of the organization.

Different acronyms may be deployed in different embodiments of the disclosure. One acronym disclosed herein is the DELTA process, which stands for Define, Execute, Learn, Train, and Advance. Another acronym disclosed herein is the ALIGN plan, which stands for Aim, Link metrics to aim, Intent communicated, Goals set, Need projects. Another acronym disclosed herein is the FACTUAL™ plan, which stands for Focus, Approach, Converge, Test, Understand, Apply, and Leverage. (FACTUAL™ is a trademark owned by Shainin II LLC in Northville, Mich.) Another acronym disclosed herein is the DRIVE plan, which stands for Define the problem, Reason determined. Another acronym disclosed herein is the $AA^2SS^2$ plan, which stands for Address read across in the area the investigation was conducted, Address read across in all areas, Address read across of the Systemic issues in the area the problem was worked, and Address read across of the Systemic issues in all areas. Another acronym disclosed herein is the CHANGE standard work plan, which stands for Commit, Hyper-focus, Act, New skills, Get results, and Establish a new normal. Another acronym disclosed herein is the PUSH cycle, which stands for Perform, Understand, Share, and Hope. Another acronym disclosed herein is the DMAIC plan, which stands for Define, Measure, Analyze, Improve, and Control.

In an embodiment, the DRIVE plan is implemented in a matrix with another plan, such as the DELTA process, the CHANGE process, the $AA^2SS^2$ plan, and so forth. The DRIVE plan is unique and implements a unique combination of tools. The DRIVE plan includes describing extreme parts and a run chart for measuring the success of an implementation. The DRIVE plan includes reasoning, and specifically determining a "why" for the tasks implemented in improving the standard work. The DRIVE plan includes implementing a fix, and this may include determining a "how" for improving the standard work. The DRIVE plan may include verifying a fix by executing the run chart and other feedback loops to determine if improving the standard work has been successful. The DRIVE plan may include explaining findings.

The quantum computer 122 performs data analysis on the feedback data 110. The feedback data 110 is stored across one or more database instances that are in communication with the network 120. The feedback data is provided to the quantum computer 122 for analysis. The feedback data may include an enormous sum of data and may include current data and historical data. The quantum computer 122 analyzes the current data in light of the historical data to provide suggestions on which problem areas should be addressed.

In an example implementation, the feedback data 110 includes defect information for parts prepared in a manufacturing setting. The defect information may be manually input by person working in the manufacturing setting. The defect information include computer-generated defect data. The defect information may include defect metrics output by a machine learning algorithm in response to images captured by a camera sensor. The machine learning algorithm is trained on a dataset comprising a large number of a certain part or process and image-based examples of when the certain part or process is done incorrectly or correctly. The dataset additionally includes an information what specific errors can occur, and how to classify those errors. The standard work server 104 retrieves image sensor data from the feedback data 110 datastore and provides the image sensor data to a neural network. The neural network may be run on the quantum computer 122 or on classical computer processing. The neural network consumes the image sensor data and identifies one or more objects within the image by assigning bounding boxes to the one or more objects. The neural network analyzes the image sensor data within the one or more bounding boxes to determine the identity of the object(s) within the bounding boxes. The neural network analyzes the object image data to determine (a) whether the object has a defect; and (b) in response to determining the object has a defect, identifying and classifying the defect. The neural network outputs an indication of whether the object captured by the image sensor has a defect, and what type of defect. The neural network performs this analysis on a plurality of images and outputs defect feedback data 110 to the feedback data 110 database. The quantum computer 122 analyzes the feedback data 110 to identify the major pain points and problems that need to be addressed at the manufacturing setting.

The quantum computer 122 is capable of accessing and analyzing an enormous sum of data stored on the feedback data 110 database. Inspectors may access the feedback data 110. The quantum computer 122 implements a machine learning algorithm to identify the major pain points and problems that should be addressed at the manufacturing setting. The quantum computer 122 implements a machine learning algorithm that searches for associated words that should be grouped together for classifying defects. In an example implementation, feedback data 110 is manually input by users, and the user apply different words for describing defects. The machine learning algorithm executed by the quantum computer 122 identifies synonyms for the words used to describe the defects, and the quantum computer 122 classifies similar defect feedback as applying to the same possible defect. The quantum computer 122 may classify the feedback data and cause the feedback data to be re-organized or re-classified on the feedback data 110 database. In an example embodiment, feedback data is classified by the quantum computer 122, and this classification is stored as a new column on the feedback data 110 database. The defect code within the new column can be queried to identify all parts associated with that defect code.

The quantum computer 122 executes complex data analysis algorithms according to Pareto principles. Vilfredo Pareto contributed to theories in economics, and particularly in the study of income distribution and in the analysis of individuals' choices. Pareto introduced the concept of Pareto efficiency and the Pareto distribution, which is a power law probability distribution. The Pareto principle is based on the observation that twenty percent of the population owned eight percent of the property in Italy, later termed the 80-20 rule. The Pareto principle is applied herein for efficiently fixing issues throughout computer science, manufacturing, building, and other industries. The Pareto principle indicates that by fixing 20% of the most severe issues and/or the most frequently occurring issues, 80% of the related errors will be eliminated. The Pareto principle is additionally applied to improving workforce safety, by identifying the 20% of the hazards that cause 80% of the injuries, most workplace injuries can be eliminated.

The quantum computer 122 is a big data computer rather than a general purpose or traditional computer. The following table illustrates the capabilities of a quantum computer 122 versus a general purpose computer.

| Michael T. Nelson | Discovered Pareto applies to a Task within a Procedure |
| Michael T. Nelson | Discovered Pareto applies to a Procedure within a Step. |
| Michael T. Nelson | Discovered Pareto applies to a Step within a Process. |
| Michael T. Nelson | Discovered Pareto applies to a Process within a System. |
| Michael T. Nelson | Discovered Pareto principle applies to a System. |
| Vilfredo Pareto was an economist. | Discovered the Pareto Principal and applied it to economics. |
| Joe Juran was famous for quality management. | Applied the Pareto Principal to defining the biggest quality problems. |
| Michael T. Nelson created the Rolling Top 5 ® project identification method | Applied the Pareto Principle to define the biggest projects. |
| Dorian Shainin applied Pareto to discover the root cause of a project. | Applied the Pareto principle to find the single biggest cause of a project. He called it the Red X ®. |

| Quantum Computer | General Purpose Computer |
| --- | --- |
| The database that feeds the quantum computer can be viewed analogous with SAP. The software and hardware are for the entire business. | A general purpose computer is designed for individual use. |
| Uses artificial intelligence and machine learning using powerful software. | Uses software like Minitab, Excel, and PowerPoint. |
| Accesses a relatively small amount of data. Capable of managing large amounts of data. | Accesses a relatively small amount of data. Incapable of managing large amounts of data. |
| Does calculations using the large amounts of data. | Restricted to performing calculations on small amounts of data. |
| Turns information into knowledge (magnitude of defects and the point of origin) | Inflexible. |
| Can run complicated programs full enormous sums of data in shorter time. | Comparatively slow. |

The quantum computer 122 analyzes vast sums of data received from the historical success 108 database and the feedback 118 resource. The quantum computer 122 catalogs error codes and identifies different error codes that are in fact directed to the same issue. The quantum computer 122 ranks all areas, projects, and classes within the system based on which issues are occurring most often. Projects for improvement are selected according to the Pareto principle. The projects and areas associated with the various error codes are ranked based on how frequently the error occurs. The top 20% projects with the most frequent error codes are selected for improvement to eliminate the majority of error codes across the system. The systems, methods, and devices described herein indicate that a Rolling Top 5® projects will be selected according to the Pareto principle. (Rolling Top 5® is a registered trademark owned by Shainin II LLC in Northville, Mich.) The Rolling Top 5® projects are rotated as projects are successfully completed. In an embodiment, only five projects are selected even if more than five individual projects make up the most frequent error codes. The Rolling Top 5® projects includes five or fewer projects selected from a plurality of projects based on which of the plurality of projects fails a quality threshold for metric data by a greatest margin, and these five or fewer projects may be referred to herein as the Rolling Top 5® projects.

The following table illustrates the evolution of the Pareto principle.

Figure 1B:
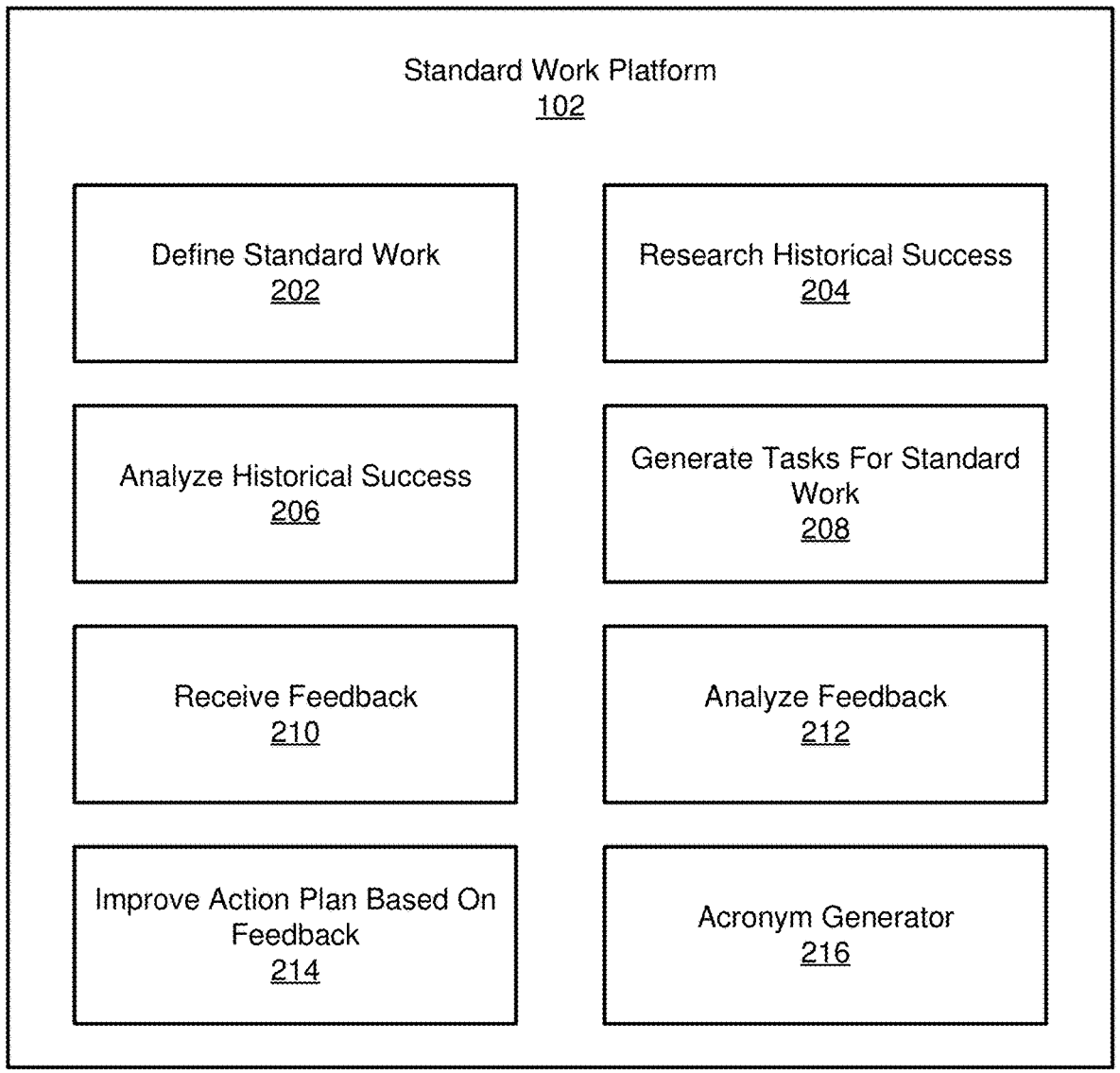
FIG. 1B is a block diagram illustrating functionalities and computer-implemented components of a standard work platform.

FIG. 1B is a block diagram illustrating the functionalities and components of the standard work platform 102. The standard work platform 102 provides functionality for defining a standard work 202, researching historical success 204, analyzing historical success 206, generating tasks for a standard work 208, receiving feedback 210, analyzing feedback 212, improving a standard work matrix based on feedback 214, and generating acronyms 216. It should be appreciated that one or more of these components and functionalities may be present in standard work platform 102, and that not all functionalities or components must be present in each embodiment of the standard work platform 102.

The define standard work 202 component is configured to define a standard work to be implemented by an organization. The define standard work 202 component identifies a standard work that should be implemented or optimized based on an existing dataset. The standard work server 104 receives a dataset pertaining to current quality metrics and assesses the quality metrics to identify one or more areas that should be improved upon based on a defined threshold. The define standard work 202 component indicates what metrics should be improved upon and identifies one or more corresponding processes that can be altered or improved to generate a new or updated standard work for improving the metrics.

In an example implementation, the standard work server 104 receives a dataset comprising manufacturing data for an assembly line. The manufacturing data includes information about material loss, personnel efficiency metrics, finish grade, defects, and so forth. In a specific example implementation, the standard work server 104 is trained to define a standard work 202 for an aeronautics manufacturing company. In this example implementation, the manufacturing data includes information on seam validation, routing, final finish, clamping, fasteners, system components, sealant grade, tubes and fittings, tool marks, efficiency, and so forth. The define standard work 202 component analyzes the manufacturing data to identify one or more deficiency areas that require improvement based on a defined threshold. The define standard work 202 component identifies one or more methods, processes, or tools that should be improved to improve the one or more identified deficiency areas.

The research historical success 204 component is configured to research data across a range of industries and processes to identify successful standard works, tasks, standard work matrices, philosophies, and so forth that have been implemented in the past. In an example, the research historical success 204 component includes a neural network trained to identify whether a standard work was successfully implemented based on feedback data. The neural network may further be configured to associate the successful standard work with certain industries, organizations, process flows, and so forth.

The analyze historical success 206 component is configured to analyze successful historical standard works, tasks, standard work matrices, philosophies, and so forth to determine whether those successes can be implemented in the current standard work and/or standard work matrix. In an embodiment, the analyze historical success 206 component provides a recommendation indicating that a certain historically successful standard work, task, process, standard work matrix, and so forth could be implemented in the currently developed standard work matrix.

The generate tasks for standard work 208 component is configured to analyze the standard work and create one or more tasks in furtherance of efficiently executing the standard work. The generate tasks for standard work 208 component may implement the standard work matrix (see callout number 300 beginning at FIG. 3A). This includes defining one project to be executing, defining five projects for use in training, and defining fifty projects to be executed. In an embodiment, this includes implementing the DELTA-CHANGE decision matrix as discussed herein.

The generate tasks for standard work 208 component generates specific tasks and projects to be completed based on a dataset. The dataset may include manufacturing data, quality control data, material loss data, employee efficiency data, and so forth. The generate tasks for standard work 208 component includes a neural network trained on a dataset comprising historical information about successful standard works performed at the organization or other, similar organizations. The neural network is additionally provided with information about the current processes, tasks, and methods performed by the organization, and is trained on a dataset comprising historical information about how those processes, tasks, and methods have been altered, and how the metrics shifted based on the alterations. The generate tasks for standard work 208 identifies new or altered tasks, processes, and method steps to be performed by the organization in furtherance of the standard work. The generate tasks for standard work 208 component does this based on the output of the neural network, which is trained on a dataset comprising historical modifications and resulting adjustments to dataset metrics.

The receive feedback 210 component is configured to receive, categorize, store, and fuse feedback from one or more sources. In an embodiment, the receive feedback 210 component receives feedback data from multiple sources and fuses the data that is applicable to a certain project to generate fused feedback data. In an embodiment, the receive feedback 210 component communicates with one or more outside parties by way of an Application Program Interface (API) or other means of communication to receive feedback in real time. The receive feedback 210 component may retrieve data stored in cloud-based database storage or data loaded from disk hardware.

The feedback data includes metrics generated by manual input, sensors, and machine learning algorithms. The metrics may indicate defects in a manufacturing process. In an embodiment, the metrics include defects in part manufacturing, and these defects are identified by a machine learning algorithm trained to assess images taken of parts, and further to determine whether the part has a defect based on the image. The defects are loaded on to the feedback data 110 cloud-based database storage. The quantum computer 122 analyzes the feedback data 110 and converts the defect count for each specific failure mode into a bubble. The size of the bubble represents the defect quality.

The quantum computer 122 may execute Pareto analysis. Multiple metrics are normalized and stacked, and the height of a metric in a stack indicates the relative importance. The data can be displayed such that month-over-month defect improvements are efficiently illustrated to a user.

The analyze feedback 212 component is configured to analyze feedback to determine whether the standard work and/or standard work matrix is successful. In an embodiment, the analyze feedback 212 component assesses feedback received and/or retrieved from multiple different entities or sources to determine whether certain tasks within the standard work matrix are being performed consistently and correctly.

The analyze feedback 212 process includes defining predetermined buckets and ensuring data integrity. Ensuring data integrity includes ensuring that data and specific defects are coded correctly and placed in the correct buckets. The analyze feedback 212 process includes verifying and validating defect codes. The data is stored in a database. The analyze feedback 212 process includes data mining to turn the data into information. The data mining process is performed by the quantum computer 122. The data mining is based on one or more metrics and by biggest defect codes. The analyze feedback 212 process includes assigning resources to the biggest projects to make improvements. The first four steps listed herein are within the ALIGN process, and the final step is the handoff from ALIGN to FACTUAL™ process.

The quantum computer 122 functions as a neural network and is trained to recognize synonyms, like defects, to improve the data. The quantum computer 122 classifies defect codes correctly and identifies defect codes that are categorized differently but pertain to the same issue.

The analyze feedback 212 component includes a neural network. The neural network is trained on historical metric data, historical prior-implemented standard work matrices, and other historical data pertaining to the standard work. The neural network analyzes the historical data to calculate a standard work matrix 300 for the current standard work. The neural network may include a convolutional neural network.

The improve standard work matrix based on feedback 214 component is configured to alter tasks within the standard work matrix, add tasks to the standard work matrix, and/or eliminate tasks from the standard work matrix based on feedback. In an embodiment, the improve standard work matrix based on feedback 214 component is configured to notify a user that certain tasks are being performed inconsistently, slowly, or incorrectly, and that a portion of the standard work matrix should be revised.

The acronym generator 216 component is configured to generate an acronym based on a listing of steps to be completed in furtherance of the standard work. In an embodiment, the standard work itself is described as an acronym. The acronym generator 216 component includes a neural network or algorithm. The neural network or algorithm receives an input including the names and sounds of all letters in the pertinent language, the spelling and meaning of words within the pertinent language, and the current standard work being implemented. The neural network or algorithm calculates a plurality of words that can be parsed into an acronym for illustrating or explaining the steps in the standard work matrix.

The acronym generator 216 process includes: (a) defining a skill to turn into a standard work; (b) selecting a meaningful word that represents the skill; (c) defining process steps with one word or a few words; (d) defining tools for each step; (e) defining exit criteria for each step; (f) defining roles and responsibilities for coach, executive sponsor, and subject matter expert for each step; (g) setting the standard work as the baseline for improvement; and (h) initiating the oneFiveFIFTY™ standard work deployment strategy. (oneFiveFIFTY™ is a trademark owned by oneFiveFIFTY, LLC.)

The data retrieval is associated with the ALIGN process described herein. ALIGN is the standard work for selecting projects. The FACTUAL™ process follows ALIGN and is used for improvement. DRIVE follows the FACTUAL™ process and is used for describing how an investigation was performed $AA^2SS^2$ is standard work for exploiting improvements.

The systems, methods, and devices described herein may be particularly beneficial to certain companies, organizations, and entities engaged in process improvement, manufacturing efficiency, and reducing waste in manufacturing settings. Some example companies included, for example, Shainin® services (Red X® method), which is directed to solving complex engineering problems; Six Sigma (DMAIC), which is directed to transaction projects such as those done by Air Academy; Gemba Academy, which is directed to implementing Six Sigma and remote learning; Taguchi, which is directed to teaching engineers to make robust designs; and TRIZ, which is directed to teaching engineers to come up with innovative solutions for fixing a problem. (Shainin® and Red X® are registered trademarks owned by Shainin II LLC in Northville, Mich.)

Figure 2:
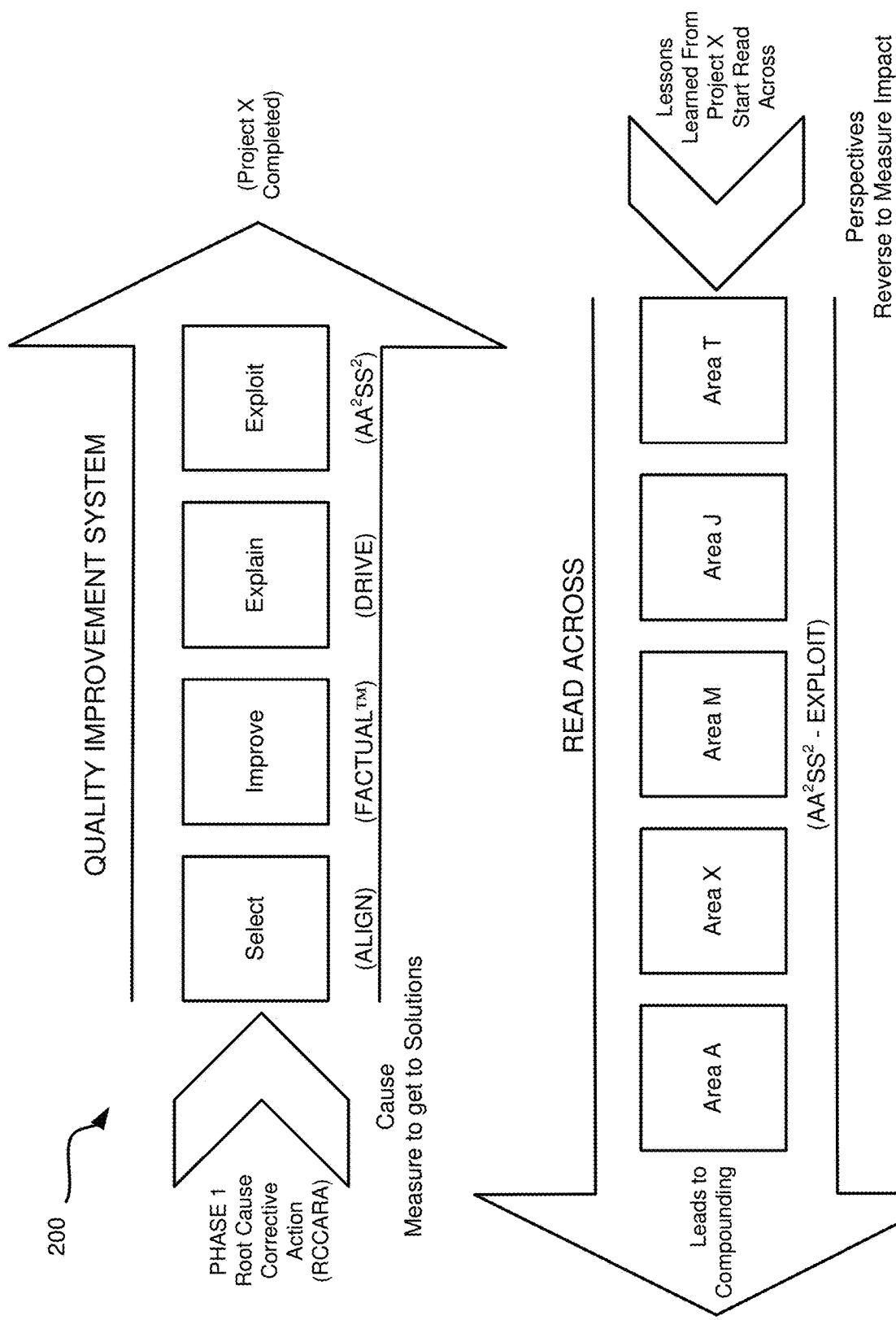
FIG. 2 is a schematic diagram of a system and process for quality improvement and measuring impact of the quality improvement systems and processes.

FIG. 2 is a schematic diagram of a system 200 and process flow for identifying, quantifying, and improving processes across an organization. The system 200 is implemented at least in part by the standard work server 104 and the quantum computer 122 described herein. The system 200 begins with Project X, and the lesson learned from Project X funnel into the "read across" process. The system 200 begins with a PHASE 1, wherein the root cause corrective action (RCCA) is identified and implemented. A first step in executing the root cause corrective action is determining the root cause of one or more problems within an organization. The first step includes the "Select" step, meaning selecting one or more projects, areas, or classes of work that need to be improved upon. In an implementation, this is executed by the ALIGN process described herein.

The select process (in some cases, specifically the ALIGN process) includes analyzing enormous sums of data with the quantum computer 122 to identify areas that need improvement. The select process is performed in accordance with the Pareto principle, wherein 80% of the issues across an organization can be resolved by addressing 20% of the problem areas. The select process includes identifying the 20% of the problem areas that need to be addressed to achieve an 80% overall resolution in issues. In an example implementation, the organization is a manufacturing facility for manufacturing large-scale machines or devices, such as, for example, vehicles, aircraft, computers, and so forth. In a further example implementation, the organization is directed to computer science and software development. In an example wherein the organization is involved in manufacturing, the problems may include defects in parts, excess scrap material generated during production, part failures, and so forth. In an example wherein the organization is involved in software development, the problems may include bugs, failures, or incorrect outcomes generated by the software code. The select process is drawn to selecting a Rolling Top 5® projects addressing specific issues to reduce 80% of the overall issues across the organization. The Rolling Top 5® projects include no more than five projects and may include fewer than five projects. A project is initially defined by the problem that the project is seeking to resolve, for example, the problem may be that a certain part within a vehicle manufacturing plant is being made defectively or is continually failing. The project is directed to improving the manufacturing of that specific part to avoid future defects or failures.

The select process includes analyzing enormous sums of data with the quantum computer 122 to identify the Rolling Top 5® projects. The quantum computer 122 receives information from one or more of the historical success 108 database, the feedback data 110 database, the feedback 118 system, and/or the inventory management 114 system. The quantum computer 122 analyzes the feedback data 110 and identifies failure codes and/or defect codes that include different descriptions but are in fact directed to the same issue. The quantum computer 122 analyzes information in the historical success 108 database to identify past defects that are similar to the common defects identified in the feedback data 110. The quantum computer 122 analyzes the feedback data 110 and ranks areas, classes, and projects across the entire organization in descending order based on which areas, classes, and projects have the most defect codes. In an example implementation, the quantum computer 122 analyzes projects across a manufacturing facility and calculates the percentage of scrap, repair, and rework (SRR) hours performed for each project, and further determines a quantity of defects for each project. The quantum computer 122 generates a report that selects the projects that need to be addressed to get the greatest return across the organization. The quantum computer 122 defines the standard work at least in part by selecting the Rolling Top 5® projects to be addressed.

The quantum computer 122 and/or the standard work server 104 proceeds to the improve process, which may specifically include the FACTUAL™ process described herein. The improve process includes focusing on a certain project to improve to achieve an 80% reduction in the selected metric. In an example implementation, the selected metric is reducing SRR hours and reducing defects. The improve process includes focusing on the tasks or projects for improving the selected metric. The improve process includes testing the tasks to identify whether the tasks are working successfully. The improve process includes the quantum computer 122 assessing the historical data to determine what tasks or procedures should be performed to improve the selected metrics for the Rolling Top 5® projects.

The quantum computer 122 and/or the standard work server 104 proceeds to the explain process, which may specifically include the DRIVE process described herein. The explain process includes distributing the tasks and procedures that need to be implemented to the persons and/or computer systems that will implement those tasks and procedures. The standard work server 104 may calculate all tasks and procedures that need to be implemented to improve the selected metrics for the Rolling Top 5® projects, and the standard work server 104 distributes those instructions to the relevant machines and/or persons.

The quantum computer 122 and/or the standard work server 104 proceeds to the exploit process, which may specifically include the AA²SS² process described herein. The exploit process includes implementing the tasks and/or procedures that need to be performed to improve the selected metrics for the Rolling Top 5® projects. This concludes Project X of the system 200. The lessons learned from Project X are read across to gain perspectives and to measure the impact of the tasks and procedures that were performed.

The read across is performed on each of the Rolling Top 5® projects. The Rolling Top 5® projects are illustrated in FIG. 2 as Area T, Area J, Area M, Area X, and Area A. The variables are randomized to indicate that the Rolling Top 5® projects are not listed in any alphabetical or numerical order and are instead selected by the quantum computer 122 based on which projects need to be improved to receive an 80% improvement holistically across the organization. The read across process includes the exploit process, which may be specifically referred to herein as the AA²SS² process. The results of the read across lead to compounding.

The system 200 is implemented by the standard work server 104 and/or the quantum computer 122. In an implementation, the system 200 is not implemented by people and is instead implemented by specialty computers that are trained to alter machines, rewrite software, and change manufacturing processes based on the results of the analysis by the quantum computer 122. The quantum computer 122 determines, for example, that one of the Rolling Top 5® projects is related to an error code arising from computer software. The quantum computer 122 identifies the project that needs to be fixed, identifies the root cause of the problem, references the historical successes to identify means to solve the problem, and then executes the resolution to the problem without human intervention. In a further example, the quantum computer 122 identifies that one of the Rolling Top 5® projects is a defect in how a screw is installed in a vehicle manufacturing process. The quantum computer 122 identifies the root cause of the problem and references the historical successes to identify means to solve the problem. The quantum computer 122 provides instructions to one or more machines that are involved in installing the screw and instructs the one or more machines to perform the process differently. The entire system 200 is implemented by the quantum computer 122 and the standard work server 104 without human intervention to improve, for example, the error code in the software and/or the installation of the screw in the vehicle manufacturing process.

FIGS. 3A-3G each illustrate a block diagram of a standard work matrix 300. The standard work matrix 300 is used to implement the oneFiveFIFTY™ process, wherein one project is defined and executed, and then five projects are defined and executed, and then fifty projects are defined and executed. FIGS. 3B-3G illustrate progression through the standard work matrix 300, wherein the one project 402 is executed to completion before the feedback for the one project 404 is captured. The five projects 406 are executed to completion before the feedback for the five projects 408 is captured for generating the fifty projects.

The standard work matrix 300 can be illustrated in a grid as shown in FIGS. 3A-3G. The rows of the grid include the DELTA process and the columns of the grid include the CHANGE process. The rows of the standard work matrix 300 include steps to define 302, execute 304, learn 306, train 308, and advance 310. The columns of the standard work matrix 300 include steps to commit 312, hyper-focus 314, act 316, new skills 318, get results 320, and establish new normal 322. The standard work matrix 300 is generally focused on defining, deploying, and improving a standard work. The standard work may include a process, a procedure, a method step, a tool, or a system. Defining the standard work places an emphasis on creation. Deploying the standard work places an emphasis on innovation. Improving the standard workplaces emphasis on validation, and may be based on measurements, feedback, consistency, sensor data, survey data, and other metrics.

There are two types of standard work, including constant standard work and variable standard work. Variable standard work is illustrated with parenthetical notations herein. The oneFiveFIFTY™(SW)-DELTA(SW)-CHANGE processes are integrated and shown in a matrix. oneFiveFIFTY™ is a deployment strategy for standard work. DELTA is used to define standard work, execute standard work, learn from standard work, train using the standard work, and advance the standard work. DELTA is directed to hard skills used to improve parts or services. CHANGE is directed to soft skills for improving people. Software can show the steps for DELTA in rows and CHANGE in columns.

The variable standard work includes the FACTUAL™ process. The FACTUAL™ process may be deployed for solving complex engineering projects. The oneFiveFIFTY™ (SW)-DELTA(SW)-CHANGE(SW) process is a matrix that shows the progression of three pieces of constant standard work. Software can assist a user in doing a strength assessment on a one to five scale. The strength assessment indicates the exit criteria for each step within the standard work.

The standard work matrix 300 can be particularly beneficial for assisting persons with dyslexia in accomplishing or executing the standard work. Some persons with dyslexia can see multiple perspectives and play multiple dimensions on a two-dimensional form. This is evidence in the standard work matrix 300, wherein the DELTA process and the CHANGE process matrix is executed in a tabulated format for calculating the standard work matrix 300. On the surface, the DELTA process is shown in rows and the CHANGE process is shown in columns. The DELTA process and the CHANGE process correspond to a fixed standard work for improving parts and people, respectively. The concept that projects drive change and people, and parts can change positively together is captured in the CHANGE process. The CHANGE process focuses on improving behaviors of persons and entities. In some embodiments, the DELTA process is fixed and does not change such that the DELTA process is executed in the same order and manner regardless of the subject matter of the applicable standard work. The DELTA process may be thought of as a fixed standard work model that improves parts, systems, and services in an organization.

The DELTA process can be thought of us a hard skill for improving systems and parts. The CHANGE process can be thought of as a soft skill for improving the actions of persons. The standard work matrix 300 therefore simultaneously includes tasks for improving systems and individuals' performance. The system-based skills and the person-based skills are therefore embedded into the same matrix of the standard work matrix 300 to develop tasks for improving performance across an entire organization, department, or other entity.

Additionally, the standard work matrix 300 is useful for defining the roles and responsibilities of different persons or entities within an organization. For example, the standard work matrix 300 may define the roles, responsibilities, tasks, and feedback metrics for executives, leaders, projects managers, and persons within an organization. Additionally, the standard work matrix 300 may define the subject matter level for each of a plurality of deployment levels of the standard work matrix 300. The standard work matrix 300 may include an estimation of the duration of time that needs to be spent practicing any given skill, and this may be determined by a neural network or calculated based on stored information. This calculation can be used to determine a timeline for executing the standard work matrix 300 that is personalized to a certain entity or organization.

The first step of the DELTA portion of the standard work matrix 300 (i.e., the rows of the standard work matrix 300) includes defining 302 the standard work. The standard work may include one or more of a process, goal, accomplishment, tool, or system. The standard work is associated with performing a skill and may be associated with a tool, process, system, and so forth that is scalable and delivers a consistent result. The standard work may include a specific process or methodology associated with improving parts such as a tool, process, or system. The standard work may be referred to as a "lighthouse project" that shows the way or identifies the end-goal of the standard work matrix 300. For example, the standard work may be to complete a project, improve a process, achieve a certain result, and so forth. In an embodiment, the standard work includes a process which may further include one or more tasks or methods. The standard work may apply to a person, corporation, government entity, and so forth. After the standard work is defined at 302, the standard work is then locked in at each step 302-322 such that all other steps 302-322 are calculated in furtherance of achieving the standard work. Defining 302 the standard work places an emphasis on creation. The DELTA process of the standard work matrix 300 places an overall emphasis on creation for achieving the standard work.

In an embodiment, defining 302 the standard work includes identifying, retrieving, or selecting an existing standard work. The standard work may be defined as the skills or abilities already known by a person or entity. The standard work may be defined as a "generic" standard work by selecting projects to be completed, by indicating that an existing project should be improved, and/or by indicating that a project should be explained or implemented to additional persons or entities.

In an embodiment, the standard work is a compensation strategy for overcoming inconsistency driven by contradictions. Particularly in persons with dyslexia, contradictions can be an unpredictable switch that makes persons inconsistent in how they view, perceive, and react to their environments. In an embodiment, the standard work server 104 identifies contradictions and generates the standard work matrix 300 to overcome inconsistencies. The standard work matrix 300 for executing the standard work provides consistency and assists persons with dyslexia in being consistent.

In an embodiment, defining 302 the standard work includes receiving a manual input from a user. In such an embodiment, the user may manually provide an indication of the standard work and may additionally provide an indication of tasks or actions to be completed in furtherance of the standard work. The user may manually indicate steps, methods, and instructions for executing the standard work.

In an embodiment, defining 302 the standard work includes generating a process including one or more tasks or steps. The process may include sequential tasks that must be completed in a certain order or are suggested to be completed in a certain order. Defining 302 the standard work may further include calculating an acronym to represent the tasks in the process. This may be particularly beneficial where the acronym has a standalone meaning that may be easily memorized. Each letter in the acronym may represent one task within the process.

Identifying and executing the standard work can be particularly useful for persons with dyslexia. In some instances, and particularly for persons with dyslexia, the standard work is an effective means for ensuring people and entities executing tasks consistently. In these instances, the standard work matrix 300 for executing the standard work is a means for assisting persons with dyslexia in exploiting their talents rather than overcoming the weaknesses commonly associated with dyslexia.

The defining 302 step of the DELTA process is performed on one project 402 on each of commit 312, hyper-focus 314, act 316, new skills 318, get results 320, and establish new normal 322 before the process proceeds to the execute 304 of the DELTA process. This is illustrated in FIGS. 3B-3H, wherein grey shading illustrates when that portion of the standard work matrix 300 is performed. First, the define 302 step is crossed with commit 312 on a one project 402 (see FIG. 3B). Then, the define 302 step is crossed with hyper-focus 314 on one project, and then define 302 is crossed with act 316 on one project, and then define 302 is crossed with new skills 318 on one project, and then define 302 is crossed with get results 320 on one project, and then define 302 is crossed with establish new normal 322 on one project. The define 302 step of the DELTA process is performed on each of commit 312, hyper-focus 314, act 316, new skills 318, get results 320, and establish new normal 322 before the standard work matrix 300 proceeds to the execute 304 step of the DELTA process.

The second step of the DELTA process includes executing 304 the standard work. The execute 302 step generates feedback for the one project 404. The execute 304 steps includes performing the standard work and is dependent on the implementation of the standard work matrix 300 and the particular steps, processes, and methods outlined in the standard work itself. In an example implementation, the standard work matrix 300 is performed to reduce material loss in a plant for manufacturing automobiles. The execute 302 step in this example would include performing certain methods and processes when manufacturing automobiles. This may include the implementation of an alteration to how the automobile manufacturing process is carried out. The execute 304 step is first performed on one project. The execution 304 of this one project results in feedback for the one project 404.

Similar to the define 302 step of the DELTA process, the execute 304 step of the DELTA process is performed on each of commit 312, hyper-focus 314, act 316, new skills 318, get results 320, and establish new normal 322 before proceeding to the learn 306 step of the DELTA process.

The third step of the DELTA process includes learning 306 the standard work. In an embodiment, the learning 306 step corresponds with five or more projects or tasks, or at least a plurality of projects or tasks. These five or more projects or tasks may be selected in a designated area where consistency can be verified as repeatable. The learn 306 process is performed on five projects 406 rather than one project. This is a departure from define 302 and execute 304, which are only performed on one project.

Similar to the define 302 and execute 304 steps of the DELTA process, the learn 306 step of the DELTA process is performed on each of commit 312, hyper-focus 314, act 316, new skills 318, get results 320, and establish new normal 322 before proceeding to the train 308 step of the DELTA process. This is illustrated in FIG. 3D.

The fourth step of the DELTA process includes training 308 the standard work. In an embodiment, the training 308 step corresponds with five or more projects or tasks, or at least a plurality of projects or tasks. These five or more projects or tasks may be selected in a designated area where consistency can be verified as repeatable. The train 308 step of the DELTA process results in receiving feedback for the five projects 408.

Similar to the define 302, execute 304, and learn 306 steps of the DELTA process, the train 308 step of the DELTA process is performed on each of commit 312, hyper-focus 314, act 316, new skills 318, get results 320, and establish new normal 322 before proceeding to the advance 310 step of the DELTA process. This is illustrated in FIGS. 3T-3Y.

The fifth step of the DELTA process includes advancing 310 the standard work. In an embodiment, the advancing 310 step corresponds with fifty or more projects or tasks, or at least a plurality of projects or tasks. These fifty or more projects or tasks may be selected in ten or more areas where consistency can be validated and reproducible. When the standard work matrix 300 transitions from five or more projects/tasks to fifty or more projects/tasks, performance feedback is received or generated by running charts. The performance feedback may be evaluated by the system to determine whether the standard work matrix 300 is successful or should be reevaluated. In an embodiment, the performance feedback is evaluated by running the DELTA process versus the CHANGE process versus time and the standard work. This performance feedback may be used to compare projects or tasks with one another to make improvements to the standard work matrix 300.

Similar to the define 302, execute 304, learn 306, and train 308 steps of the DELTA process, the advance 310 step of the DELTA process is performed on each of commit 312, hyper-focus 314, act 316, new skills 318, get results 320, and establish new normal 322.

The first step of the CHANGE process includes committing 312 the standard work. The second step of the CHANGE process includes hyper-focus 314 on improving execution of the standard work. The third step of the CHANGE process includes acting 316 on the standard work. The fourth step of the CHANGE process includes generating new skills 318 relating to the standard work. The fifth step of the CHANGE process includes getting results 320 by improving execution of the standard work. The sixth step of the CHANGE process includes establishing a new normal 322 by improving execution of the standard work.

In an embodiment, a control plan is embedded in the matrix of the standard work matrix 300. The control plan indicates which steps within the DELTA process and/or the CHANGE process have been executed by the system. In an embodiment, an independent standard work matrix 300 matrix is executed for executive, leaders, and subject matter experts. In some instances, persons with dyslexia can see multiple perspectives and display them at the same time. Additionally, some persons with dyslexia are exceptionally creative and deploy this creativity in generating efficient and new standard work matrices for achieving or executing a standard work.

In an embodiment, the standard work matrix 300 is particularly useful for improving different departments, entities, or aspects of a system at the same time. This aligns with being holistic and giving purpose to each individual on a team across different departments or entities of the system. The standard work matrix 300 can leverage the success of executing identifiable projects to drive change in people and entities.

In an embodiment, a neural network calculates the standard work matrix 300 and/or defines 302 the standard work based on information pertaining to successful processes, plans, and systems. The neural network may be trained on a dataset comprising a standard work matrix 300 for successful standard works. For example, the neural network may be trained on a dataset comprising processes, actions, and tasks executed in furtherance of achieving a certain goal. The dataset may include information pertaining to various fields in business, life improvement, manufacturing, marketing, governance, and so forth. The dataset may further comprise feedback information for the various processes, actions, and tasks. In an embodiment, the neural network is trained on the dataset to identify successful processes, tasks, and feedback loops in furtherance of achieving a standard work. Additionally, the neural network may be trained to define 302 a standard work for a certain industry based on multiple factors.

In an embodiment, the standard work server 104 and/or a neural network in communication with the standard work server 104 is trained on a dataset comprising information implemented by successful persons or entities. The processes, tasks, and standard work matrices implemented by these successful persons or entities can be leveraged by the neural network in furtherance of generating the standard work matrix 300.

In an embodiment, each of the DELTA process and the CHANGE process includes a measurement system. The measurement system may include exit criteria and each step in the standard work matrix 300 may be managed using a control plan. In an embodiment, the standard work server 104 receives feedback information such as surveys, manufacturing data, sales data, sensor data, and other feedback that pertains to the success of the tasks within the standard work matrix 300. The standard work server 104 may determine if the feedback meets a threshold and whether the standard work matrix 300 is successful or should be terminated or adjusted.

In an embodiment, the skill level of individuals and/or machines that are executing the standard work matrix 300 are certified. The skill level metrics may be different for different positions or types of machines. For examples, executive-level leadership within an organization may be associated with a different skill level metric system when compared with management-level leadership or subject matter experts.

Figure 3A:
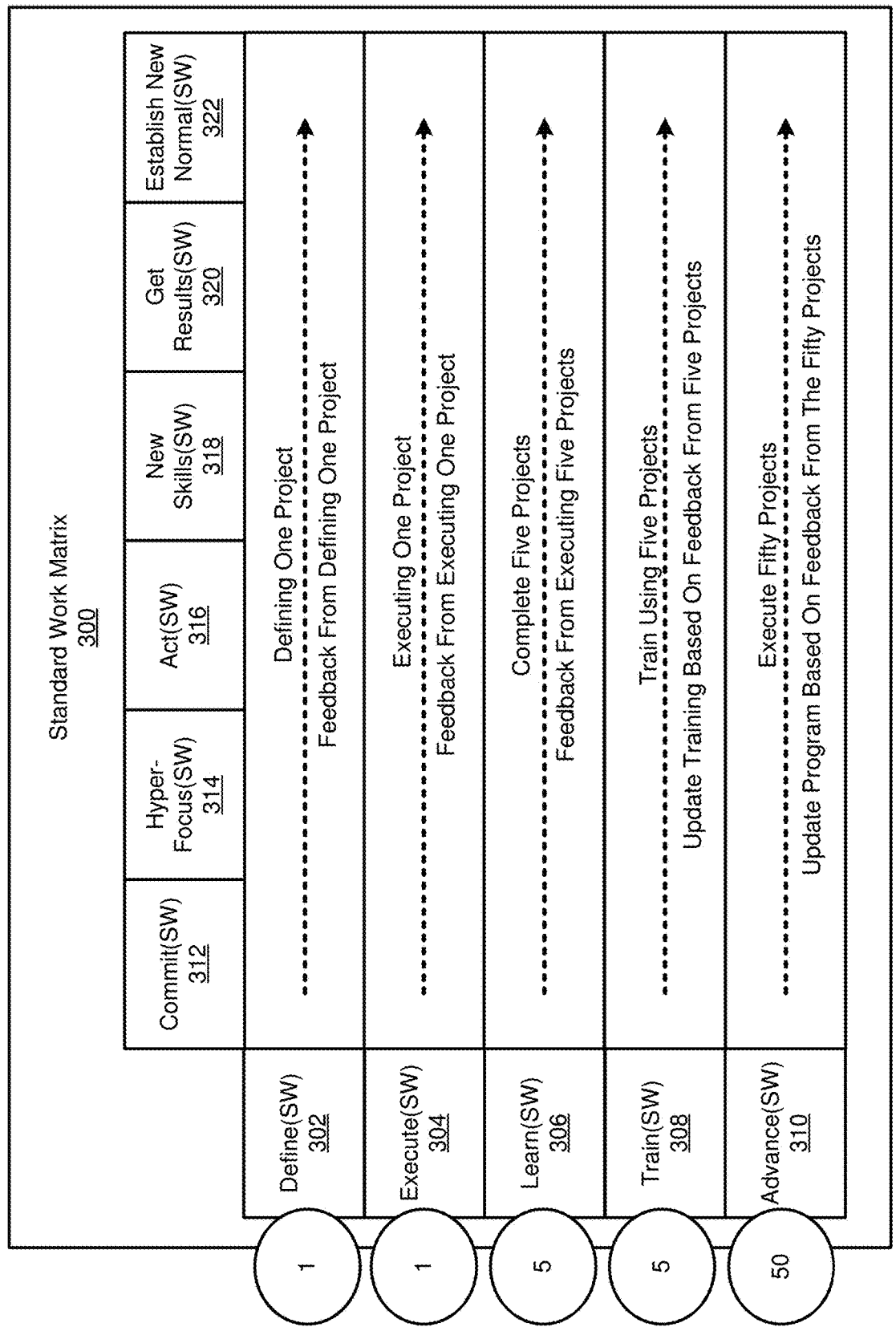
FIG. 3A is a block diagram illustrating a DELTA-CHANGE standard work matrix, and the data flow and implementation of the standard work matrix.
Figure 3B:
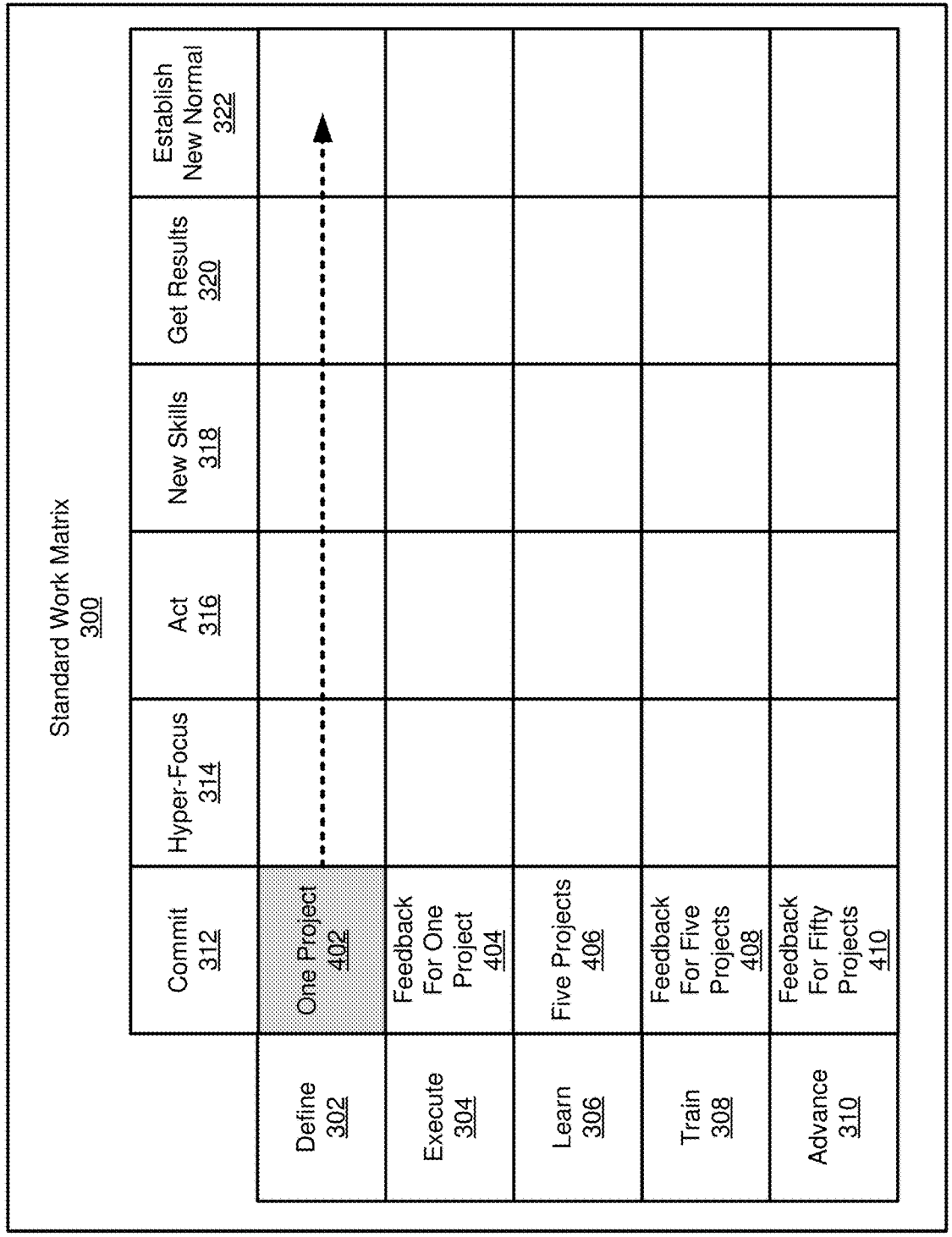
Figure 3C:
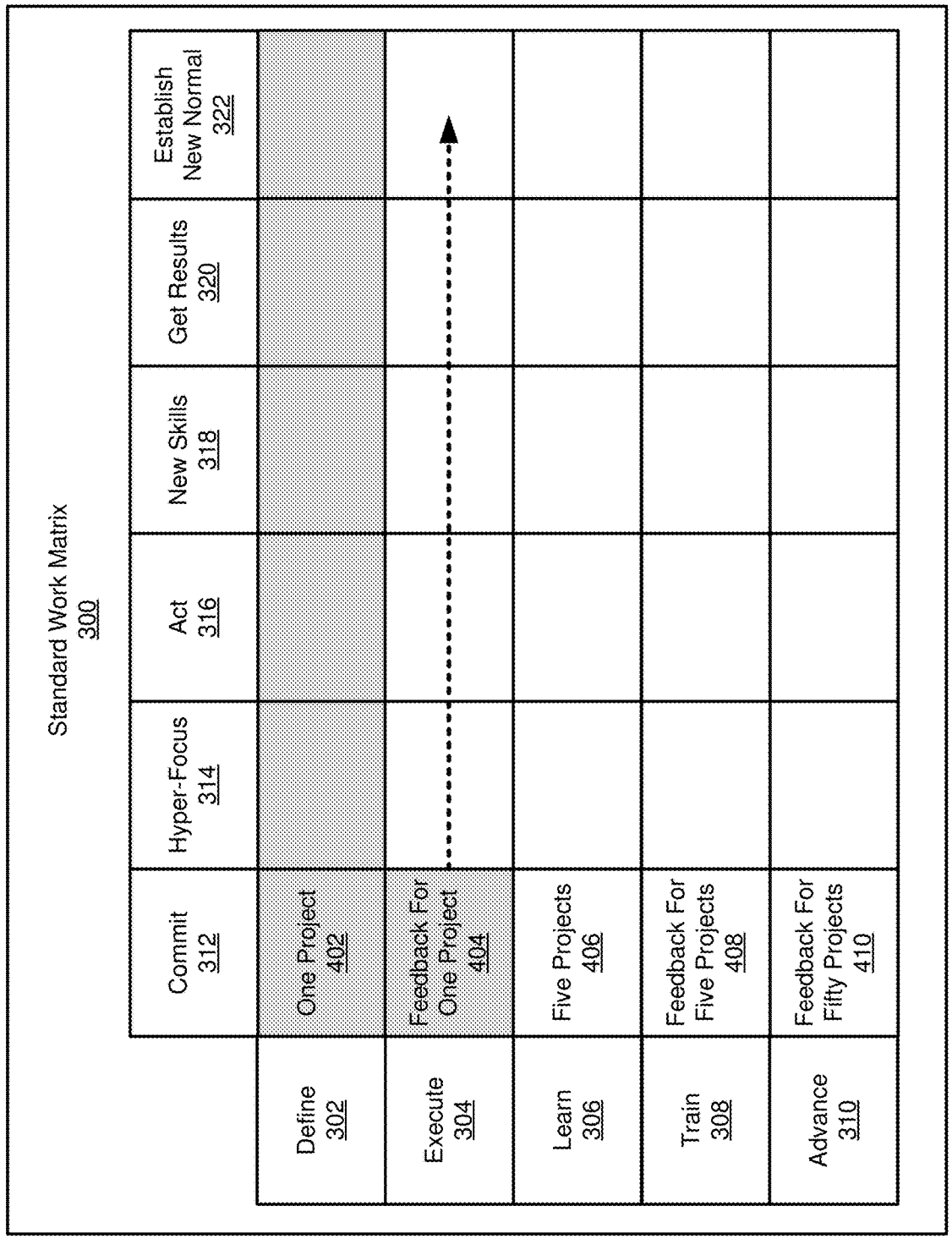

FIG. 3A indicates how many steps are associated with each row of the DELTA process. As shown, define 302 and execute 304 include one step while learn 306 and train 308 include five steps each. The advance 310 step includes fifty steps. In an embodiment, the learn 306 and train 308 steps are each executed five or more times, or at least a plurality of times, to verify consistency and repeatability. In an embodiment, the advance 310 step is executed fifty or more times, or at least a plurality of times, to validate consistency and reproducibility.

The feedback loops for the one, five, and fifty task sets may include a run chart. A feedback loop may provide information regarding the success of defining 302 the standard work and executing 304 the standard work. A feedback loop may provide information for measuring the success of learning 306 the standard work and training 308 the standard work. The five tasks or projects associated with this feedback loop may each be directed to the same area, department, or issue in the organization. Results from these tasks and projects in the same area can help improve consistency across the organization. A feedback loop may provide information for measuring the success of advancing 310 the standard work. The fifty tasks or projects for this feedback loop may span ten or more areas, departments, or issues within the organization. The five tasks or projects within the same area, and the ten areas for the fifty tasks or projects, both help to improve consistency across the organization.

In an embodiment, all steps in the CHANGE process must be executed for the one project 402 before moving on the to five projects 406. Additionally, the define 302 and execute 304 steps may be completed before moving on to the five projects 406. Further, in some embodiments, all steps in the CHANGE process must be executed for the five projects 406 before moving on to receiving feedback for the fifty projects 410. The variable standard work may be improved after feedback is obtained on the "one" project that is executed and the results are measured. In some embodiments, the CHANGE standard work process is a new addition, and the first commit 312 step is introduced. Now the original steps that improve parts, including DELTA and associated feedback, are aligned with a process to improve individuals by way of the CHANGE process and associated feedback.

During execution of the CHANGE process, the original methods steps for improving parts and systems are aligned with a process for improving performance by individuals. The DELTA-CHANGE matrix is a holistic model for improving parts and people. The act 316 step includes acting on the fixed DELTA model and on the first define 302 step in which the standard work is specified or created. The standard work is improved after feedback is obtained on the one project 402 that is executed, and the results are found.

In an embodiment, the standard work server 104 uses the existing standard work such as the Isoplot® system. (Isoplot® is a registered trademark owned by Shainin II LLC in Northville, Mich.) The standard work server 104 may use an existing standard work such as the Sensory Scoring Transform (SST), or Gage Repeatability and Reproducibility (GR&R) for measurement systems and repeatability investigations. In some instances, the standard work is defined and used within the DELTA-CHANGE standard work matrix 300 matrix. This improves both systems and the performance of individuals. In an embodiment, the DELTA process and the CHANGE process can be decoupled. The standard work system may be reduced to one or more processes The standard work matrix 300, sometimes referred to as a synergistic matrix 300, illustrated in FIG. 3A-3G enables a synergistic effect where the whole is greater than the sum of the parts. DELTA is implemented to improve parts using the standard work like the FACTUAL™ process. The DELTA process is fixed or constant standard work. The FACTUAL™ process is variable standard work that is already defined. The CHANGE process is intended to improve people. Each cell in the standard work matrix 300 has a part component and a people component.

In an embodiment, an artificial intelligence algorithm walks through the standard work matrix 300 block-by-block and indicates which cell within the standard work matrix 300 should be executed. This information may alternatively be manually input by a user. The artificial intelligence algorithm consumes historical metric data and calculates a predicted completion date for each cell within the standard work matrix 300. The artificial intelligence algorithm tracks process through the standard work matrix 300 based on user inputs, historical metric data pertaining to similar standard work matrices, sensor data, and report data. An algorithm tracks progress through the standard work matrix 300 and provides a notification indicating when each cell was initiated, processed, and completed.

Figure 4:
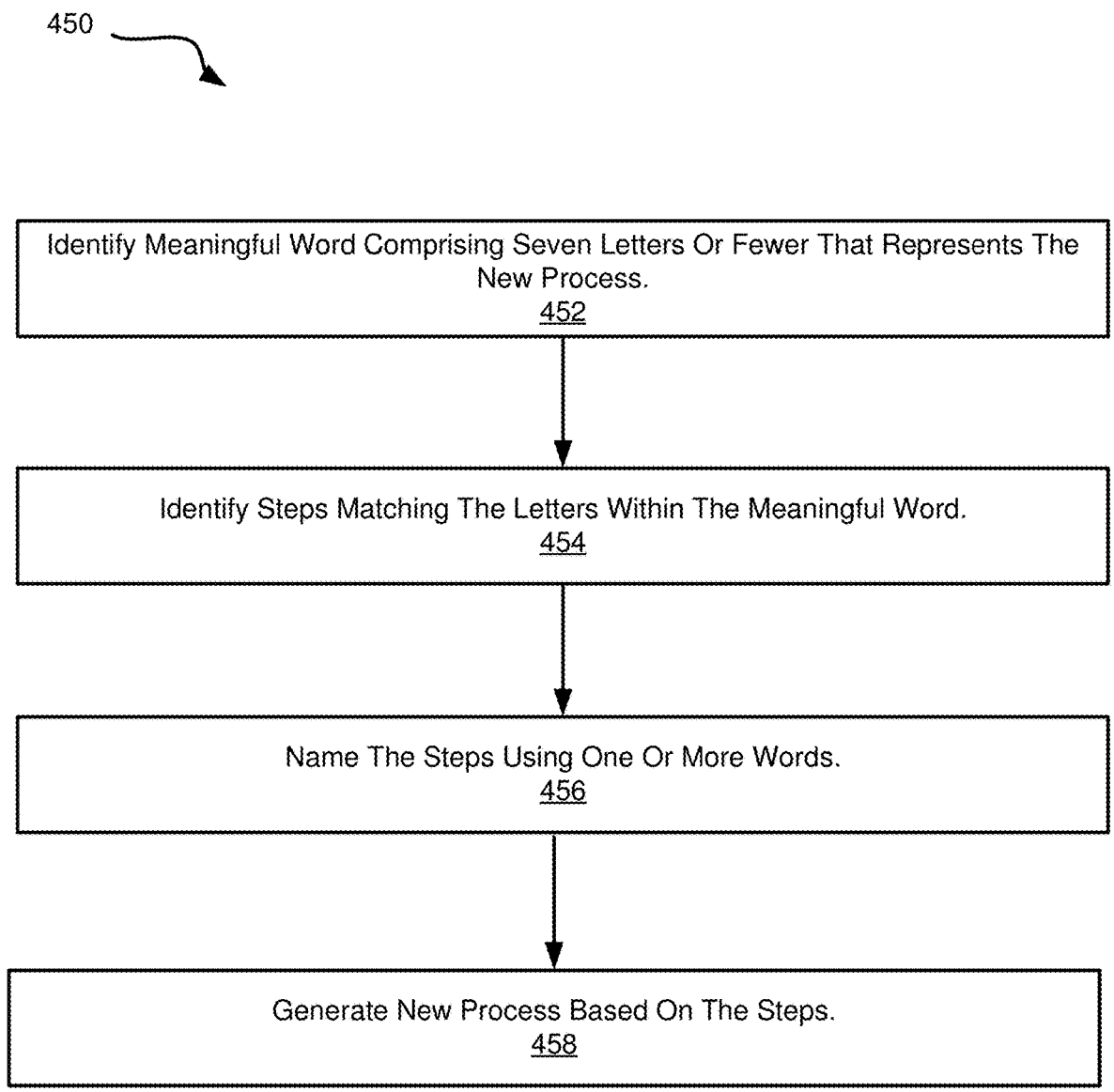
FIG. 4 is a schematic flow chart diagram of a method for generating a method for improving a standard work.

FIG. 4 is a schematic flow chart diagram of a method 450 for generating a standard work matrix 300. The method 450 includes identifying at 452 a meaningful word comprising seven letters or fewer that represents the new process. The method 450 includes identifying at 454 steps matching the letters within the meaningful word. The method 450 includes naming at 456 the steps using one or more words. The method 450 includes generating at 458 a new process based on the steps. The method 450 is performed by one or more processors executing instructions stored in non-transitory computer readable storage medium.

In an embodiment, the process of identifying at 452 the meaningful word, this step is executed by a neural network, wherein the neural network is trained on a dataset comprising words and definitions for one or more languages pertinent to execution of the method 450. The neural network is additionally trained on a language dataset comprising an indication of whether a word is common, useful, or meaningful in a certain field. The neural network selects one or more potential acronym words based on whether those words are applicable and meaningful to the certain field. The neural network may additionally be trained on a dataset comprising terms of art and slang for the certain field.

FIG. 5 is a schematic flow chart diagram of a method 500 for executing a standard work matrix 300. The method 500 includes defining at 502 a standard work to be implemented by an organization, wherein the standard work comprises one or more of a system, a process, a procedure, or a task. The method 500 includes receiving at 504 feedback data comprising information on execution of the system, the process, the procedure, and/or the task. The method 500 includes determining at 506 whether the execution of the system, the process, the procedure, and/or the task meets a threshold based on the feedback data. The method 500 includes advancing at 508 the standard work to comprise a new task in response to the execution of the system, the process, the procedure, and/or the task meeting the threshold.

Figure 6:
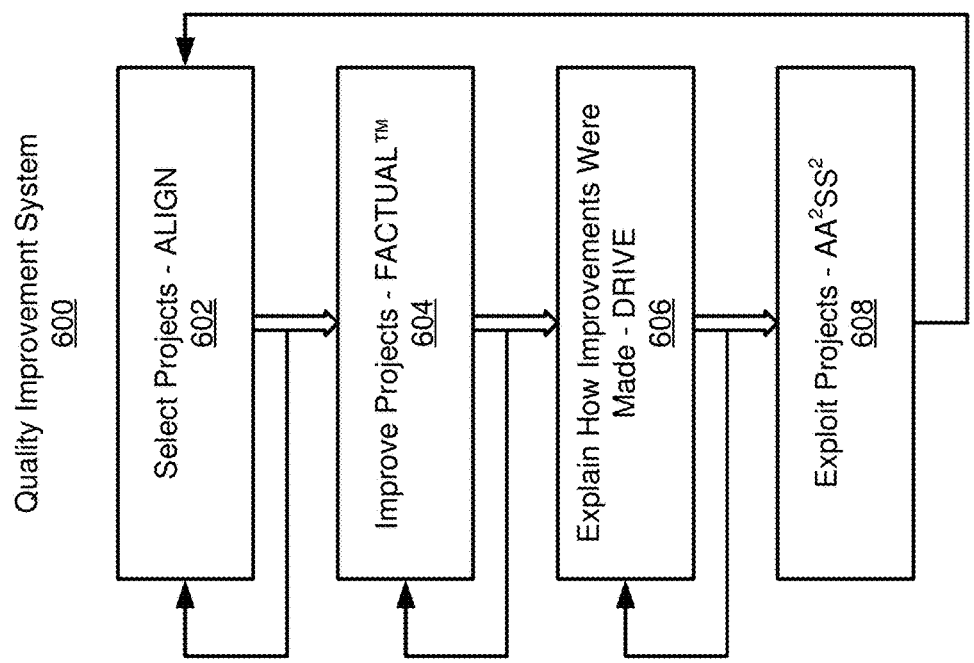
FIG. 6 is a schematic diagram illustrating feedback loops for a quality improvement system comprising the ALIGN, FACTUAL™ process, DRIVE, and $AA^2SS^2$ processes.

FIG. 6 illustrates a schematic flow chart diagram of a quality improvement system 600. The quality improvement system includes the ALIGN 602, FACTUAL™ 604 process, DRIVE 606, and $AA^2SS^2$ 608 processes. The ALIGN process is implemented to select one or more projects. The FACTUAL™ 604 process is implemented to improve the one or more projects. The DRIVE 606 process is implemented to explain how improvements were made by executing the one or more projects. The $AA^2SS^2$ 608 process is implemented to exploit the one or more projects.

The thick arrows from ALIGN to the FACTUAL™ process, and from the FACTUAL™ process to DRIVE, and from DRIVE to $AA^2SS^2$ provide feedback throughout the quality improvement system 600. These arrows indicate feedback from a prior step feeding into the next step.

The thin arrows from the ALIGN-FACTUAL™ process feedback loop to the ALIGN 602 process; and from FACTUAL™-DRIVE process feedback loop to the FACTUAL™ 604 process; and from the DRIVE-$AA^2SS^2$ feedback loop to the DRIVE 606 process; and from the $AA^2SS^2$-

ALIGN feedback loop to the AA²SS² 608 process, and to the ALIGN 602 process indicate feedback on the entire quality improvement system. These feedback loops begin at the end of a process and feed back to the beginning of the quality improvement system 600.

FIGS. 7-10 illustrate further processes and feedback loops implemented by the quality improvement system 600. The feedback loops illustrated with thick arrows, and the feedback loops illustrated with thin arrows, are representative of the same types of data process flows illustrated in connection with FIG. 6.

Figure 7:
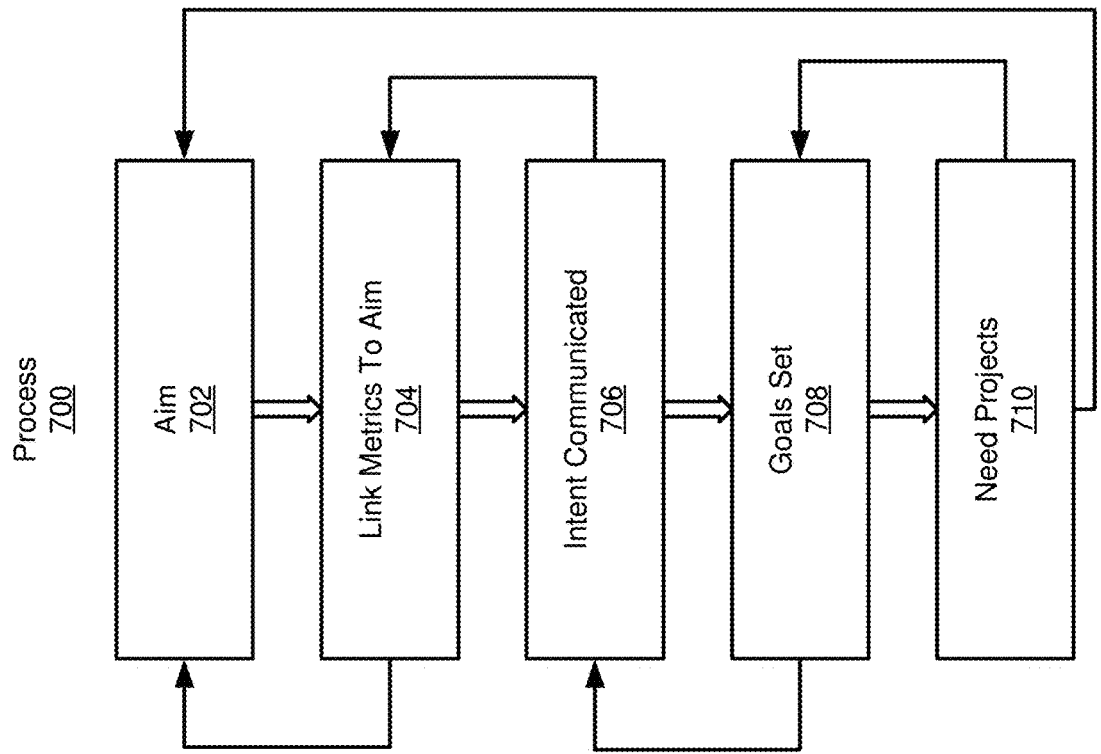
FIG. 7 is a schematic diagram illustrating feedback loops for the ALIGN process.

FIG. 7 illustrates a schematic flow chart diagram of a process 700. The process 700 includes aim 702, link metrics to aim 704, intent communicated 706, goals set 708, and need projects 710. The aim 702 step funnels down to metrics. The metrics are the focus of the improvement. The biggest projects are spit out at the end. The link metrics to aim 704 step may be performed on multiple metrics. When there are more than one metric, the data is normalized to quantify the impact of all metrics using Pareto analysis. The intent communicated 706 step is executed to improve each metric that is communicated to the necessary parties. The goals set 708 step is performed on the cumulative metrics and each individual metrics that have a goal. The run charts indicate how progress is being made toward the goal as complex technical problems show improvement.

Figure 8:
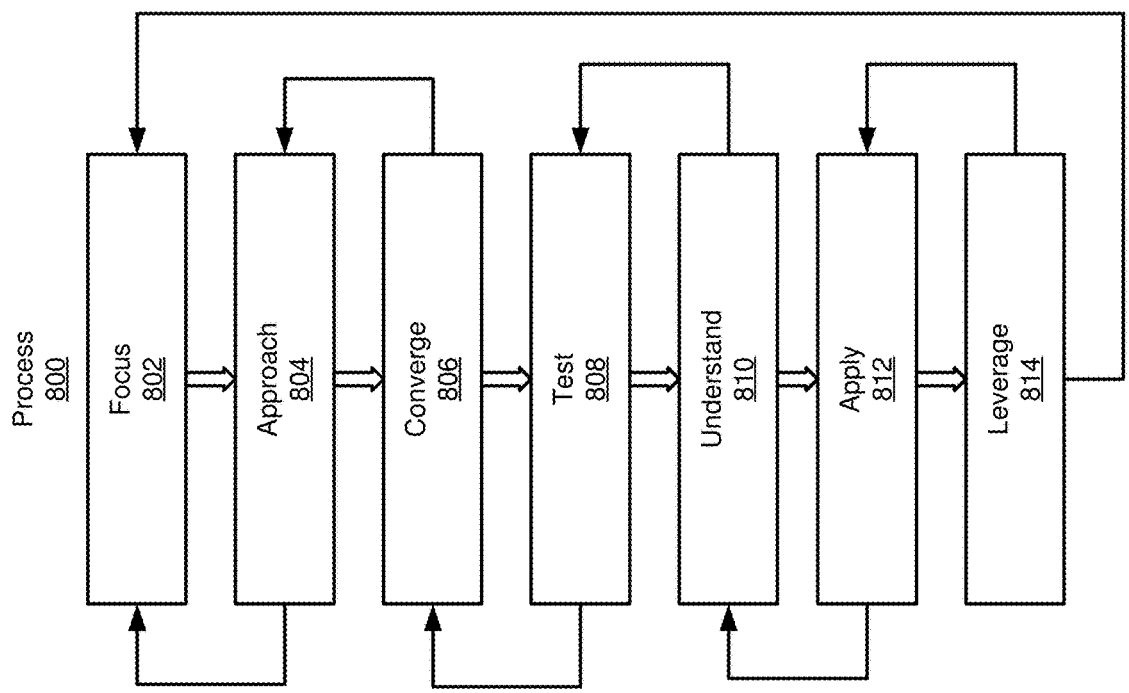
FIG. 8 is a schematic diagram illustrating feedback loops for the FACTUAL™ process.

FIG. 8 illustrates a schematic flow chart diagram of a process 800. The process 800 includes focus 802, approach 804, converge 806, test 808, understand 810, apply 812, and leverage 814.

Figure 9:
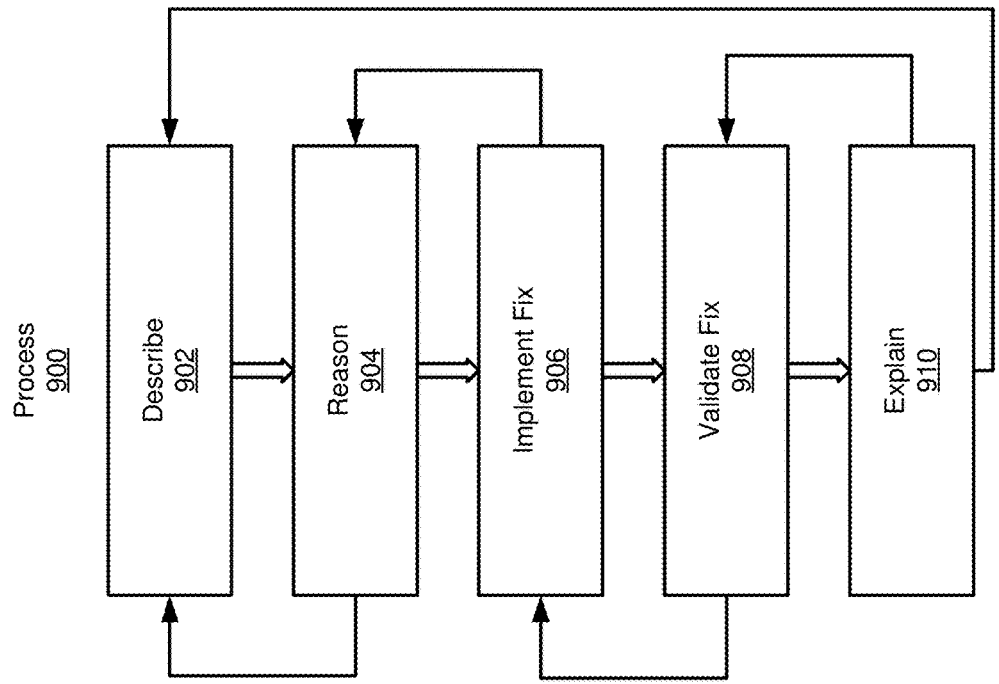
FIG. 9 is a schematic diagram illustrating feedback loops for the DRIVE process.

FIG. 9 illustrates feedback loops for executing and improving the standard work matrix 300. As illustrated in FIG. 9, the reason 904 step includes a feedback loop to the describe step 902; the implement fix 906 step includes a feedback loop to the reason 904 step; the validate fix 908 step includes a feedback loop to the implement fix 906 step; the explain 910 step includes a feedback loop to the validate fix 908 step; and the explain 910 step includes a feedback loop to the describe step 902. The feedback loop captures updated metric data pertaining to the process of the standard work. The updated metric data is provided by way of the feedback loop and is further analyzed for (a) determining whether the one project meets a threshold; and (b) identifying the next five projects and/or 50 projects to be implemented in the standard work.

Figure 10:
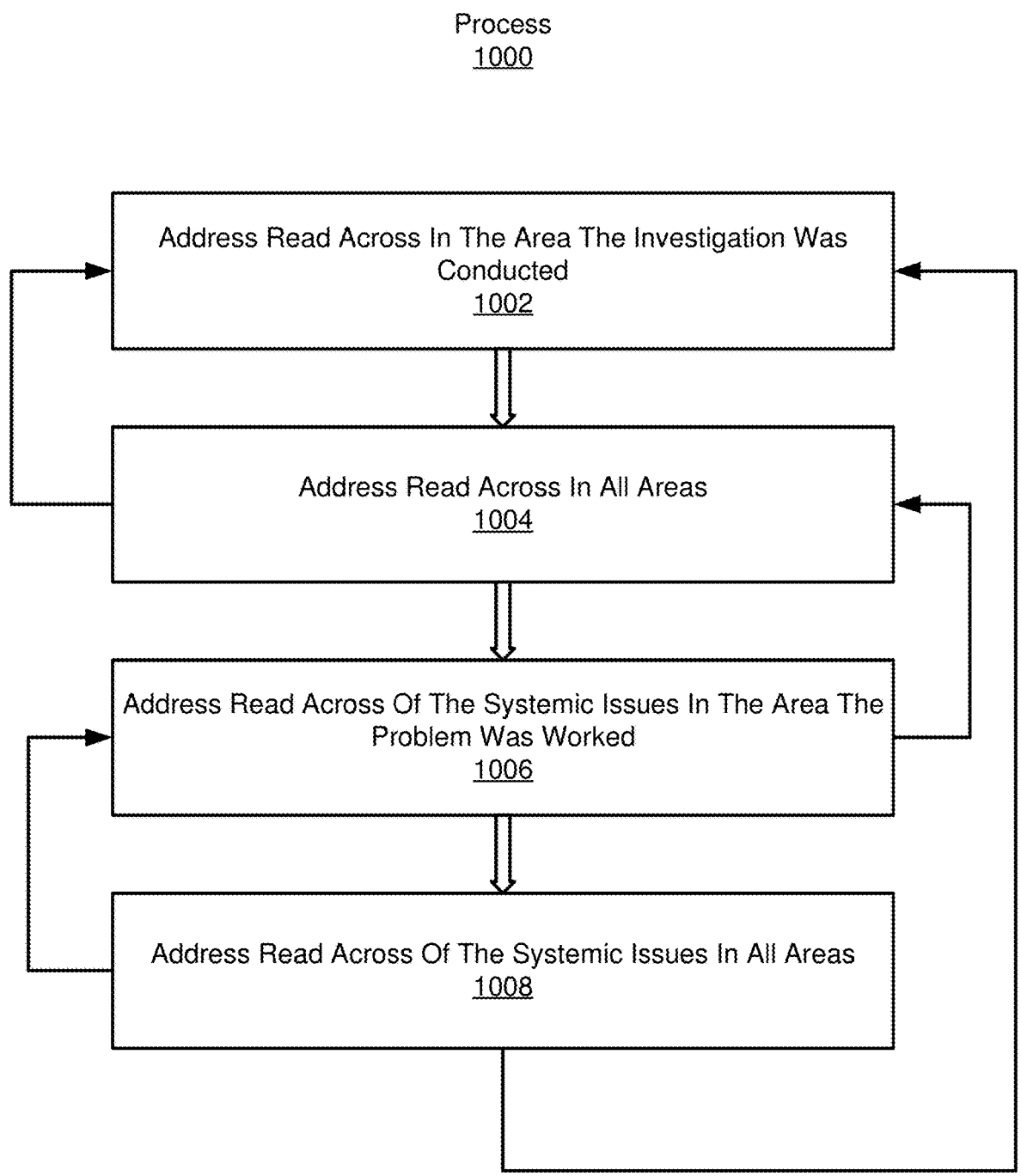
FIG. 10 is a schematic diagram illustrating feedback loops for the $AA^2SS^2$ process.

FIG. 10 illustrates a schematic flow chart diagram of a process 1000. The process 1000 includes addressing at 1002 read across in the area the investigation was conducted and addressing at 1004 read across in all areas. The process 1000 includes address at 1006 read across of the systemic issues in the area the problem was worked. The process 1000 includes addressing at 1008 read across of the system issues in all areas. There exists a feedback loop from step 1004 to step 1002, and from step 1006 to step 1004, and from step 1008 to step 1006, and from step 1008 to step 1002.

Figure 11:
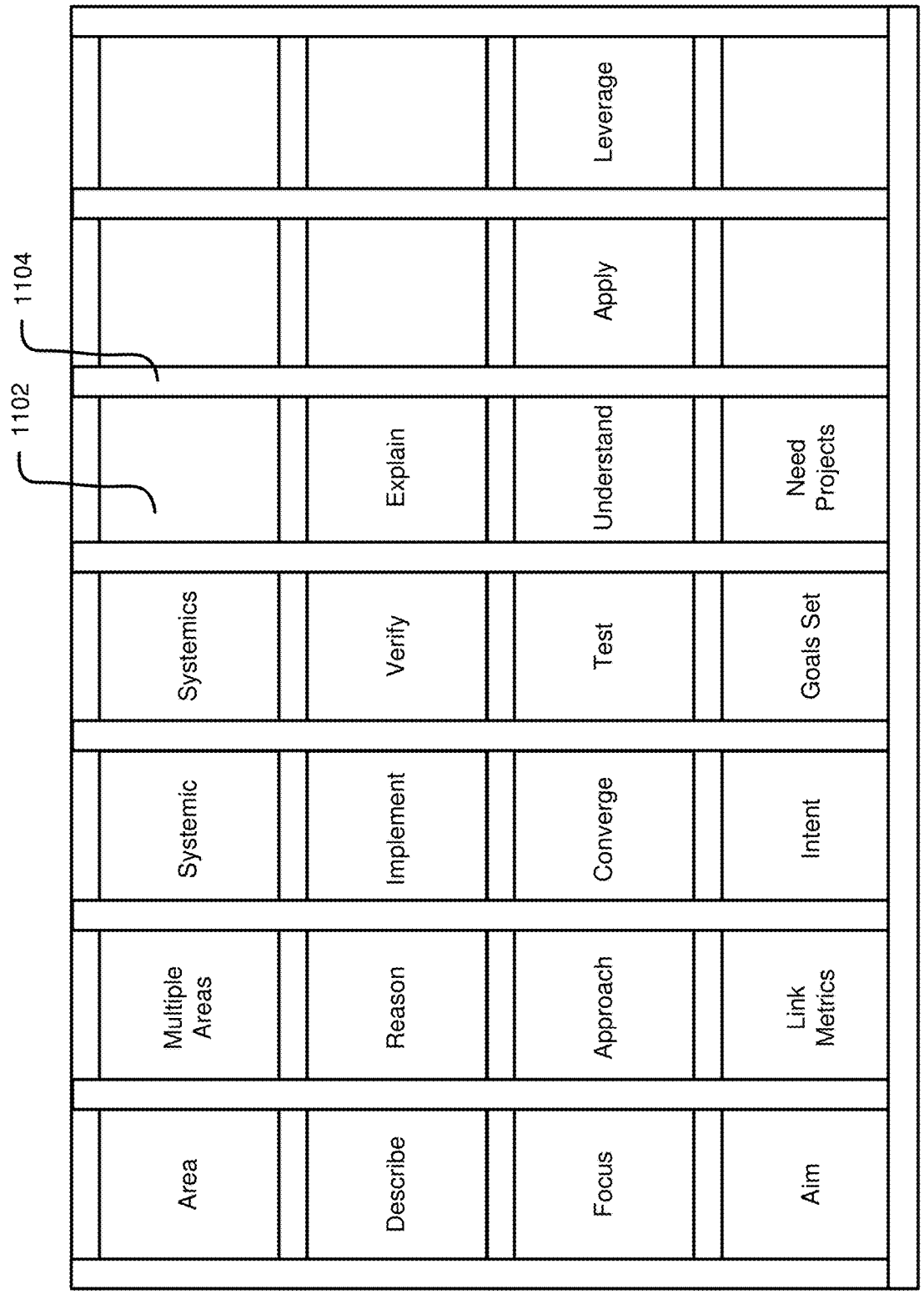
FIG. 11 is a schematic block diagram illustrating a brick and mortar foundation for implementing and improving a standard work.

FIG. 11 illustrates a block diagram of a system for implementing and improving a standard work. The blocks in FIG. 11 represent bricks 1102 and the bars represent mortar 1104. The bricks 1102 and mortar 1104 combine to create a system that is stronger than either of the bricks 1102 or mortar 1104 alone.

FIG. 11 is a further illustration of the standard work matrix 300 described in connection with FIGS. 3A-3G. FIG. 11 illustrates bricks being laid for each of four processes. The bottom row of the bricks illustrates the project selection process, namely, ALIGN. The next row shows steps (bricks) for the project improvement process, namely, the FAC-TUAL™ process. Each of the rows of bricks is associated with an acronym. The bottom row is the first acronym or process in the quality improvement system.

Mortar consists of sand, cement, and water. The sane (A) is the coach. The cement (B) is the sponsor, and the engineer (C) is the water. When mixed in the correct proportion, mortar can be created. When mortar dries, it is as strong as the bricks. There are seven combinations, including: A=sand; B=cement; AB=sand and cement (grey sand); C=water; AC=sand and water (wet sand); BC=cement and water (grey sludge); and ABC=sand and cement and water (mortar). The ingredients in the mortar are the team members. The cement is analogized to the coach; the sand is analogized to the sponsor; and the water is analogized to the team lead. When the mortar dries, the strength is as strong as the bricks.

A computer-implemented program serves as a visual aid similar to the standard work matrix 300 illustrated in FIGS. 3A-3G. The computer-implemented program illustrates brick-by-brick and row-by-row. The depths of the bricks are illustrated in connection with the oneFiveFIFTY™ process deployment. The mortar between the bricks represents CHANGE.

FIG. 12 illustrates a schematic block diagram including information about steps within the FACTUAL™ process. The FACTUAL™ process includes Focus, Approach, Converge, Test, Understand, Apply, and Leverage. The exit criteria for the Focus step is the extreme parts defined, and the sponsor questions are directed to the business impact of the project. The exit criteria for the Approach step includes passing the Isoplot® system, and the largest contrast defined using the strategy diagram. The sponsor question for the Approach step are directed to the discrimination ratio and whether the individual is dedicated full time. The exit criteria for the Converge step include the suspect's guilt supported by rationale, and the sponsor questions are directed to the largest contrast. The exit criteria for the Test step include the experiment passes at the chosen confidence and the sponsor questions are directed to whether an experiment confirmed the Red X® method executed by the Red X® controller at the chosen confidence level. The exit criteria for the Understand step includes determining whether the Red X® method can be controlled to a certain tolerance and further determining whether the Pink X™ FACTUAL™ plan is needed. (Pink X™ is a trademark owned by Shainin II LLC in Northville, Mich.) The exit criteria for the Apply step include the Red X® controller, and otherwise start the KCC FACTUAL™ process investigation. The sponsor questions for the Apply test are directed to whether an irreversible action can be completed. The exit criteria for the Leverage step are three-legged and include five why ends with better detection and systemic problems are fixed. The sponsor questions for the Leverage step are directed to whether effectiveness of the project can be confirmed. The exit criteria for the Leverage step includes determining whether the Green Y® run chart confirms effectiveness. (Green Y® is a registered trademark owned by Shainin II LLC in Northville, Mich.)

FIG. 12 further illustrates exit criteria guidelines for exiting a step that could be part of the selection process (i.e., ALIGN), the improvement process (i.e., FACTUAL™ process), and so forth. The generic terminology (e.g., the selection process, the improvement process, etc.) precedes the specific terminology (e.g., ALIGN, the FACTUAL™ process, etc.). The variable standard work is shown in (SW). Variable standard work can be a process or a system. A team may ask question and there may be additional questions asked by the sponsor to help steer the team.

FIG. 13 illustrates a schematic block diagram of the driving CHANGE self-evaluation matrix. The CHANGE process includes commit, hyper-focus, act, new skills, goals set, and establish new normal. First, the commit step includes defining the standard work, i.e., the "one" project. Then, the commit step includes executing the standard work on the one project. Then, the commit step includes learning the standard work on the "five" projects. Then the commit step includes training the standard work on the five projects. Then the commit step includes advancing the standard work on the "fifty" projects. The hyper-focus step includes implementing the ALIGN, the FACTUAL™ process, DRIVE, $AA^2SS^2$, and CHANGE processes.

Software is leveraged to assign knowledge scores on a scale from 1 (unaware) to 6 (mastered the concept and am sharing it now with others) when you want to do a knowledge check. You can apply the knowledge check on various levels within the system described herein. For example, you can apply the knowledge check on each step or each cell of the control plan. Other information pertaining to a cell can be displayed by clicking on a cell within a user interface. The information within each cell includes: (a) a knowledge score; (b) a specification of which team member owns each specific cell; (c) exit criteria for the cell; (d) an estimated completion date; and (e) a specific help file associated with the cell.

The scoring matrix is implemented by each team member to do a self-evaluation. There are two types of standard work. Constant standard work and variable standard work. Both are deployed using the oneFiveFIFTY™ process. ALIGN selects projects ALIGN(FACTUAL™) process gets specific as to the type of projects. The FACTUAL™(FACTUAL™) process gets specific as to the methodology used to make improvements. The DRIVE(FACTUAL™) process is used to explain how project improvements were done. The $AA^2SS^2$(FACTUAL™) process is used to explain how findings will be exploited.

Figure 14:
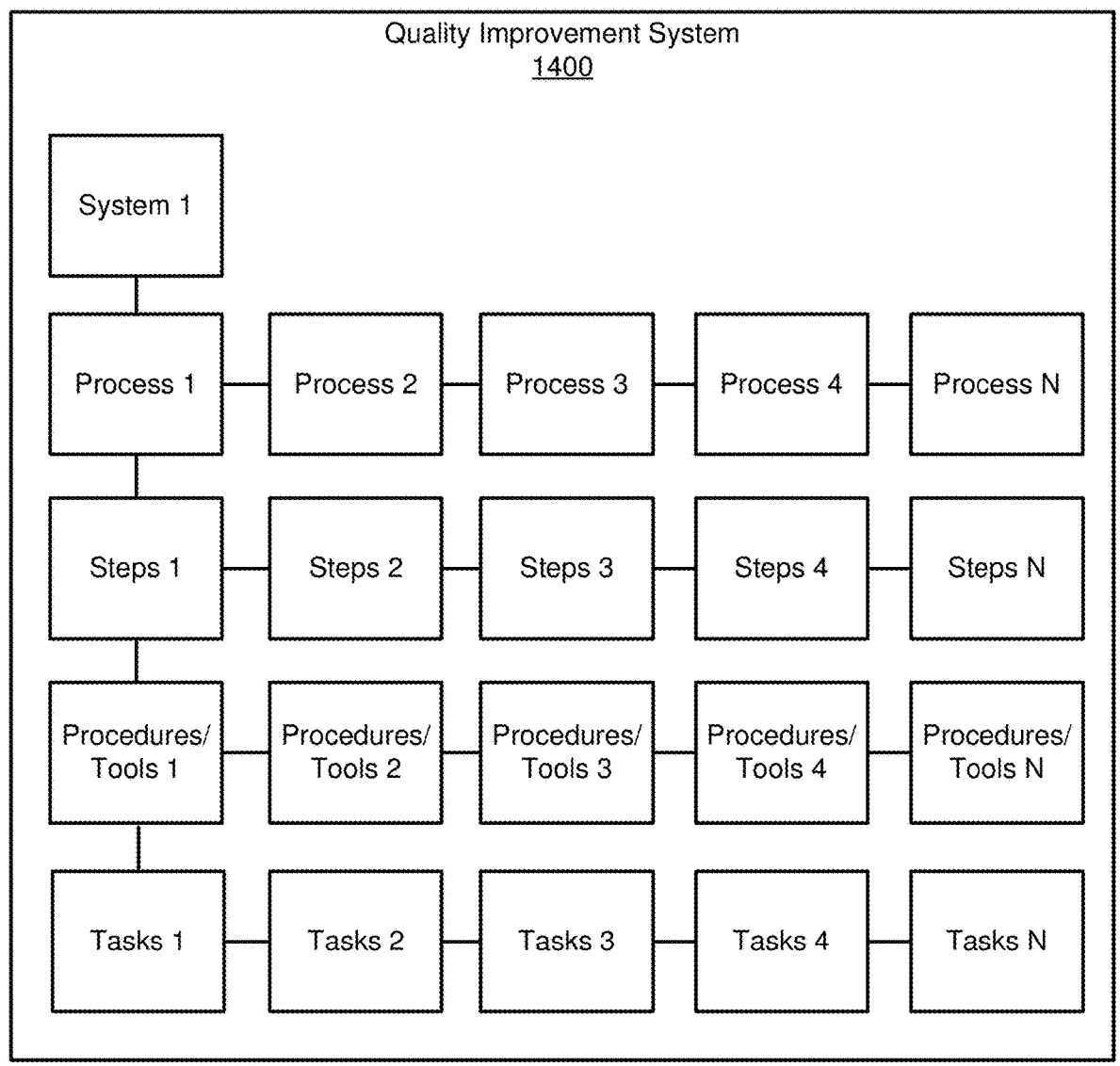
FIG. 14 is a schematic block diagram of a quality improvement system including a system comprising multiple processes, wherein a process includes numerous steps, wherein a step includes numerous procedures and tools, and wherein a procedure or tool includes numerous tasks.

FIG. 14 illustrates a schematic block diagram of quality improvement system 1400. The quality improvement system begins with System 1, and System 1 breaks down to four or more processes, including Process 1, Process 2, Process 3, Process 4, and Process N. Each of the processes breaks down into four or more steps. For example, Process 1 breaks down into Steps 1, Steps 2, Steps 3, Steps 4, and Steps N. Each of the steps breaks down into four or more procedures and tools. For example, Steps 1 breaks down into Procedures/Tools 1, Procedures/Tools 2, Procedures/Tools 3, Procedures/Tools 4, and Procedures/Tools N. Each of the procedures and tools breaks down into four or more tasks. For example, Procedures/Tools 1 breaks down into Tasks 1, Tasks 2, Tasks 3, Tasks 4, and Tasks N.

FIG. 15A illustrates a schematic block diagram of a system for implementing feedback loops in a standard work execution. The feedback loop includes providing a process input 1 into process 1 and receiving the process output 1 from process 1. The process output 1 is converted into the process input 2 for process 2. The process output 2 is converted into a process input 3 for process 3, and so forth. Therefore, the output from a proceeding process is used as the input for the next, subsequent process.

FIG. 15B illustrates a schematic block diagram of a system for implementing feedback loops in a standard work execution. The feedback loop includes providing a step 1 input into the step 1 and receiving a step 1 output. The step 1 output is used as the input for step 2. The step 3 output is used as the input for step 3. The step 3 output is used as the input for step 4, and so forth.

Figure 16A:
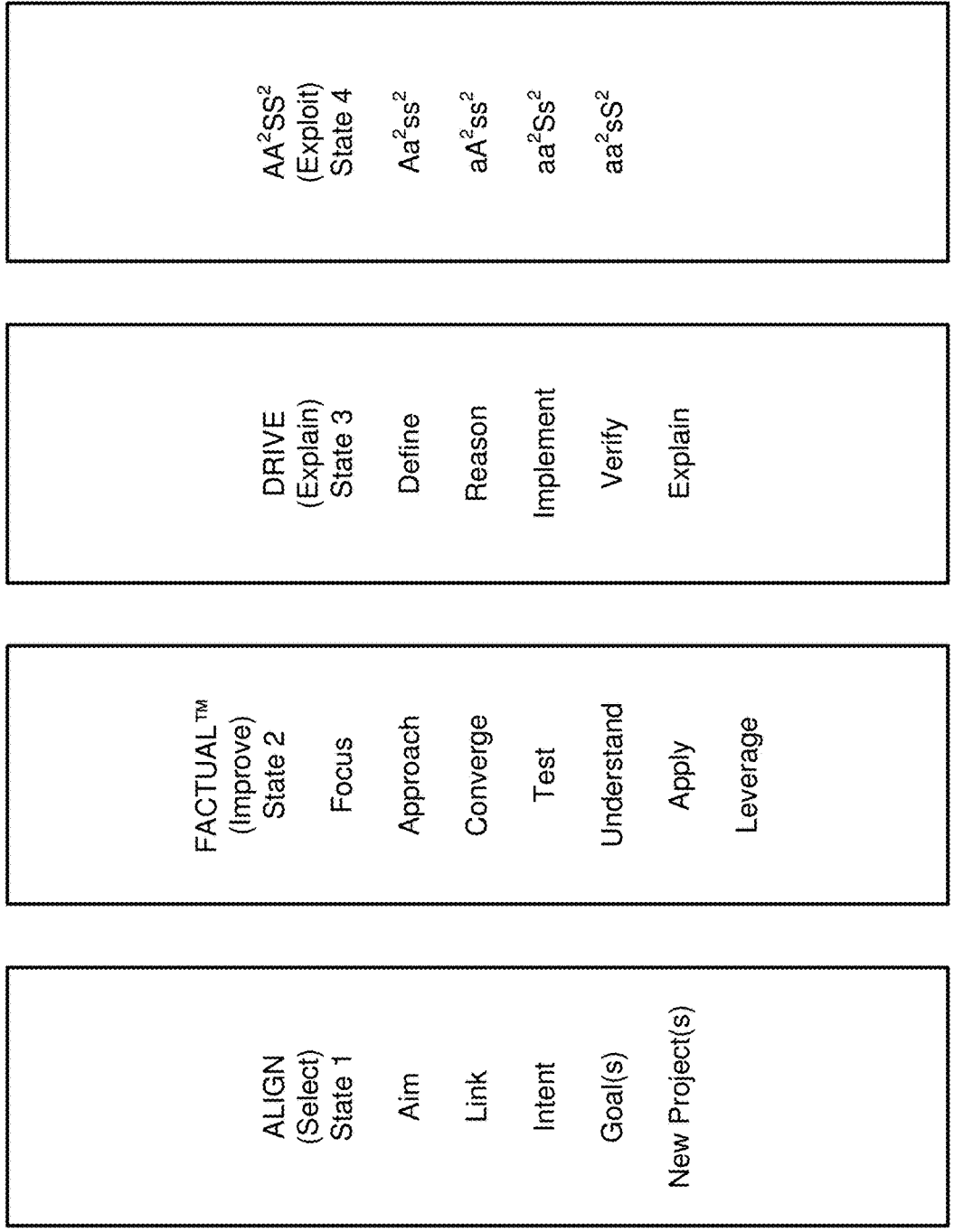
FIG. 16A is a schematic block diagram illustrating the steps for the ALIGN, FACTUAL™ process, DRIVE, and $AA^2SS^2$ processes for implementing and improving a standard work.

FIG. 16 illustrates four processes for improving execution of a standard work. The first state is ALIGN, the second state is the FACTUAL™ process, the third state is DRIVE, and the fourth state is $AA^2SS^2$. ALIGN includes aim, link, intent, goals, and new projects. The FACTUAL™ process includes focus, approach, converge, test, understand, apply, and leverage. DRIVE includes define, reason, implement, verify, and explain. $AA^2SS^2$ includes $Aa^2ss^2$, $aA^2ss^2$, $aa^2Ss^2$, and $aa^2sS^2$.

FIG. 17 is a block diagram of the RECOVER method, including the input, process, and output. The first input is denial, and this leads to the process of receiving help and acknowledging a problem. The output of this process is treatment. The second step is taking medication, and this input leads to the process of ending non-compliance with taking medication. The output of this process is ending the bipolar extreme. The input for the third step is beginning to function and this leads to the process of caring for individuals. The output of this process is thinking of others rather than the self. The fourth input is venturing out and this feeds into the process of outlining a schedule. The output of this process is seeing improvement. The fifth input is looking for things to do, and this input feeds into volunteering. The output of volunteering is meeting a group and identifying needs to interact. The sixth input is searching for purpose, and this input feeds into the process of establishing purpose. The output of establishing purpose is that purpose leads to action. The seventh input is developing a desire to race again and this feeds into the process of returning to a known skill. The output of returning to a known skill is mastering and sharing the skill.

FIGS. 18A-18D illustrate feedback processes for the ALIGN, the FACTUAL™ process, DELTA, and $AA^2SS^2$ processes, respectively. FIG. 18A illustrates the select process 1810, including the inputs, processes, and outputs for executing the select process 1810. The "select process" is the generic of the ALIGN process. The ALIGN process includes aim, link, intent, goals, and new projects. The output of a prior process is the input for the next process. FIG. 18B illustrates the improve process 1820. The "improve process" is the generic of the FACTUAL™ process. The FACTUAL™ process includes focus, approach, converge, test, understand, apply, and leverage. FIG. 18C illustrates the explain process 1830. The "explain process" is the generic of the DELTA process. The DELTA process includes define, reason, implement, verify, and explain. FIG. 18D illustrates the exploit process 1840. The "exploit process" is the generic of the $AA^2SS^2$ process.

FIG. 19 is a block diagram of a standard work catalog. The standard work catalog includes numerous methods-acronyms for improving execution of a standard work and/or developing a standard work standard work matrix. The acronyms each have a meaning and outline certain steps corresponding with the acronym letters.

The FACTUAL™ method is based on facts and includes the steps of focus, approach, converge, test, understand, apply, and leverage. The DELTA method is implemented to make a difference and includes the steps of define, execute, learn, train, and advance. The ALIGN method is implemented to align project with the aim and includes the steps of aim, link metrics to aim, intent communicated, goals set, and need projects. The CHANGE method is implemented to drive change and includes the steps of commit, hyper-focus, act, new skills, get results, and establish new normal. The DRIVE method is implemented to drive read across and includes the steps of define the problem and reason determined. The AA²SS² method is implemented to deploy read across and compounding and includes the steps of address read across in the area the investigation was conducted, address read across in all areas, address read across of systemic issues in the area the problem was worked, and address read across of system issues in all areas. The PUSH Cycles methods is implemented to push to perform and includes the steps of perform, understand, share, and hope. The oneFiveFIFTY™ method is implemented for scaled deployment and includes executing methods on one project, five projects, and fifty projects. The RECOVER method is implemented to manage mental illness and includes the steps of receive help, exhibit compliance, care for others, outline scheduling plan, volunteer, establish purpose, and return to what you know. The GIFTED method is implemented to capitalize on dyslexic gifts and includes the steps of gifts defined, ingenuity to overcome, focus on mastering gifts, teaching everyone the gifts, establishing a new normal, and disruptive technology. The PLEASE method is implemented for training material to a small group and includes the steps of pray, love, equip, accept, salvation, and eternal.

Figure 20:
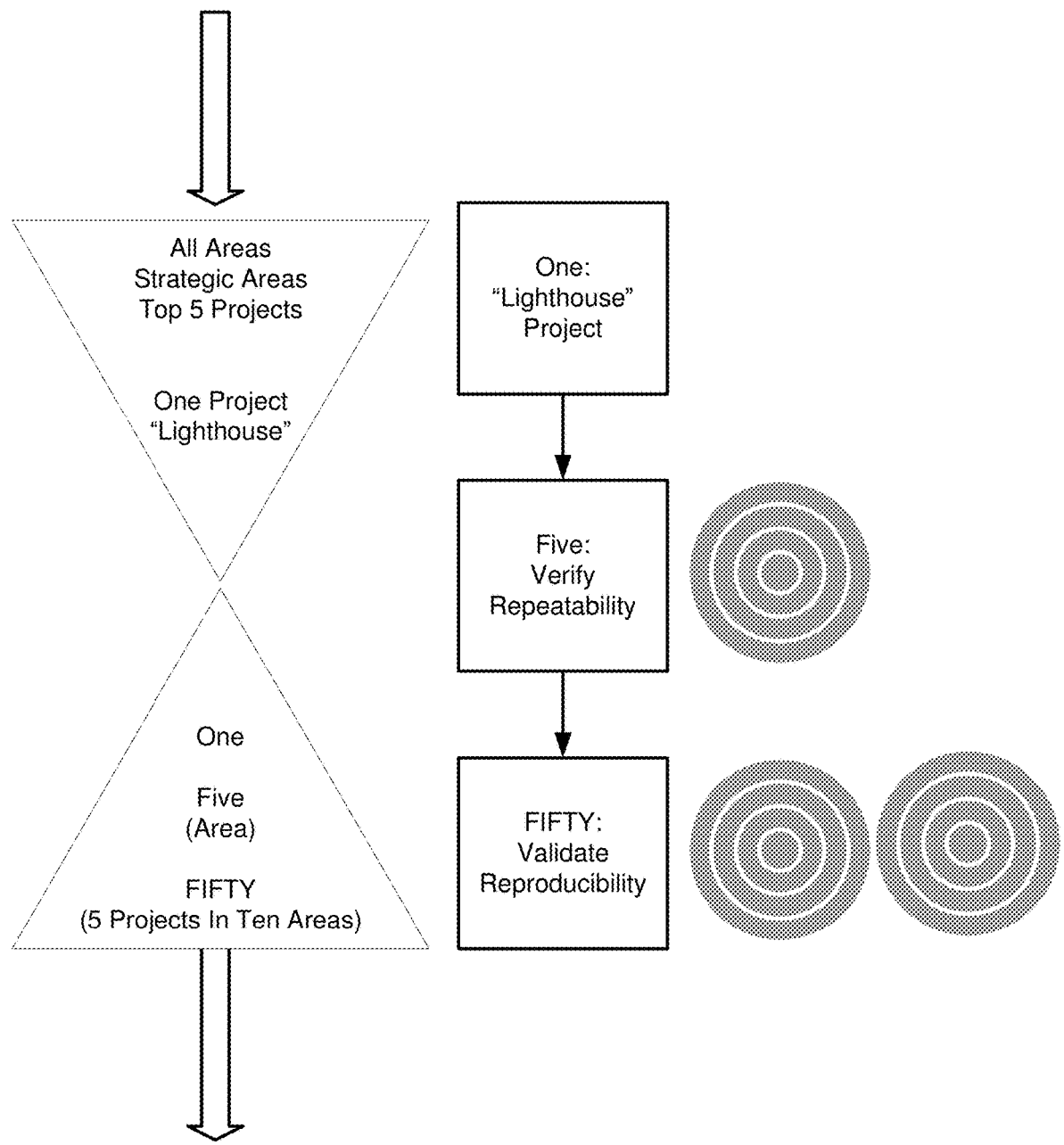
FIG. 20 is a diagram illustrating the data and processing flow for implementing and improving a standard work with the oneFiveFIFTY™ process flow.

FIG. 20 is a schematic diagram illustrating data and processing flow between different projects within the standard work matrix 300. The standard work matrix 300 is executed on all strategic areas and a top five projects are identified. Further, a single "lighthouse project" or end-goal is identified, and the top five projects are all executed in furtherance of the lighthouse project. The one lighthouse project feeds into five projects. And the execution of those five projects is analyzed to verify repeatability. Then, fifty projects are executed to validate reproducibility. The one lighthouse project feeds into five project areas, and the five project areas lead to fifty projects, which include five projects in ten areas.

Figure 21:
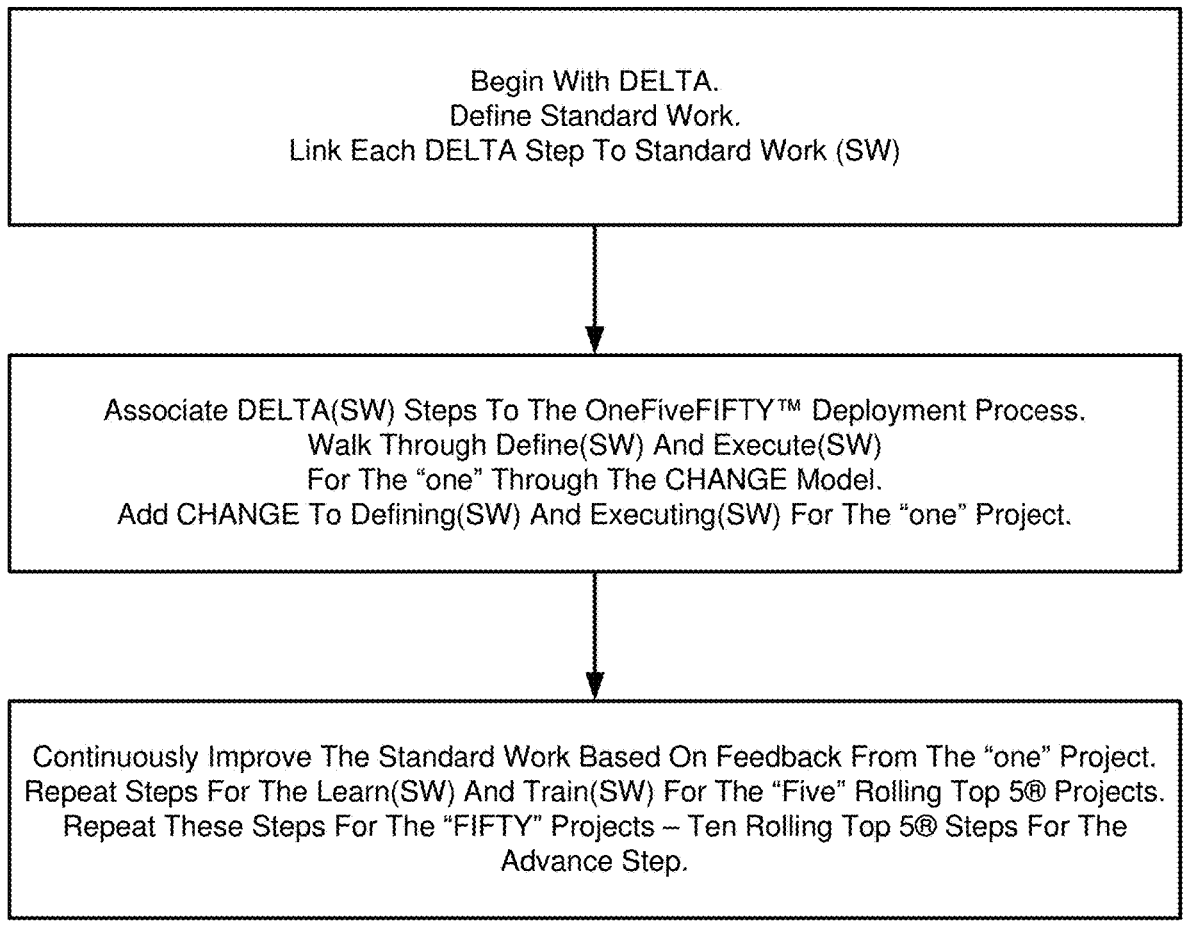
FIG. 21 is a schematic flow chart diagram of a method for executing a standard work matrix beginning with the DELTA process.

FIG. 21 is a schematic flow chart diagram of a method for improving a standard work. The method begins with the DELTA method, which includes defining a standard work and linking each DELTA step to the standard work. The method continues with associating the DELTA(Standard Work) ("SW") steps to the oneFiveFIFTY™ deployment process. This includes walking through Define(SW) and Execute(SW) for the one project through the CHANGE model. Then, the CHANGE method is added to Defining (SW) and Executing (SW) for the one project.

The method continues and the standard work is continuously improved based on feedback from the one project. The steps from Learn(SW) and Train(SW) for the Rolling Top 5® projects are repeated. The steps for the FIFTY projects (the ten Rolling Top 5® projects) are repeated for the advance step.

A system is a standard work and a process within the system is standard work. A step within a process is standard work and a procedure within a step is standard work. A task within a procedure is standard work. The "unaware to share" knowledge measurement system can be used for every level of standard work and has software applications.

Figure 22:
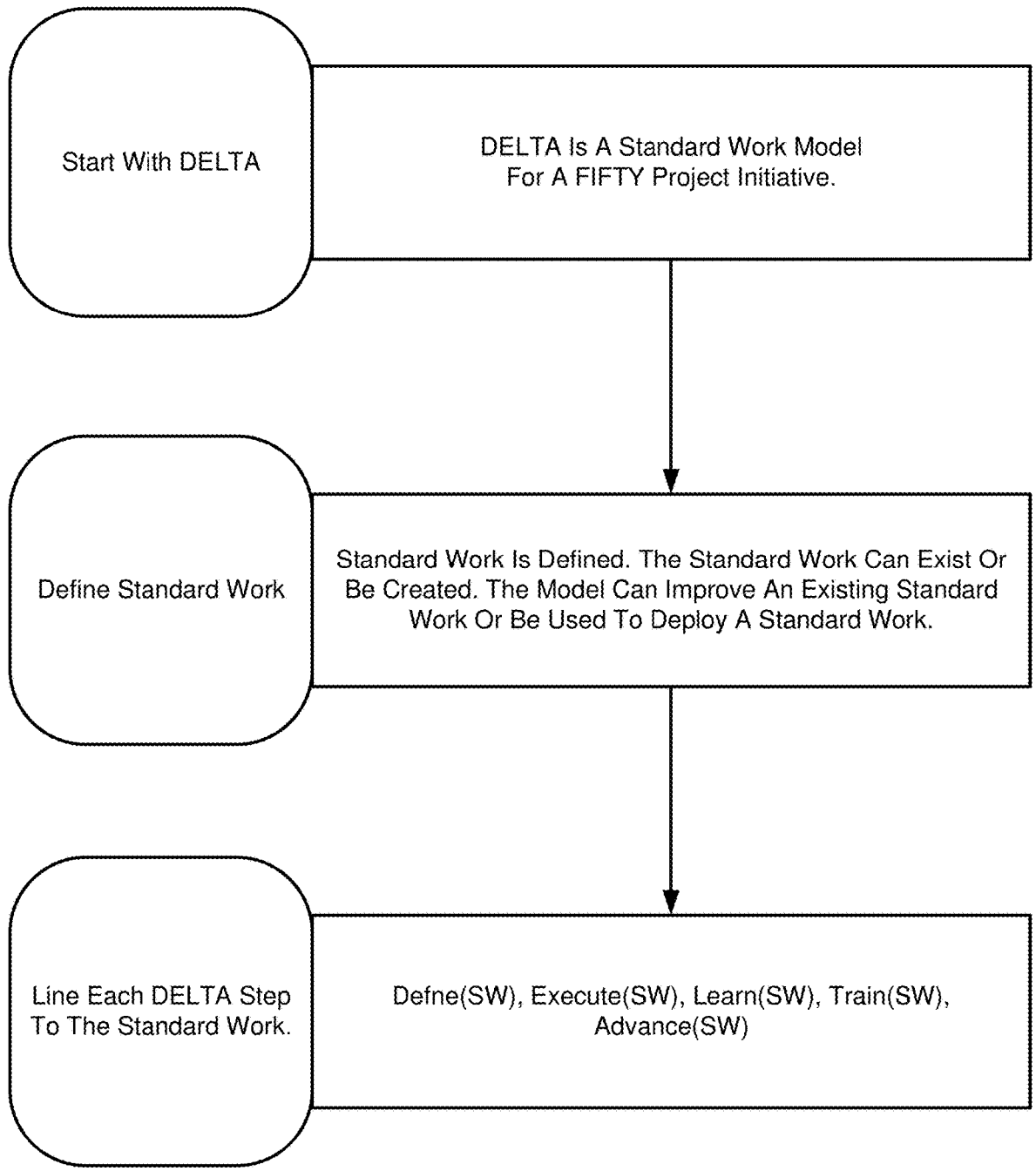
FIG. 22 is a schematic flow chart diagram of a method for executing a standard work matrix beginning with the DELTA process.

FIG. 22 is a schematic flow chart diagram of a method for executing and improving a standard work. The method begins with DELTA. DELTA is a standard work model for a fifty project initiative. The method continues and the standard work is defined. The standard work can exist or be created. The model can improve an existing standard work or be used to deploy a standard work. The method continues and each DELTA step is linked to the standard work. The Define(SW), Execute(SW), Learn(SW), Train(SW), and Advance(SW) steps are executed.

Figure 23:
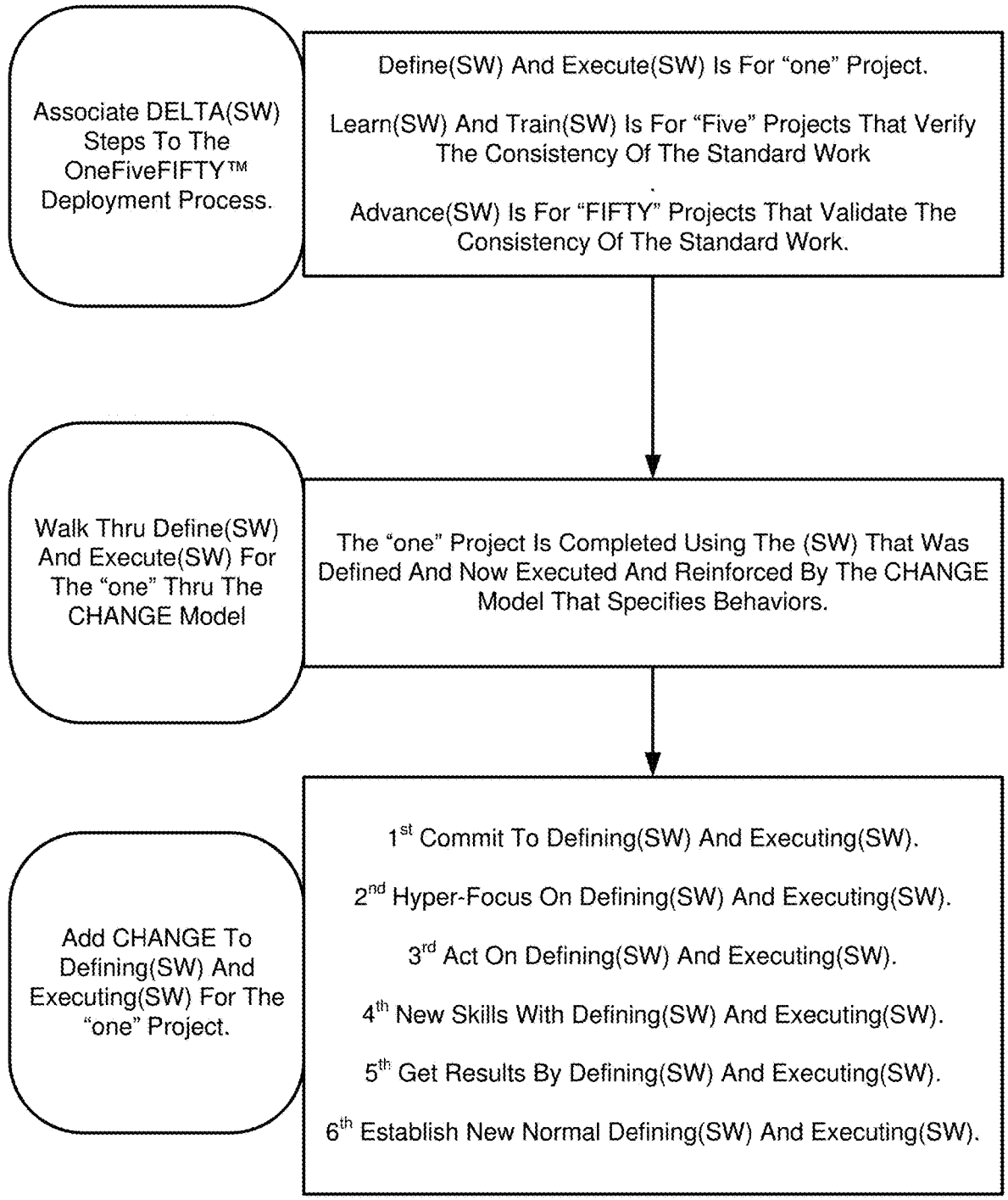
FIG. 23 is a schematic flow chart diagram of a method for executing a standard work matrix beginning with the DELTA process.

FIG. 23 is a schematic flow chart diagram of a method for executing and improving a standard work. The method includes associated DELTA(SW) steps to the oneFiveFIFTY™ deployment process. This includes executing Define(SW) and Execute(SW) for the one project. This further includes executing Learn(SW) and Train(SW) for the five projects that verify the consistency of the standard work. This further includes executing the Advance(SW) step for the fifty projects that validate the consistency of the standard work.

The method continues and includes walking thru the Define(SW) and Execute(SW) steps for the one project thru the CHANGE model. This includes completing the one project using the standard work that was defined and now executed and reinforced by the CHANGE model that specifies behaviors.

The method continues and includes adding CHANGE to Define(SW) and Execute(SW) for the one project. This includes first committing to Defining(SW) and Executing (SW). This includes hyper-focusing on Defining(SW) and Executing(SW). This includes acting on Defining(SW) and Executing(SW). This includes generating new skills with Defining(SW) and Executing(SW). This includes getting results by Defining(SW) and Executing(SW). This includes establishing a new normal by Defining(SW) and Executing (SW).

Figure 24:
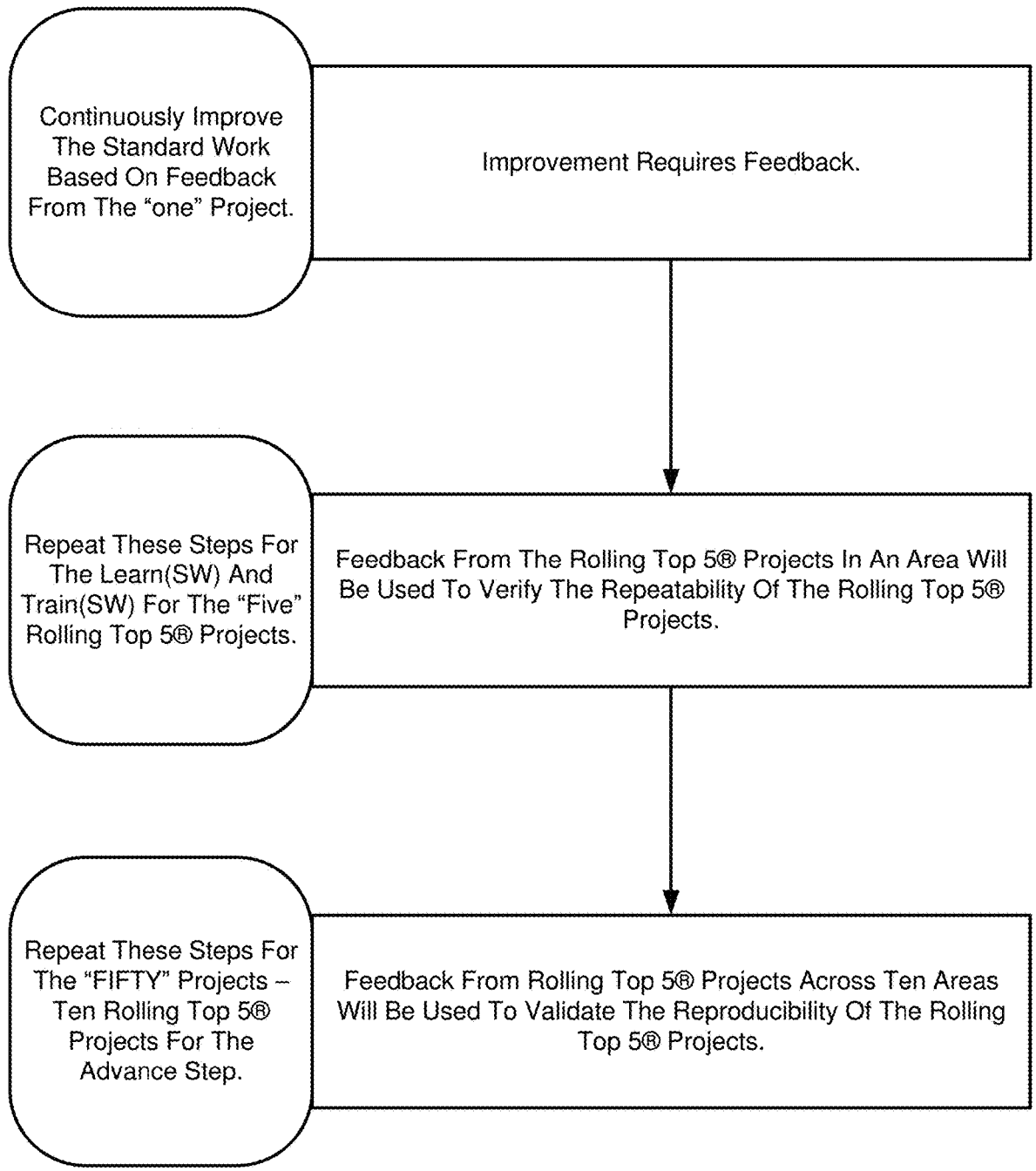
FIG. 24 is a schematic flow chart diagram of a method for executing a standard work matrix beginning with the DELTA process.

FIG. 24 is a schematic flow chart diagram of a method for executing and improving a standard work. The method includes continuously improving the standard work based on feedback from one project. The improvement requires feedback. The method continues and includes repeating steps for the Learn(SW) and Train(SW) for the Rolling Top 5® projects. The feedback from the Rolling Top 5® projects in an area will be used to verify the repeatability of the Rolling Top 5® projects. The method continues and includes repeating these steps for the fifty projects, which includes ten Rolling Top 5® projects for the advance step. The feedback from the Rolling Top 5® projects across ten areas will be used to validate the reproducibility of the Rolling Top 5® projects.

Figure 25:
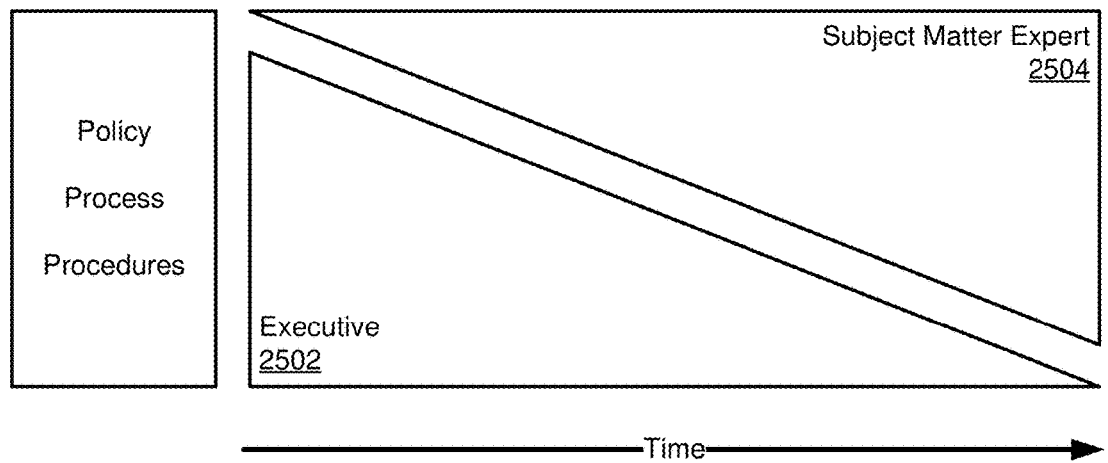
FIG. 25 is a graphical representation illustrating the gradual change of responsibility from an executive to a subject matter expert.

FIG. 25 illustrates an example distribution of work for developing and executing a standard work matrix 300. In some instances, an executive 2502 will input the majority of work for developing policies, processes, and procedures. Over time, a subject matter expert 2504 will take over the bulk of the work developing the policies, processes, and procedures. FIG. 25 specifically illustrates that an executive sponsor's involvement in a process decreases over time while an engineer's involvement in the process increases over time. A sponsor is heavily involved with policy development. For example, one policy for solving complex technical issues is a core competency. An engineer has little to do with policy. For example, a process may implement the FACTUAL™ process to solve complex technical issues. The engineer may follow procedures as they learn and execute the FACTUAL™ process.

Figure 26:
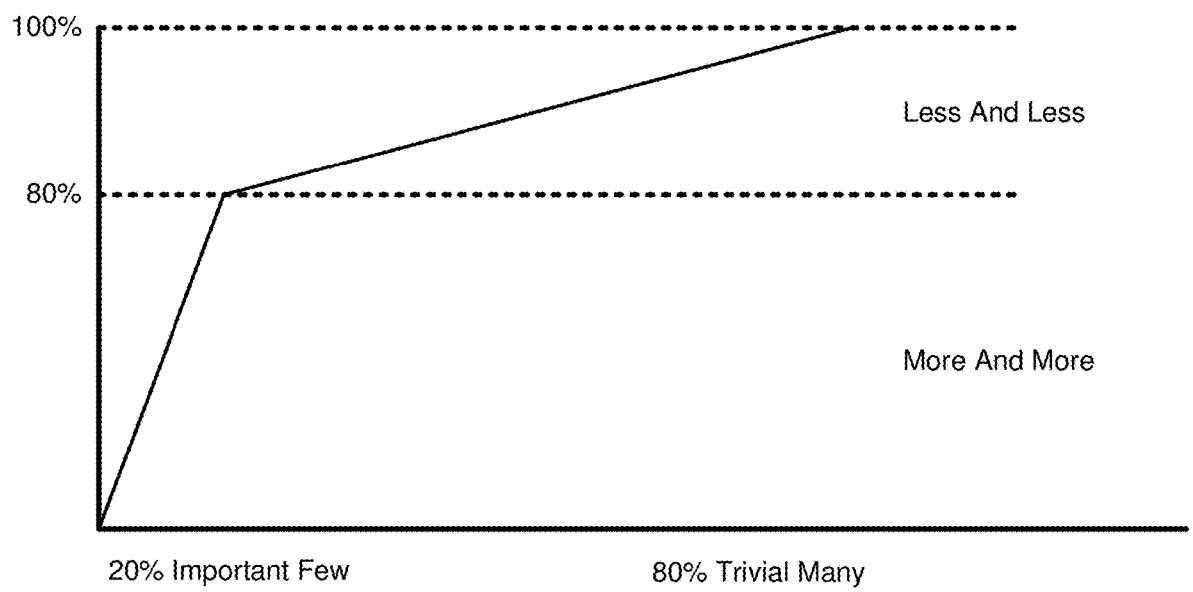
FIG. 26 is a graphical representation illustrating the reduction of waste when passed from the important few to the trivial many.

FIG. 26 is a graphical representation depicting how processes improve when worked upon by the 20% important few versus the 80% trivial many. The graph illustrated in FIG. 26 illustrates the Pareto principle, which is alternatively referred to as the 80:20 rule. The Pareto principle indicates that roughly 80% of issues can be resolved by focusing on the 20% of projects causing the greatest number of issues. The graphical representation illustrates the 80% y-axis line, wherein 20% of projects (up to the 80% y-axis line) constitute the "20% important few." If the important few projects are addressed, then 80% of issues can be resolved. Further, when the 80% trivial many projects are resolved, there is only a 20% reduction in issues. The 20% important few are responsible for causing 80% of the issues, and if the 20% important few are addressed, then most issues will be resolved.

Figure 27:
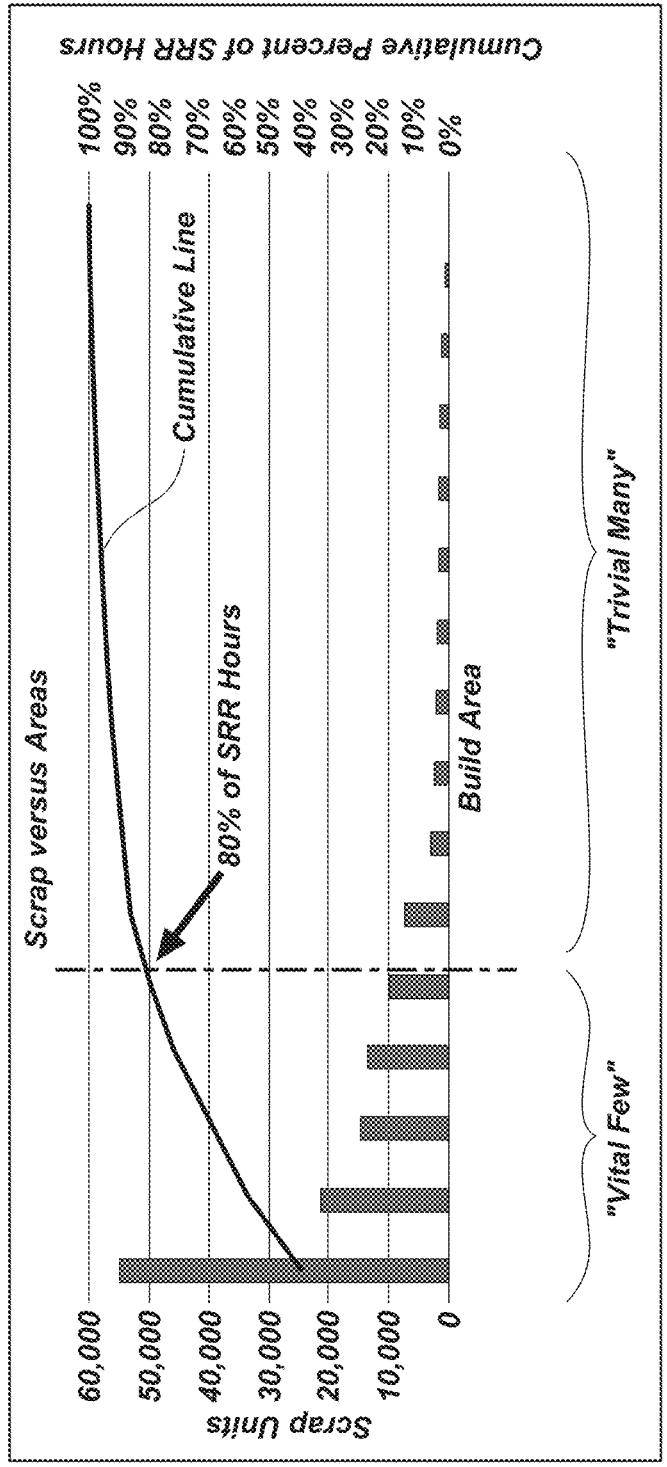
FIG. 27 is a graphical representation of an output by the quantum computer illustrating a Pareto analysis of scrap reduction on a manufacturing facility assembly line.

FIG. 27 is a graphical representation of a feedback analysis output by the quantum computer 122. The data included in the example analysis relates to the time spent on scrap and the scrap units at a manufacturing facility. The analysis includes a cumulative line. The dotted line illustrates the intersection of the cumulative line with 80% of scrap units on the left-hand side of the dotted line and 20% of the scrap units on the right-hand side of the dotted line. The quantum computer 122 calculates the curvature of the cumulative line to identify which projects, and how many projects, should be included in the Rolling Top 5® projects.

The build area on the x-axis includes a number of bars that each refer to a different build area or project within the manufacturing facility. In the case of aircraft manufacturing, the build areas might include, for example, wing systems, flight line, engine, finishing, and so forth. The intersection between the cumulative line and the dotted line is the point where the cumulative line crosses the 80% point on the y-axis (cumulative percent of SRR hours). The bars representing the various build areas or organized based on size, with the bar with the largest area at the front and the bars with the smallest areas at the end. The dotted line (i.e., the point where the cumulative line crosses the 80% y-value) marks the denotation between the 20% vital few and the 80% trivial many. The identification of the vital few and the trivial many follows the 80:20 Pareto principle.

The vital few include five build areas, or projects to be improved upon. The vital few may include five build areas or fewer and does not include more than five build areas. The vital few constitute the Rolling Top 5® projects that the entire manufacturing facility will initially focus on to efficiently improve the overall accumulation of scrap across the entire manufacturing process. The trivial many include any number of build areas, depending on the implementation. The build areas within the trivial many will be ignored, and resources will be funneled to improving the build areas within the vital few. This is the most efficient use of resources and follows the Pareto principle. In some cases, the vital few will include fewer than five build area projects. The vital few does not include more than five build area projects.

The 80:20 rule applies to applications of the Pareto principle. The 80 represents the trivial many and the 20 represents the important few. One can determine if there is an 80% return. If not, one can make improvements until the 80% return is achieved. Application of the Pareto principle to standard work is novel. Standard work is the baseline for improvement. The cumulative line indicates how many projects must be worked to get an 80% return.

Figure 28:
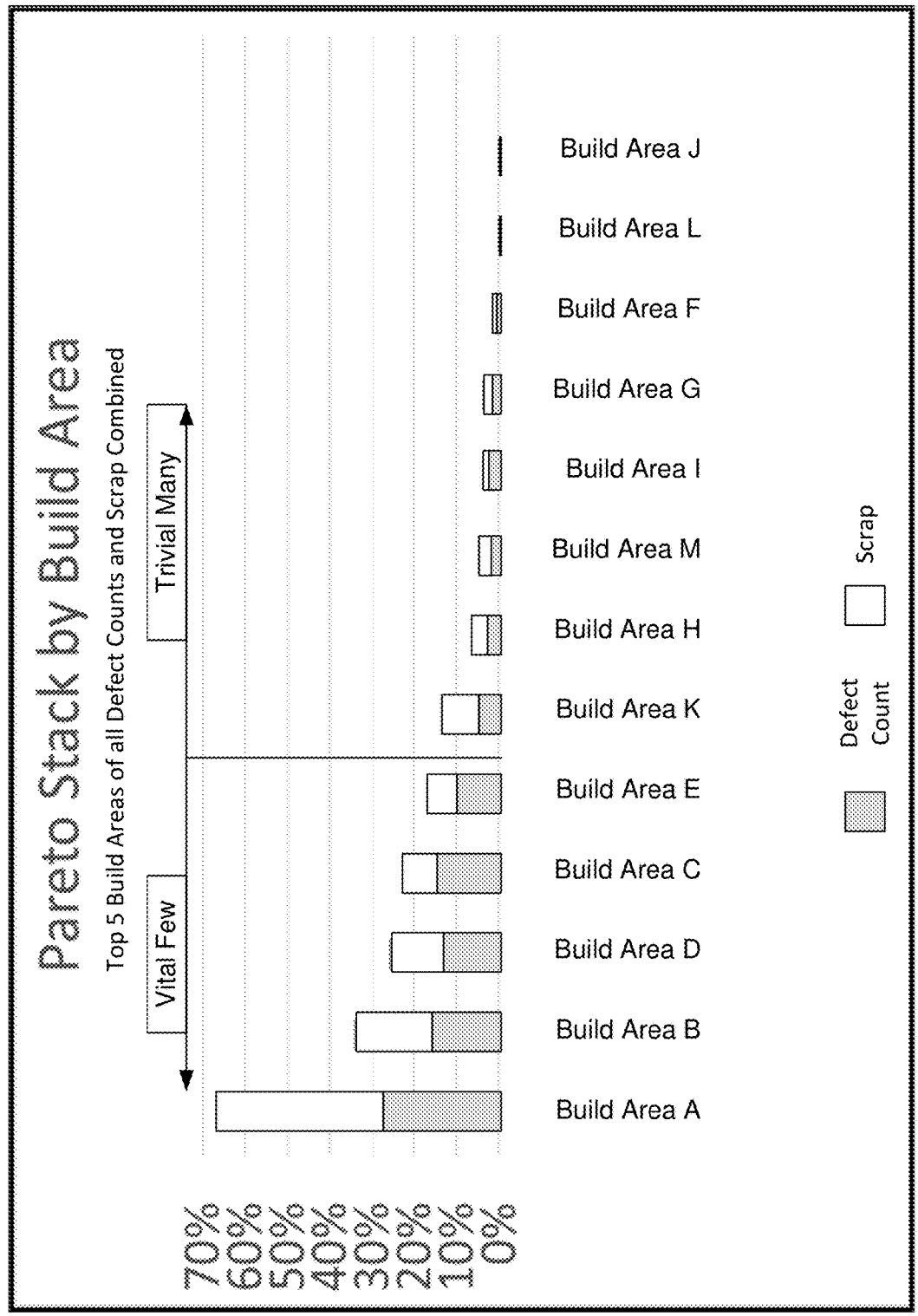
FIG. 28 is a graphical illustration of an output by the quantum computer illustrating analysis of feedback data, with problem build areas organized in descending order.

The Pareto analysis illustrated in FIG. 27 is calculated by the quantum computer 122. In an example implementation, the quantum computer 122 is used by Quality with focus on defects and scrap. The quantum computer 122 is used to calculate the magnitude of defects and scrap across all areas and for each area. The quantum computer 122 allows for stacking metrics, for example, for stacking defects and scrap as illustrated in FIG. 28. The calculations are normalized and placed in percentage format. This is performed because defects and scrap have different units. Defects is a count and scrap is percentage. It is easier to determine the magnitude of defects and scrap when the base is zero. The quantum computer 122 accessed the feedback database. Tools from Tableau™ can be used by the quantum computer 122. The quantum computer 122 may further generate files to be illustrated in other document format types, such as presentation formats and written word document formats.

The graphic illustrates the Pareto principle in a graphical form. The bottom axis indicates that 20% of the projects yield 80% of the results. It is more efficient to focus on the 20% of projects that will yield the greatest results. This is the 80:20 rule. Some call the 20% on the bottom axis the important few while the other 80% are the trivial many. The chart illustrates the biggest problem first, the next biggest problem second, and so forth. The chart further indicates a cumulative line. The cumulative line shows to reach an 80% return with five projects being improved upon.

The Pareto chart can be applied to one or more metrics stacked upon each other, as illustrated in FIG. 27, wherein the SRR hours metric is stacked on top of the defect metric. The systems, methods, and devices described herein illustrate a novel use of the Pareto principle. A system does not have more than seven processes. The seven processes are the "important few" processes. A process does not have more than seven steps. These steps are the "important few" steps. The seven processes and steps are sequential. The logic cascades to the seven "important few" procedures for a step. This logic cascades to the seven "important few" tasks for a procedure.

The Pareto analysis illustrated in FIG. 27 leads to identifying projects system-wide that should be improved upon to reduce inefficiencies, defects, and other issues across the entire system. This can be referred to as identifying system-level projects to bring to the executive conference room. One step includes identifying the Rolling Top 5® projects. A visual aid may be used as needed. The system includes identifying what area the Rolling Top 5® projects were found in. The system includes identifying what type of defect is involved, which includes the quantum computer 122 extracting the defect code based on sums of data. The system includes determining where the defect originated, and ideally this is where the RCCA is executed. The system includes measuring with a gauge that is repeatable and reproducible such as the Isoplot® system or Gage R&R. The system includes transporting information from a database to the quantum computer 122. The charts calculated by the quantum computer 122 are described and include Pareto charts with a cumulative line. The projects are selected across areas not within areas. The top projects for the business are shown. The carts enable visibility into the Rolling Top 5® projects. The status of the RCCARA is shown. Month over month performance defects are shown. The standard reporting is implemented using the DRIVE process and is performed at least weekly. The DRIVE process is used to illustrate a single project. The Rolling Top 5® projects of all the projects is illustrated. The quantum computer 122 analyzes an enormous sum of data that is used for calculations to produce the carts in seconds. The sponsor removes roadblocks to accelerate closing the projects.

FIG. 28 illustrates a graphical representation of an example implementation of a Pareto principle. The graphic specifically illustrates a feedback analysis output by the quantum computer 122. FIG. 28 illustrates the scrap, repair, and rework (SRR) hours combined for each of thirteen build areas along with the defect quantities for the same thirteen build areas. In an example implementation, the build areas are directed to different departments, specialties, tasks, or projects within a manufacturing facility. The build areas are organized in descending order based on which build areas are associated with the greatest quantity of defects and percentage of SRR hours. Build Area D is associated with the greatest percentage of defects and SRR hours and Build Area J is associated with the smallest percentage of defects and SRR hours.

The Rolling Top 5® projects are identified based on the Pareto principle. The Rolling Top 5® projects are within the "strategic" region, and other projects that will not be focused on are within the "day-to-day" region. The Rolling Top 5® projects will be addressed to reduce the greatest number of defects and SRR hours, according to the 80:20 Pareto principle.

Figure 29:
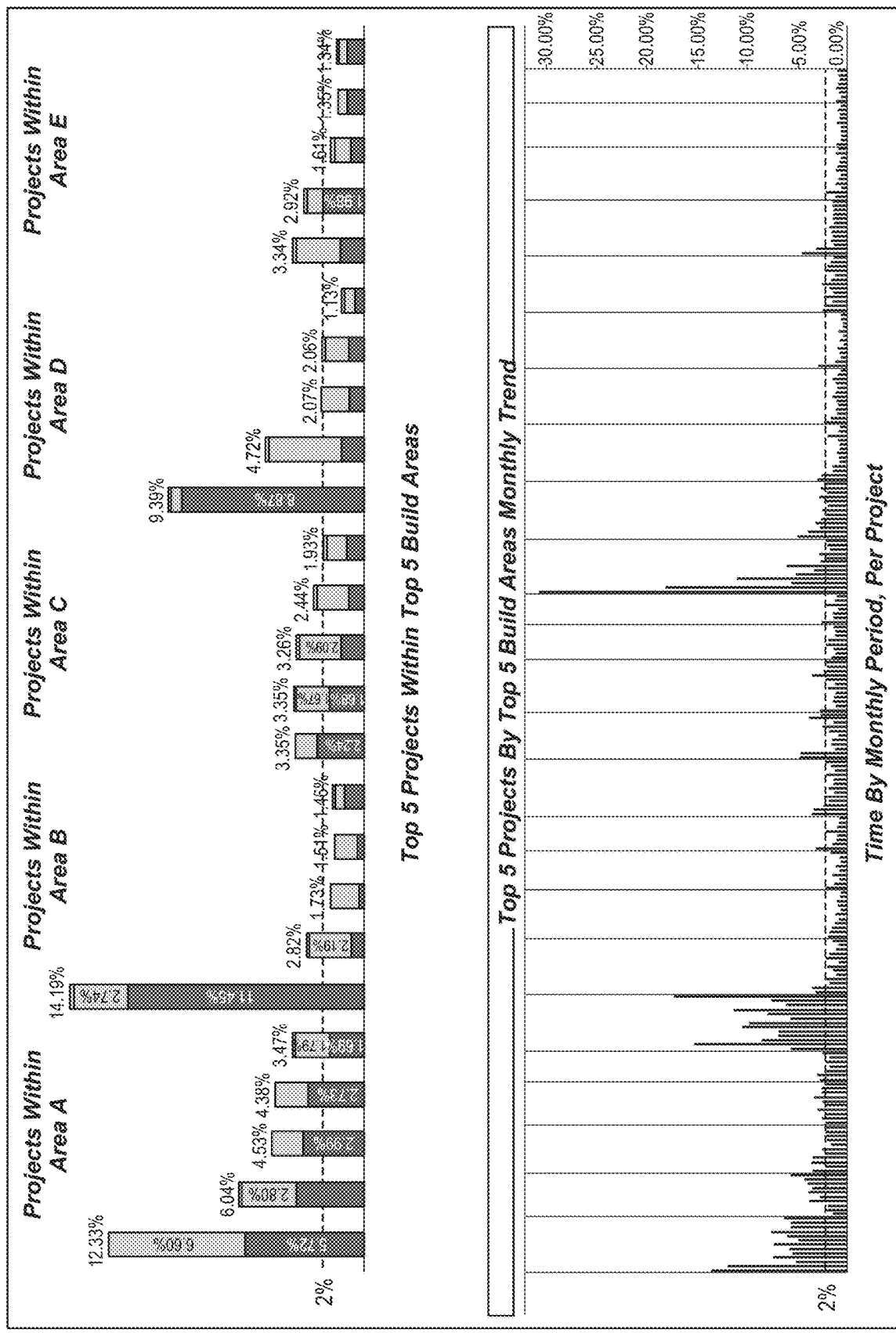
FIG. 29 is a graphical representation of an output by the quantum computer illustrating metrics for various areas across an organization and the projects within those areas.

FIG. 29 is a graphical representation of a feedback analysis output by the quantum computer 122. The feedback analysis includes five example areas, with multiple projects within each area. The five example areas selected for analysis in FIG. 29 are the Rolling Top 5® areas in need of improvement across the organization. Alternatively, all areas across the entire organization are analyzed for improvement. The feedback analysis may apply to manufacturing, wherein each area represents a certain grouping of parts or processes. The example illustrated in FIG. 29 includes Area A, Area B, Area C, Area D, and Area E, although it should be appreciated that the quantum computer 122 can output analysis for any number of areas and projects, as applicable. Each of the areas includes multiple projects. An area may refer to a department, class of work, or other grouping of projects and tasks within the manufacturing system. The project areas have been organized from greatest area (i.e., sum of percentage from metrics) to least area. The monthly defect trend by area indicates the defects for each project over time, organized month-by-month for each project independently.

The 2% line represents a goalpost. The goalpost line may be set at any metric value, and the 2% value illustrated in FIG. 29 is arbitrary. The goalpost line may be decided by an organization and will be metric-specific based on the areas, projects, and goals of the organization. In some implementations, only projects that do not meet the goalpost threshold will be considered for improvement.

Figure 30:
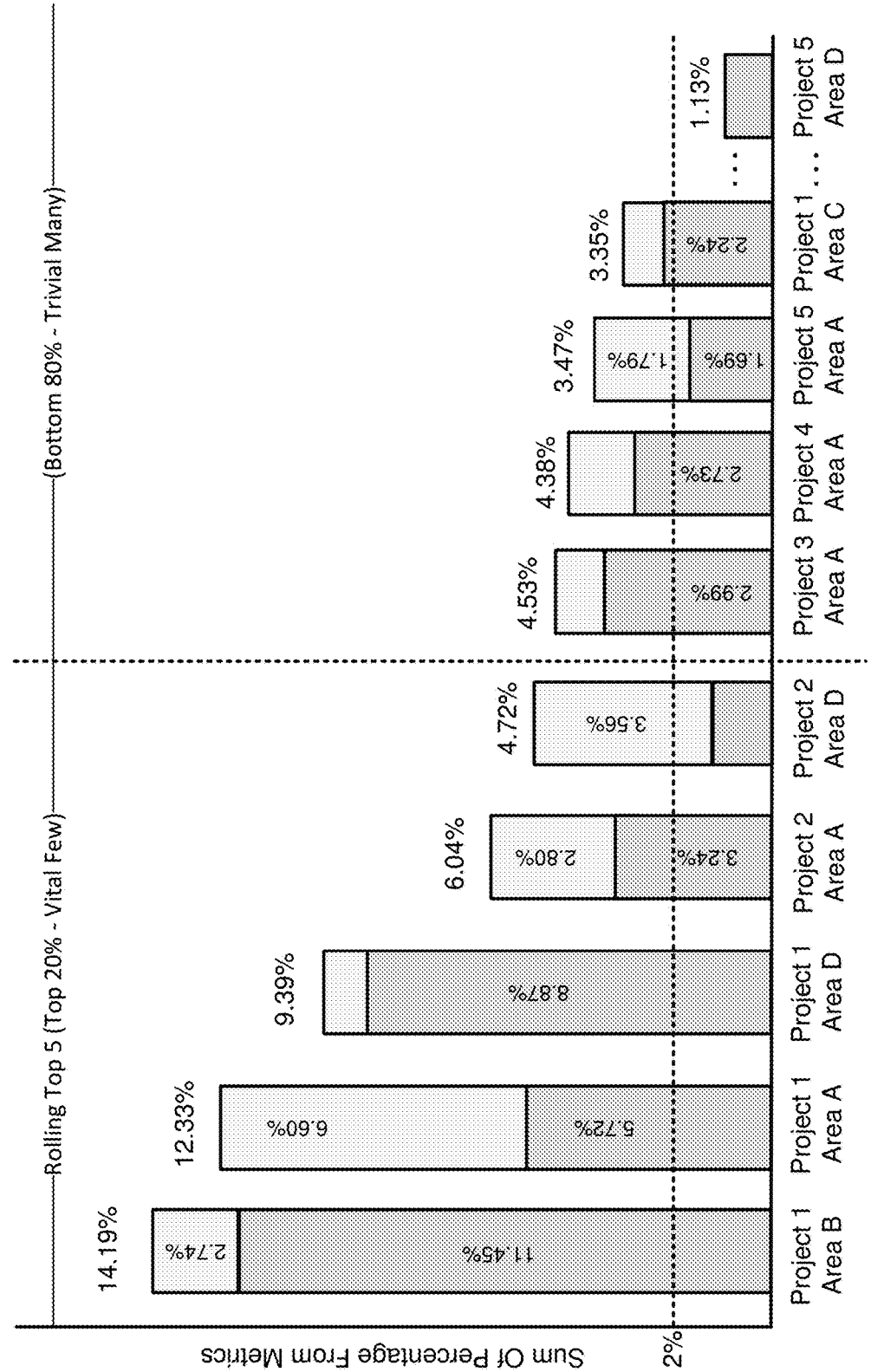
FIG. 30 is a graphical representation of an output by the quantum computer illustrating metrics for problem projects across an organization, organized in descending order to identify the Rolling Top 5® projects across the organization.

FIG. 30 is a graphical representation of a feedback analysis output by the quantum computer 122. The feedback analysis is based on the same data illustrated in FIG. 29. The projects within each of the areas have been organized in descending order based on which projects are associated with the greatest quantity of defects and the greatest percentage of SRR hours. It should be appreciated that defects and SSR hours are only example metrics, and that any suitable metrics may be used. The projects within the Rolling Top 5® projects indicate the top 20% projects, referred to herein as the "important few." The remaining projects not included in the Rolling Top 5® projects are the bottom 80% projects, referred to herein as the "trivial many."

The organization of projects and the selection of the Rolling Top 5® projects is based on the Pareto principle. The Pareto principle indicates that 20% of projects are responsible for 80% of issues. Further to this principle, if the 20% of projects that are responsible for 80% of the issues are resolved, then 80% of the issues will be resolved by only focusing on 20% of all projects. The Rolling Top 5® projects represent 20% of all projects, and specifically represent the 20% of all projects that are responsible for the greatest number of issues.

The projects illustrated in FIG. 29 have been re-organized in descending order, with the projects with the greatest quantity of defects and the greatest percentage of SRR hours first, and with the projects with the least number of defects and the smallest percentage of SRR hours last. It should be noted that FIG. 30 includes an abridged version of FIG. 29, and not all projects are illustrated. The ellipses between project one from Area C and project five from Area D indicates that other low-level projects have been eliminated for brevity. The projects included in the Rolling Top 5® projects include project one from Area B, project one from Area A, project one from Area D, project two from Area A, and project two from Area D. The projects listed after these projects are not included in the Rolling Top 5® projects. Project one from Area B is the first project in the Rolling Top 5® projects because this is the project that fails to meet the goalpost threshold by the greatest margin as illustrated in FIG. 29.

It should be noted that the Rolling Top 5® projects are selected based on a global scale, across all areas within the organization. When viewing on an area-basis, rather than a per-project per-area basis, the Rolling Top 5® projects will not reflect the individual projects that are actually responsible for the greatest number of issues. It is important to view data on a granular per-project level, rather than a per-area level, as illustrated in FIGS. 29-30.

Figure 31:
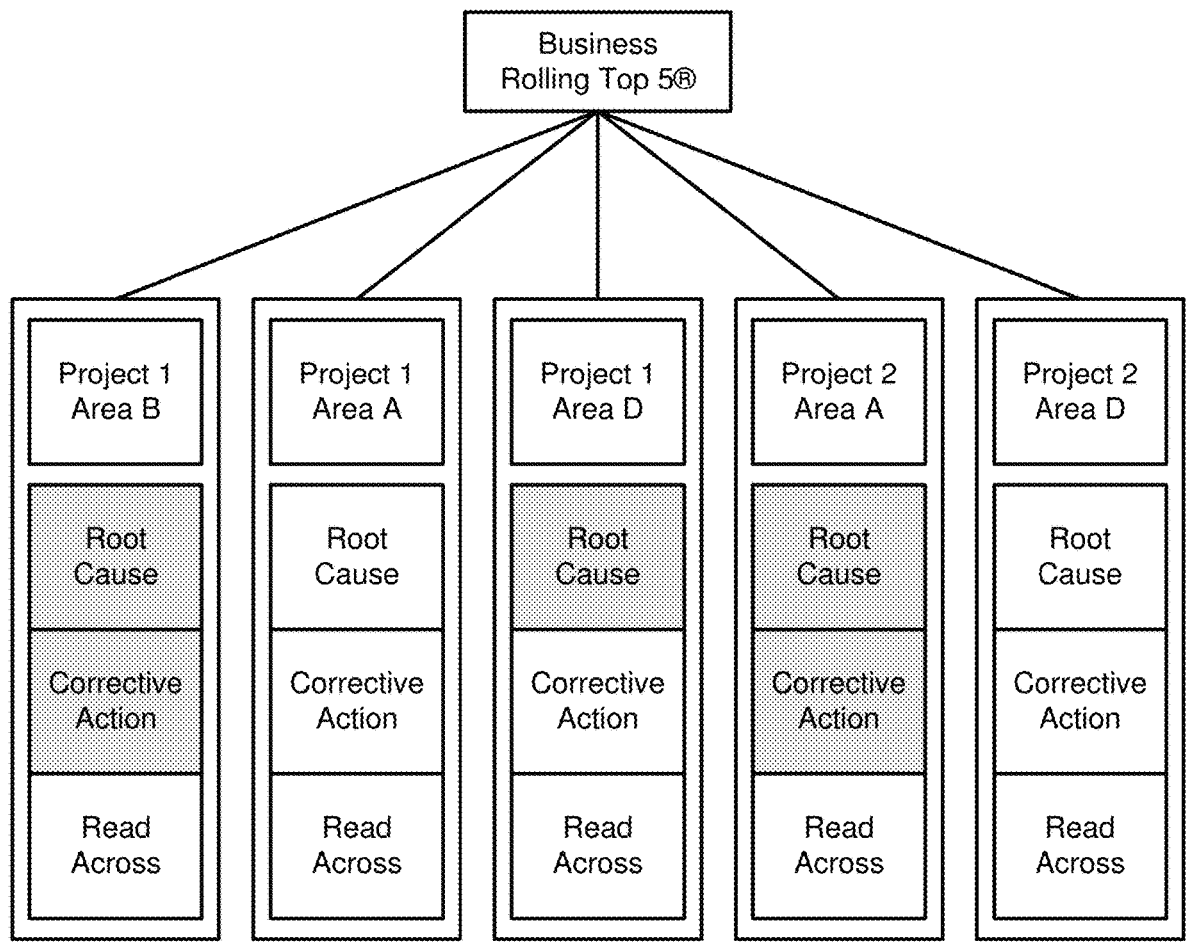
FIG. 31 is a schematic diagram of a quality improvement action plan to be overseen by upper management for improving the Rolling Top 5® projects in the organization.

FIG. 31 illustrates an example implementation plan based on the analysis illustrated in FIGS. 29-30. The implementation plan is executed for the business Rolling Top 5® projects, and these represent the top five projects across the entire organization that need to be improved. The implementation plan is executed by a manager and includes five projects to be executed, including project one from Area B, project one from Area A, project one from Area D, project two from Area A, and project two from Area D. These are the projects included in the Rolling Top 5® projects in FIG. 30. Each of the projects includes processes to perform for root cause, corrective action, and read across.

The implementation illustrated in FIG. 31 is based on that Pareto data analysis presented in FIG. 30, wherein project one from Area B is responsible for the greatest number of issues; project one from Area A is responsible for the second greatest number of issues, project one from Area D is responsible for the third greatest number of issues; project two from Area A is responsible for the fourth greatest number of issues; and project two from Area D is responsible for the fifth greatest number of issues.

The root cause for the issues associated with project one from Area A and project two from Area D have not been identified, and therefore, a corrective action plan has not been initiated for these projects. The root cause for the issues associated with project one from Area D has been identified, but a corrective action plan has not yet been initiated. The root cause for the issues associated with project one from Area B has been identified, and a corrective action plan has been identified.

The read across is the conclusion of the root cause corrective action (RCCA). The process begins with defining the area where the root cause corrective action (RCCA) will be done. The process includes predicting the read across (RA), in all other areas, at the start of the project. The process includes managing read across once the corrective action (CA) is known. The process includes using the DRIVE process to communicating findings from the root cause corrective action investigation. The read across needs to be managed instituting corrective action in every area where the defect occurs. The process includes showing defect improvement, across all areas, to show the "best of best" (BOB) and "worst of worst" (WOW), learn why one area is better than another, and to accelerate further improvement. The process includes showing the read across at the end of the process. This is the conclusion of the root cause corrective action and read across.

The systems, methods, and devices described herein can further be implemented with a knowledge check system. The measurement scale for the knowledge check system is from one (1) to six (6). The meaning of each numeral is as follows: one indicates unaware; two indicates aware; three indicates knowledgeable; four indicates understand; five indicates master; and six indicates share/coach. A knowledge check can be done anywhere in one or more steps. The measurement allows systems to measure and chart the numerical month-by-month improvements. A one through six scale is on the vertical axis and months are plotted on the horizontal axis. Measurement checks can be made for a system, a process, a step, a procedure, or a task. Synergistic responses are two or more dimensions. An example of a synergistic response is using DELTA to improve parts and CHANGE to improve people. When using DELTA and CHANGE, each at six, the two rankings are multiplied to get 36. More dimensions can be comprehended by multiplying the dimensional values togethers. A system does not plot one dimensional ratings against multi-dimensional ratings. The number of dimensions for every plot is the same.

Figure 32:
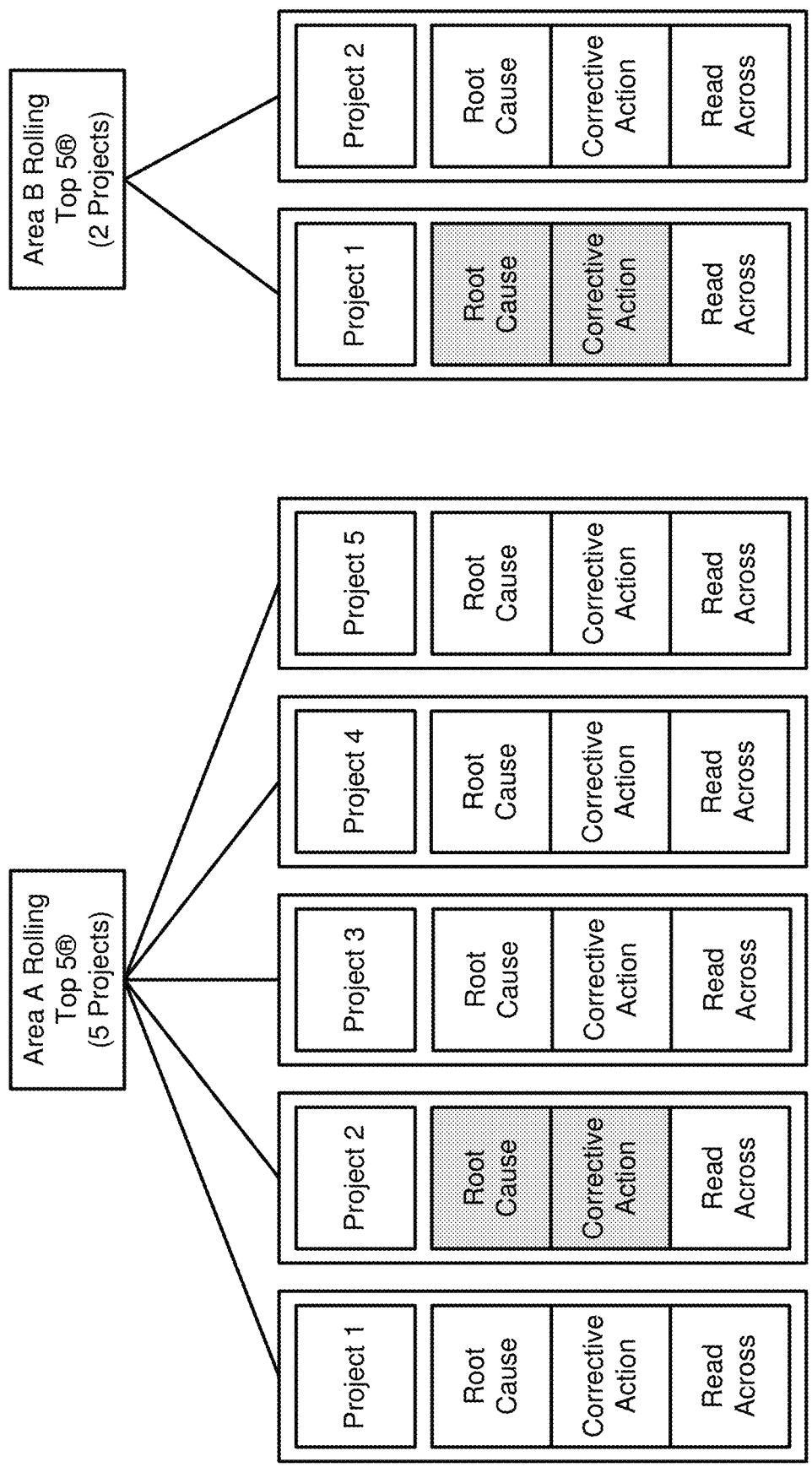
FIG. 32 is a schematic diagram of a quality improvement action plan to be seen by area-level management for improving projects in the organization.
Figure 33:
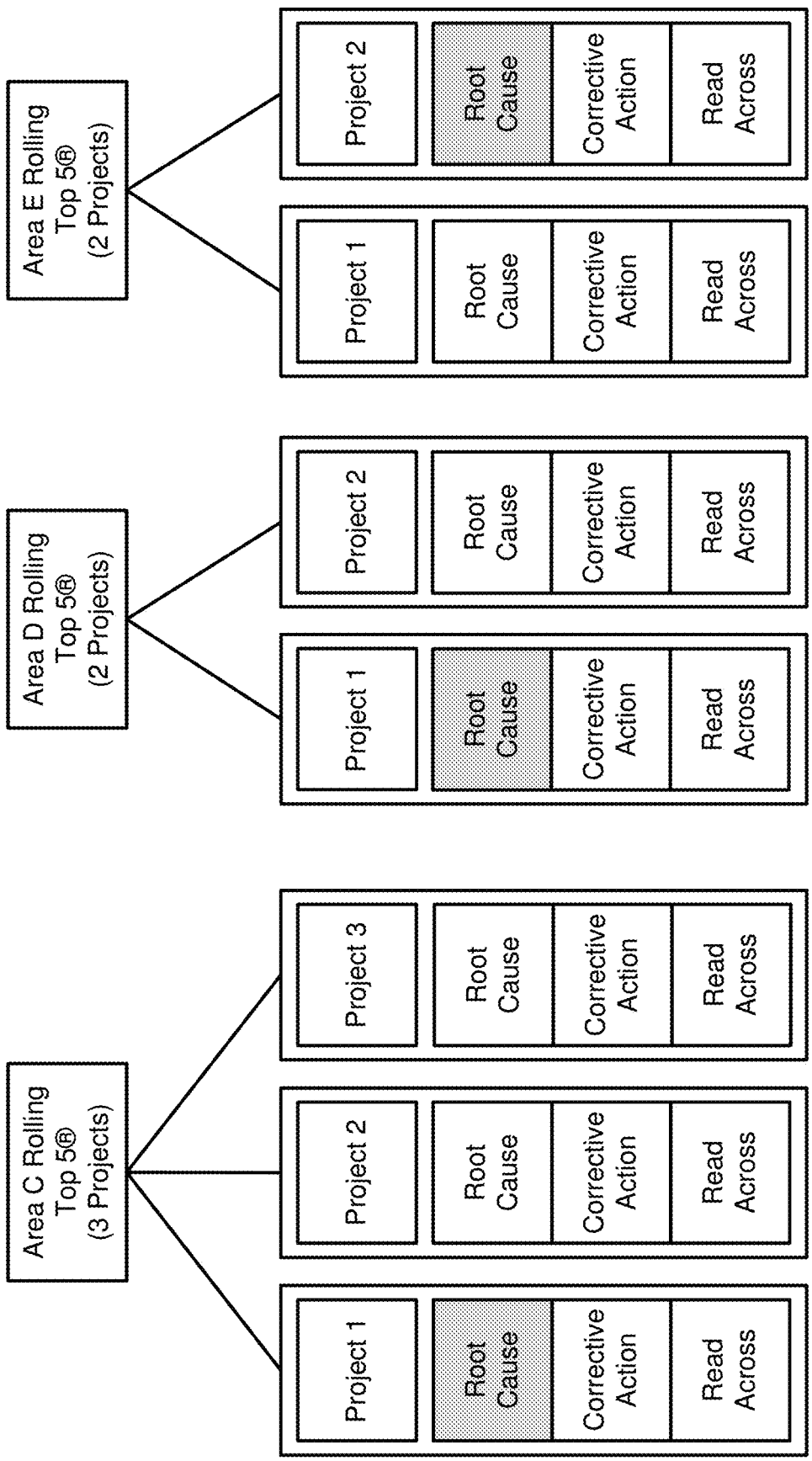
FIG. 33 is a schematic diagram of a quality improvement action plan to be seen by area-level management for improving projects in the organization.

FIGS. 32-33 further illustrate the project execution and management plan illustrated in FIG. 31. The project management plan illustrated in FIG. 31 is executed by upper management and applies to the Rolling Top 5® projects across the entire organization. The project management plans illustrated in FIGS. 32-33 are performed on a per-area level, with a manager/director in each area overseeing the projects in need of improvement within that rea. Each of the Area A manager, Area B manager, Area C manager, Area D manager, and Area E manager oversees projects associated with those areas. These are the same areas identified in FIGS. 29-30.

The Area A manager oversees the Area A Rolling Top 5® projects. In the example implementation, the Area A Rolling Top 5® projects includes five projects because Area A has five projects that do not satisfy the goalpost threshold (dotted horizontal line in FIGS. 29-30). Because project two from Area A is within the Rolling Top 5® projects across the entire organization, improvement of that project has already begun. The root cause has been identified and the corrective action has been implemented. Execution of the other projects within Area A have not yet begun.

The Area B manager oversees the Area B Rolling Top 5® projects. In the example implementation, the Area B Rolling Top 5® projects includes only two projects because Area B has two projects that do not satisfy the goalpost threshold. Because project one from Area B is within the Rolling Top 5® projects across the entire organization, improvement of that project has already begun. The root cause has been identified and the corrective action has been implemented. Execution of the other projects within Area B have not yet begun.

The Area C manager, Area D manager, and Area E manager also manage the projects within their respective areas that do not satisfy the goalpost threshold defined in FIGS. 29-30. The Area C Rolling Top 5® projects includes three projects, the Area D Rolling Top 5® projects includes two projects, and the Area E Rolling Top 5® projects includes two projects. As discussed herein, a "Rolling Top 5® projects" grouping does not necessarily include five projects and may include fewer (but not more than) five projects. The area managers are directed to prioritize improvement of those projects that are included in the organization's Rolling Top 5® projects. After the Rolling Top 5® projects have been improved to a satisfactory level, then area managers may begin on other projects that do not satisfy the goalpost threshold defined in FIGS. 29-30.

FIG. 34 is a table illustrating a project execution flow chart plant. The table includes the Rolling Top 5® projects listed by rank, with problem rank number one referring to the first project within the Rolling Top 5® projects, and with problem rank number five referring to the last project within the Rolling Top 5® projects. The project name identifies the projects across the company that have been selected for the Rolling Top 5® projects. The project names correspond with the action plans illustrated in FIGS. 31-33.

Figures 35, 36:
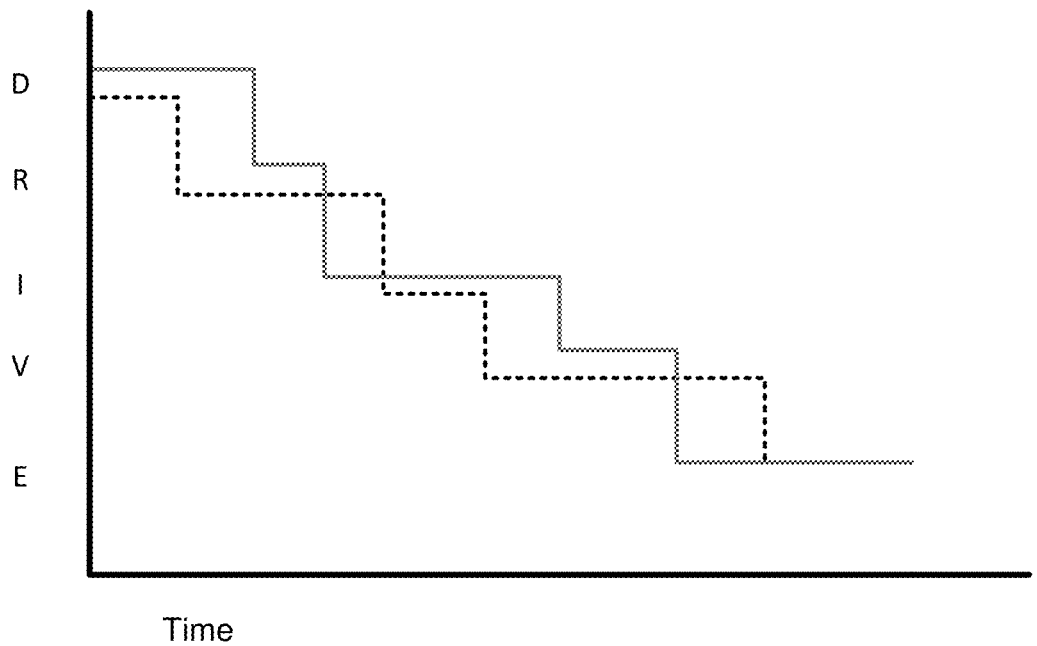
FIG. 35 is a graphical illustration depicting an example execution of the DRIVE process.
FIG. 36 is a table illustrating the read across and magnification enabled by a standard work.

FIG. 35 is a graphical illustration indicating how the DRIVE process can be implemented over time. As shown, a first team (illustrated by the dotted line) and a second team (illustrated by the grey solid line) may move through the DRIVE process at different rates. Each step in the DRIVE process may take a different period of time to execute, and the first team and the second team may spend different periods of time on each step within the DRIVE process.

FIG. 36 is a table illustrating the read across and magnification enabled by standard work for the $AA^2SS^2$ process. The read across is executed across numerous areas, including AREA 1, ALL AREAS 1-n, SYSTEMIC AREA 1, and SYSTEM AREA 1-n. The read across in AREA 1 is performed by executing the $AA^2SS^2$ process on applications within the area. The magnification enabled by the standard work is from A1 to An. The read across continues to ALL AREAS 1-n, wherein the $AA^2SS^2$ process is applied to applications across areas. The magnification enabled by the standard work is $A^21$ to $A^2n$. The read across continues to SYSTEM AREA 1, wherein the $AA^2SS^2$ process is performed systemically in an area. The magnification enabled by the standard work is S1 to Sn. The read across continues to SYSTEM AREA 1-n, wherein the $AA^2SS^2$ process is applied systemically in all areas. The magnification enabled by the standard work is $S^21$ to $S^2n$.

FIG. 37 illustrates implementation of the FACTUAL™ and DRIVE processes. The DRIVE process includes describe, reason, implement, verify, and explain. The FACTUAL™ process moves from the Rolling Top 5® projects to the oneFiveFIFTY™ implementation schema. The DRIVE process moves from the everyday projects to the oneFiveFIFTY™ implementation schema.

The FACTUAL™ process carries the Rolling Top 5® projects through the oneFiveFIFTY™ process illustrated in FIG. 3A. The DRIVE process carries the everyday projects (i.e., the projects that are not included in the Rolling Top 5® projects) through the oneFiveFIFTY™ process illustrated in FIG. 3A. The DRIVE process includes describing, reasoning, implementing, verifying, and explaining the tasks and procedures for executing the oneFiveFIFTY™ process. The tasks and procedures outlined in the oneFiveFIFTY™ process include one project, and then five projects, and then fifty projects (i.e., the five projects implemented across ten sectors).

Each Rolling Top 5® project goes through the process illustrated in FIG. 37, read from left to right and top to bottom. The first step in the process for improving a Rolling Top 5® project includes DESCRIBE the best of the best and the worst of the worst for that project. A second step in the process for improving the Rolling Top 5® project is to REASON why the project is experiencing issues and why the project needs to be improved. A third step in improving the Rolling Top 5® project includes IMPLEMENT five or more how steps for improving the project. A fourth step in improving the Rolling Top 5® project includes VERIFY- ING that the run chart method for the project is showing progress. A fifth step in improving the Rolling Top 5® project is EXPLAINING the entire Rolling Top 5® project investigation for the project.

Figure 38:
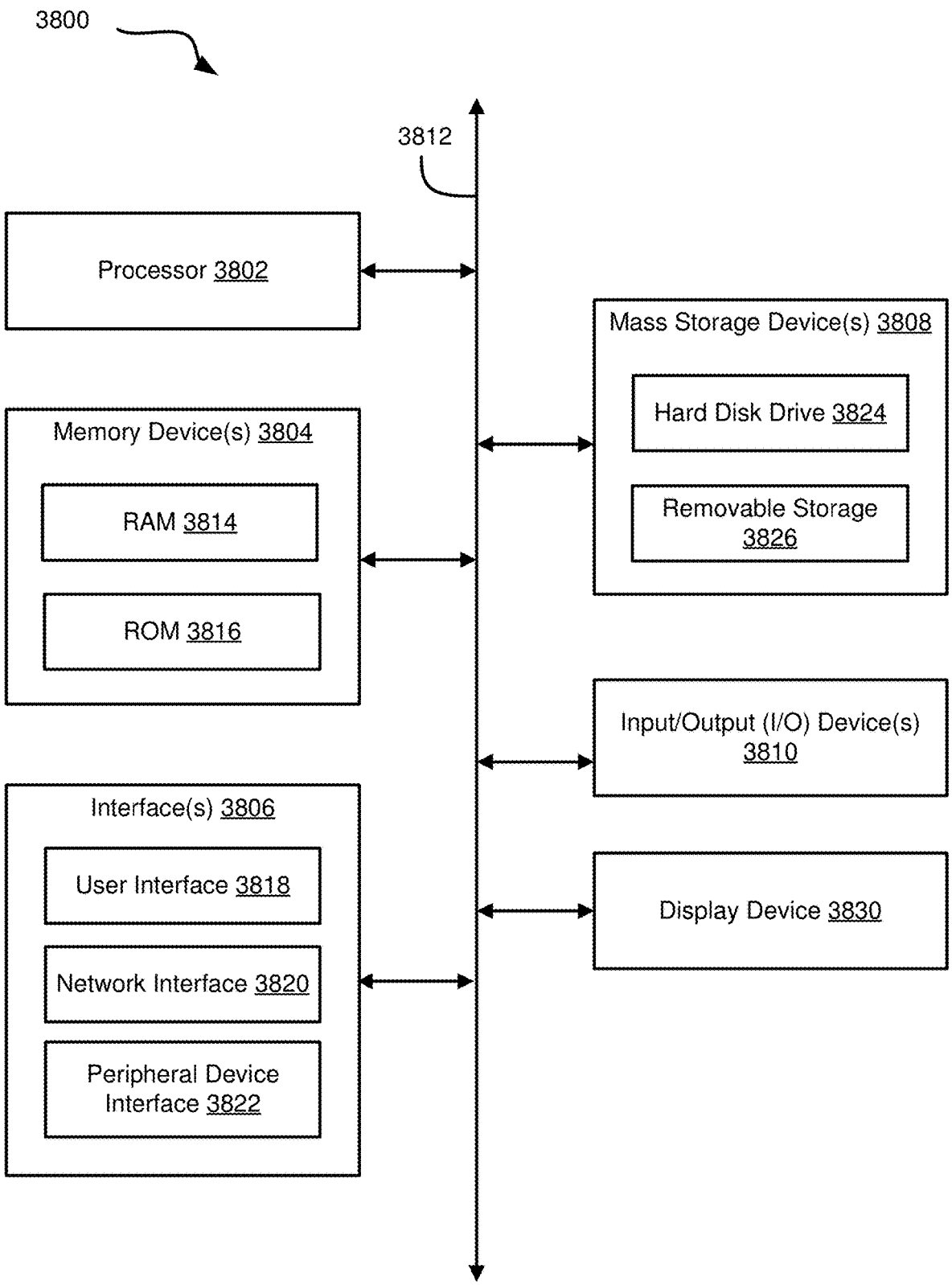
FIG. 38 is a schematic diagram of an example computing system.

Referring now to FIG. 38, a block diagram of an example computing device 3800 is illustrated. Computing device 3800 may be used to perform various procedures, such as those discussed herein. In one embodiment, the computing device 3800 can function as a standard work server 104 as discussed herein. Computing device 3800 can perform various monitoring functions as discussed herein, and can execute one or more application programs, such as the application programs or functionality described herein. Computing device 3800 can be any of a wide variety of computing devices, such as a desktop computer, in-dash computer, vehicle control system, a notebook computer, a server computer, a handheld computer, tablet computer and the like.

Computing device 3800 includes one or more processor(s) 3802, one or more memory device(s) 3804, one or more interface(s) 3806, one or more mass storage device(s) 3808, one or more Input/output (I/O) device(s) 3810, and a display device 3830 all of which are coupled to a bus 3812. Processor(s) 3802 include one or more processors or controllers that execute instructions stored in memory device(s) 3804 and/or mass storage device(s) 3808. Processor(s) 3802 may also include various types of computer-readable media, such as cache memory.

Memory device(s) 3804 include various computer-readable media, such as volatile memory (e.g., random access memory (RAM) 3814) and/or nonvolatile memory (e.g., read-only memory (ROM) 3816). Memory device(s) 3804 may also include rewritable ROM, such as Flash memory.

Mass storage device(s) 3808 include various computer readable media, such as magnetic tapes, magnetic disks, optical disks, solid-state memory (e.g., Flash memory), and so forth. As shown in FIG. 38, a particular mass storage device is a hard disk drive 3824. Various drives may also be included in mass storage device(s) 3808 to enable reading from and/or writing to the various computer readable media. Mass storage device(s) 3808 include removable media 3826 and/or non-removable media.

I/O device(s) 3810 include various devices that allow data and/or other information to be input to or retrieved from computing device 3800. Example I/O device(s) 3810 include cursor control devices, keyboards, keypads, microphones, monitors or other display devices, speakers, printers, network interface cards, modems, and the like.

Display device 3830 includes any type of device capable of displaying information to one or more users of computing device 3800. Examples of display device 3830 include a monitor, display terminal, video projection device, and the like.

Interface(s) 3806 include various interfaces that allow computing device 3800 to interact with other systems, devices, or computing environments. Example interface(s) 3806 may include any number of different network interfaces 3820, such as interfaces to local area networks (LANs), wide area networks (WANs), wireless networks, and the Internet. Other interface(s) include user interface 3818 and peripheral device interface 3822. The interface(s) 3806 may also include one or more user interface elements 3818. The interface(s) 3806 may also include one or more peripheral interfaces such as interfaces for printers, pointing devices (mice, track pad, or any suitable user interface now known to those of ordinary skill in the field, or later discovered), keyboards, and the like.

Bus 3812 allows processor(s) 3802, memory device(s) 3804, interface(s) 3806, mass storage device(s) 3808, and I/O device(s) 3810 to communicate with one another, as well as other devices or components coupled to bus 3812. Bus 3812 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 3800 and are executed by processor(s) 3802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method. The method includes defining a standard work to be implemented by an organization, wherein the standard work comprises one or more of a process, a tool, or a system. The method includes generating a standard work matrix comprising a task for executing the standard work. The method includes receiving feedback data comprising information on execution of the task. The method includes determining whether the execution of the task meets a threshold based on the feedback data. The method includes advancing the standard work matrix to comprise a new task only in response to the execution of the task meeting the threshold.

Example 2 is a method as in Example 1, further comprising communicating by way of an application program interface (API) with one or more of: a feedback component comprising the feedback data; a consulting component comprising consulting data pertaining to the standard work matrix; or an inventory management component comprising information pertaining to execution of the standard work.

Example 3 is a method as in any of Examples 1-2, wherein defining the standard work further comprises: assessing historical success data comprising information on prior-executed standard works and/or standard work matrices that have been deemed successful; and identifying a historical standard work applicable to the organization.

Example 4 is a method as in any of Examples 1-3, wherein the organization comprises one or more of: a plurality of individuals associated in a group; or a single individual.

Example 5 is a method as in any of Examples 1-4, wherein the task comprises one or more steps to be implemented by an individual or a machine.

Example 6 is a method as in any of Examples 1-5, wherein the feedback data comprises one or more of sensor data, survey data, consumer report data, manufacturing progress data, sales data, customer review data, consultant data, or self-reported success data.

Example 7 is a method as in any of Examples 1-6, wherein advancing the standard work matrix to comprise the new task comprises advancing the standard work matrix to comprise five or more new tasks applicable to five or more areas in which consistency can be verified as repeatable.

Example 8 is a method as in any of Examples 1-7, further comprising: receiving new feedback data comprising information on execution of the new task; determining whether the execution of the new task meets a threshold based on the new feedback data; and advancing the standard work matrix to comprise a final task set only in response to the execution of the new task meeting the threshold.

Example 9 is a method as in any of Examples 1-8, wherein advancing the standard work matrix to comprise the final task set comprises advancing the standard work matrix to comprise fifty or more new tasks selected in ten or more areas where consistency can be validated as repeatable.

Example 10 is a method as in any of Examples 1-9, wherein determining whether the execution of the task meets the threshold comprises determining whether the execution of the task is repeated consistently and precisely.

Example 11 is a system comprising one or more processors configurable to execute instructions stored in non-transitory computer readable storage media wherein the instructions comprise any of the method steps of Examples 1-10.

Example 12 is non-transitory computer readable storage media storing instructions for execution by one or more processors, wherein the instructions comprise any of the method steps of Examples 1-10.

Example 13 is a system for computer-implemented improvement of execution of a standard work. The system includes a sensor for capturing metric data associated with a process, wherein the standard work is implemented to improve the process. The system includes a database for storing the metric data and data associated with the standard work. The system includes one or more processors for executing instructions stored in non-transitory computer readable storage medium. The instructions include defining a standard work matrix for the standard work. The instructions include retrieving historical data applicable to the process from the database. The instructions include providing the historical metric data to a neural network trained to calculate at least one project for executing the standard work. The instructions include receiving updated metric data from the sensor comprising information on execution of the at least one project. The instructions include determining whether the execution of the at least one project meets a threshold based on the updated metric data. The instructions include advancing the standard work matrix to comprise a new five projects in response to the execution of the at least one project meeting the threshold.

Example 14 is a system as in Example 13, wherein the instructions further comprise communicating by way of an application program interface (API) with one or more of: a feedback component compiling and/or analyzing the updated metric data; a consulting component comprising consulting data pertaining to the standard work matrix; or an inventory management component comprising information pertaining to execution of the standard work.

Example 15 is a system as in any of Examples 13-14, wherein the instructions are such that defining the standard work matrix comprises: assessing historical success data comprising information on prior-executed standard works and/or standard work matrices that have been deemed successful; and identifying a historical standard work applicable to the metric data.

Example 16 is a system as in any of Examples 13-15, wherein the standard work is implemented by an organization, and wherein the organization comprises one or more of: a plurality of individuals associated in a group; a single individual; or a manufacturing system.

Example 17 is a system as in any of Examples 13-16, wherein the at least one project comprises one or more steps to be implemented by an individual or a machine.

Example 18 is a system as in any of Examples 13-17, wherein the metric data and the updated metric data comprise one or more of sensor data, survey data, consumer report data, manufacturing progress data, sales data, customer review data, consultant data, or self-reported success data.

Example 19 is a system as in any of Examples 13-18, wherein the new five projects are applicable to five or more areas in which consistency can be verified as repeatable, and wherein the instructions further comprise: providing the updated metric data to the neural network, wherein the neural network is trained to select the new five projects based on the updated metric data and historical successes of prior-implemented standard work matrices; and receiving from the neural network the new five projects.

Example 20 is a system as in any of Examples 13-19, wherein the instructions further comprise: receiving five-project metric data comprising information on execution of the new five projects; determining whether the execution of the new five projects meets a threshold based on the five-project metric data; and advancing the standard work matrix to comprise a final fifty projects set only in response to the execution of the new five projects meeting the threshold.

Example 21 is a system as in any of Examples 13-20, wherein the instructions are such that advancing the standard work matrix to comprise the final fifty projects comprises advancing the standard work matrix to comprise fifty projects selected in ten areas where consistency can be validated as repeatable.

Example 22 is a system as in any of Examples 13-21, wherein the instructions are such that determining whether the execution of the at least one project meets the threshold comprises determining whether the execution of the at least one project is repeated consistently and precisely.

Example 23 is a system computer-implemented improvement of execution of a standard work. The system includes a sensor for capturing metric data associated with a process, wherein the standard work is implemented to improve the process. The system includes a database for storing the metric data and data associated with the standard work. The system includes one or more processors for executing instructions stored in non-transitory computer readable storage medium, the instructions comprising: defining a standard work matrix for the standard work; retrieving historical data applicable to the process from the database; providing the historical metric data to a neural network trained to calculate at least one project for executing the standard work; receiving updated metric data from the sensor comprising information on execution of the at least one project; determining whether the execution of the at least one project meets a threshold based on the updated metric data; and advancing the standard work matrix to comprise a new five projects in response to the execution of the at least one project meeting the threshold.

Example 24 is a system as in Example 23, wherein the instructions further comprise communicating by way of an application program interface (API) with one or more of: a feedback component compiling and/or analyzing the updated metric data; a consulting component comprising consulting data pertaining to the standard work matrix; or an inventory management component comprising information pertaining to execution of the standard work.

Example 25 is a system as in any of Example 23-24, wherein the instructions are such that defining the standard work matrix comprises: assessing historical success data comprising information on prior-executed standard works and/or standard work matrices that have been deemed successful; and identifying a historical standard work applicable to the metric data.

Example 26 is a system as in any of Example 23-25, wherein the standard work is implemented by an organization, and wherein the organization comprises one or more of: a plurality of individuals associated in a group; a single individual; or a manufacturing system.

Example 27 is a system as in any of Example 23-26, wherein the at least one project comprises one or more steps to be implemented by an individual or a machine.

Example 28 is a system as in any of Example 23-27, wherein the metric data and the updated metric data comprise one or more of sensor data, survey data, consumer report data, manufacturing progress data, sales data, customer review data, consultant data, or self-reported success data.

Example 29 is a system as in any of Example 23-28, wherein the new five projects are applicable to five or more areas in which consistency can be verified as repeatable, and wherein the instructions further comprise: providing the updated metric data to the neural network, wherein the neural network is trained to select the new five projects based on the updated metric data and historical successes of prior-implemented standard work matrices; and receiving from the neural network the new five projects.

Example 30 is a system as in any of Example 23-29, wherein the instructions further comprise: receiving five-project metric data comprising information on execution of the new five projects; determining whether the execution of the new five projects meets a threshold based on the five-project metric data; and advancing the standard work matrix to comprise a final fifty projects set only in response to the execution of the new five projects meeting the threshold.

Example 31 is a system as in any of Example 23-30, wherein the instructions are such that advancing the standard work matrix to comprise the final fifty projects comprises advancing the standard work matrix to comprise fifty projects selected in ten areas where consistency can be validated as repeatable.

Example 32 is a system as in any of Example 23-31, wherein the instructions are such that determining whether the execution of the at least one project meets the threshold comprises determining whether the execution of the at least one project is repeated consistently and precisely.

Example 33 is a system for improvement of execution of a standard work, wherein the system comprises one or more processors configurable to execute instructions stored in non-transitory computer readable storage media, the instructions comprising: defining a standard work matrix for the standard work, wherein the standard work is implemented to improve a process associated with metric data, wherein the metric data is captured by a sensor; retrieving historical metric data applicable to the process from a database; providing the historical metric data to a neural network trained to calculate at least one project for executing the standard work based on the historical metric data and prior-implemented standard work matrices; receiving updated metric data from the sensor comprising information on execution of the at least one project; determining whether the execution of the at least one project meets a threshold based on the updated metric data; and advancing the standard work matrix to comprise a new five projects in response to the execution of the at least one project meeting the threshold.

Example 34 is a system as in Example 33, wherein the instructions further comprise communicating by way of an application program interface (API) with one or more of: a feedback component compiling and/or analyzing the updated metric data; a consulting component comprising consulting data pertaining to the standard work matrix; or an inventory management component comprising information pertaining to execution of the standard work.

Example 35 is a system as in any of Example 33-34, wherein the instructions are such that defining the standard work matrix comprises: assessing historical success data comprising information on prior-executed standard works and/or standard work matrices that have been deemed successful; and identifying a historical standard work applicable to the metric data.

Example 36 is a system as in any of Example 33-35, wherein the standard work is implemented by an organization, and wherein the organization comprises one or more of: a plurality of individuals associated in a group; a single individual; or a manufacturing system.

Example 37 is a system as in any of Example 33-36, wherein the at least one project comprises one or more steps to be implemented by an individual or a machine.

Example 38 is a system for computer-implemented improvement of execution of a standard work, the system comprising: a database for storing metric data associated with a plurality of projects implemented by an organization; a quantum computer in communication with the database; and a server in communication with the database and the quantum computer, the server comprising one or more processors for executing instructions stored in non-transitory computer readable storage medium, the instructions comprising: providing the metric data associated with the plurality of projects to the quantum computer for the quantum computer to quantify metrics for each of the plurality of projects; receiving quality improvement analysis from the quantum computer for the plurality of projects; identifying five or fewer projects of the plurality of projects based on which of the plurality of projects fails a quality threshold for the metric data by a greatest margin; defining a standard work matrix for improving each of the five or fewer projects; providing historical data to a neural network trained to identify at least one method for improving each of the five or fewer projects based on the historical data; determining whether execution of the at least one method for each of the five or fewer projects meets an improvement threshold based on updated metric data; and advancing the standard work matrix in response to the at least one method meeting the improvement threshold.

Example 39 is a system as in Example 38, wherein the instructions further comprise communicating by way of an application program interface (API) with one or more of: a feedback component compiling and/or analyzing the updated metric data; a consulting component comprising consulting data pertaining to the standard work matrix; or an inventory management component comprising the metric data associated with the plurality of projects.

Example 40 is a system as in any of Examples 38-39, wherein the instructions further comprise defining the standard work matrix by: assessing historical success data comprising information on prior-executed standard works and/or standard work matrices that have been deemed successful; and identifying a historical standard work applicable to the metric data.

Example 41 is a system as in any of Examples 38-40, wherein the organization is a manufacturing facility, and wherein the metric data comprises one or more of: part defect codes or scrap, repair, and rework (SRR) hours.

Example 42 is a system as in any of Examples 38-41, wherein each of the plurality of projects is associated with a build area, and wherein identifying the five or fewer projects for the organization comprises selecting projects irrespective of build area.

Example 43 is a system as in any of Examples 38-42, wherein the metric data and the updated metric data comprise one or more of sensor data, survey data, consumer report data, manufacturing progress data, sales data, customer review data, consultant data, part defect-code data, fault data, or self-reported success data.

Example 44 is a system as in any of Examples 38-43, further comprising an image sensor in communication with the server, and wherein the instructions further comprise: receiving an image of a manufactured part from the image sensor; providing the image to a neural network trained to identify the manufactured part within the image; and receiving an indication from the neural network whether the manufactured part comprises a defect.

Example 45 is a system as in any of Examples 38-44, wherein the instructions further comprise: in response to receiving the indication from the neural network that the manufactured part comprises a defect, classifying the defect based on analysis from the neural network; identifying which project is associated with the manufactured part; and adding a defect classification code to the metric data for the project associated with the manufactured part.

Example 46 is a system as in any of Examples 38-45, wherein the instructions are such that advancing the standard work matrix comprises determining a new five methods for improving at least one of the five or fewer projects.

Example 47 is a system as in any of Examples 38-46, wherein the instructions are such that determining whether the execution of the at least one method for each of the five or fewer projects meets the improvement threshold comprises determining whether the execution of the at least one method is repeated consistently and precisely.

Example 48 is a system for improvement of execution of a standard work, wherein the system comprises one or more processors configurable to execute instructions stored in non-transitory computer readable storage media, the instructions comprising: providing metric data associated with a plurality of projects to a quantum computer for the quantum computer to quantify metrics for each of the plurality of projects; receiving quality improvement analysis from the quantum computer for the plurality of projects; identifying a five or fewer projects of the plurality of projects based on which of the plurality of projects fails a quality threshold for the metric data by a greatest margin; defining a standard work matrix for improving each of the five or fewer projects; providing historical data to a neural network trained to identify at least one method for improving each of the five or fewer projects based on the historical data; determining whether execution of the at least one method for each of the five or fewer projects meets an improvement threshold based on updated metric data; and advancing the standard work matrix in response to the at least one method meeting the improvement threshold.

Example 49 is a system as in Example 48, wherein the instructions further comprise communicating by way of an application program interface (API) with one or more of: a feedback component compiling and/or analyzing the updated metric data; a consulting component comprising consulting data pertaining to the standard work matrix; or an inventory management component comprising the metric data associated with the plurality of projects.

Example 50 is a system as in any of Example 48-49, wherein the instructions further comprise defining the standard work matrix by: assessing historical success data comprising information on prior-executed standard works and/or standard work matrices that have been deemed successful; and identifying a historical standard work applicable to the metric data.

Example 51 is a system as in any of Example 48-50, wherein the organization is a manufacturing facility, and wherein the metric data comprises one or more of: part defect codes or scrap, repair, and rework (SRR) hours.

Example 52 is a system comprising one or more processors for executing instructions stored in non-transitory computer readable storage medium, wherein the instructions comprise any of the instructions recited in Examples 1-51.

Example 53 is a system comprising means for implementing any of the instructions recited in Examples 1-51.

In the above disclosure, reference has been made to the accompanying drawings, which form a part hereof, and in which is shown by way of illustration specific implementations in which the disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein purposes of illustration and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system for computer-implemented improvement of execution of a standard work, the system comprising:
    a database for storing metric data associated with a plurality of projects implemented by an organization;
    a quantum computer in communication with the database; and
    a server in communication with the database and the quantum computer, the server comprising one or more processors for executing instructions stored in non-transitory computer readable storage medium, the instructions comprising:
        providing the metric data associated with the plurality of projects to the quantum computer for the quantum computer to quantify metrics for each of the plurality of projects;
        receiving quality improvement analysis from the quantum computer for the plurality of projects;
        identifying five or fewer projects of the plurality of projects based on which of the plurality of projects fails a quality threshold for the metric data by a greatest margin;
        defining a standard work matrix for improving each of the five or fewer projects;
        providing historical data to a neural network trained to identify at least one method for improving each of the five or fewer projects based on the historical data;
        determining whether execution of the at least one method for each of the five or fewer projects meets an improvement threshold based on updated metric data; and advancing the standard work matrix in response to the at least one method meeting the improvement threshold.

2. The system of claim 1, wherein the instructions further comprise communicating by way of an application program interface (API) with one or more of:
- a feedback component compiling and/or analyzing the updated metric data;
- a consulting component comprising consulting data pertaining to the standard work matrix; or
- an inventory management component comprising the metric data associated with the plurality of projects.

3. The system of claim 1, wherein the instructions further comprise defining the standard work matrix by:
- assessing historical success data comprising information on prior-executed standard works and/or standard work matrices that have been deemed successful; and
- identifying a historical standard work applicable to the metric data.

4. The system of claim 1, wherein the organization is a manufacturing facility, and wherein the metric data comprises one or more of: part defect codes or scrap, repair, and rework (SRR) hours.

5. The system of claim 1, wherein each of the plurality of projects is associated with a build area, and wherein identifying the five or fewer projects for the organization comprises selecting projects irrespective of build area.

6. The system of claim 1, wherein the metric data and the updated metric data comprise one or more of sensor data, survey data, consumer report data, manufacturing progress data, sales data, customer review data, consultant data, part defect-code data, fault data, or self-reported success data.

7. The system of claim 1, further comprising an image sensor in communication with the server, and wherein the instructions further comprise:
- receiving an image of a manufactured part from the image sensor;
- providing the image to a neural network trained to identify the manufactured part within the image; and
- receiving an indication from the neural network whether the manufactured part comprises a defect.

8. The system of claim 7, wherein the instructions further comprise:
- in response to receiving the indication from the neural network that the manufactured part comprises a defect, classifying the defect based on analysis from the neural network;
- identifying which project is associated with the manufactured part; and
- adding a defect classification code to the metric data for the project associated with the manufactured part.

9. The system of claim 1, wherein the instructions are such that advancing the standard work matrix comprises determining a new five methods for improving at least one of the five or fewer projects.

10. The system of claim 1, wherein the instructions are such that determining whether the execution of the at least one method for each of the five or fewer projects meets the improvement threshold comprises determining whether the execution of the at least one method is repeated consistently and precisely.

11. A system for improvement of execution of a standard work, wherein the system comprises one or more processors configurable to execute instructions stored in non-transitory computer readable storage media, the instructions comprising:

providing metric data associated with a plurality of projects to a quantum computer for the quantum computer to quantify metrics for each of the plurality of projects;
receiving quality improvement analysis from the quantum computer for the plurality of projects;
identifying five or fewer projects of the plurality of projects based on which of the plurality of projects fails a quality threshold for the metric data by a greatest margin;
defining a standard work matrix for improving each of the five or fewer projects;
providing historical data to a neural network trained to identify at least one method for improving each of the five or fewer projects based on the historical data;
determining whether execution of the at least one method for each of the five or fewer projects meets an improvement threshold based on updated metric data; and
advancing the standard work matrix in response to the at least one method meeting the improvement threshold.

12. The system of claim 11, wherein the instructions further comprise communicating by way of an application program interface (API) with one or more of:
- a feedback component compiling and/or analyzing the updated metric data;
- a consulting component comprising consulting data pertaining to the standard work matrix; or
- an inventory management component comprising the metric data associated with the plurality of projects.

13. The system of claim 11, wherein the instructions further comprise defining the standard work matrix by:
- assessing historical success data comprising information on prior-executed standard works and/or standard work matrices that have been deemed successful; and
- identifying a historical standard work applicable to the metric data.

14. The system of claim 11, wherein the organization is a manufacturing facility, and wherein the metric data comprises one or more of: part defect codes or scrap, repair, and rework (SRR) hours.

15. The system of claim 11, wherein each of the plurality of projects is associated with a build area, and wherein identifying the five or fewer projects for the organization comprises selecting projects irrespective of build area.

16. A system for improving execution of a standard work, the system comprising:
- means for providing metric data associated with a plurality of projects to a quantum computer for the quantum computer to quantify metrics for each of the plurality of projects;
- means for receiving quality improvement analysis from the quantum computer for the plurality of projects;
- means for identifying five or fewer projects of the plurality of projects based on which of the plurality of projects fails a quality threshold for the metric data by a greatest margin;
- means for defining a standard work matrix for improving each of the five or fewer projects;
- means for providing historical data to a neural network trained to identify at least one method for improving each of the five or fewer projects based on the historical data;
- means for determining whether execution of the at least one method for each of the five or fewer projects meets an improvement threshold based on updated metric data; and means for advancing the standard work matrix in response to the at least one method meeting the improvement threshold.

17. The system of claim 16, further comprising means for communicating by way of an application program interface (API) with one or more of:
- a feedback component compiling and/or analyzing the updated metric data;
- a consulting component comprising consulting data pertaining to the standard work matrix; or
- an inventory management component comprising the metric data associated with the plurality of projects.

18. The system of claim 16, wherein the metric data and the updated metric data comprise one or more of sensor data, survey data, consumer report data, manufacturing progress data, sales data, customer review data, consultant data, part defect-code data, fault data, or self-reported success data.

19. The system of claim 16, further comprising an image sensor in communication with the system, and wherein the system further comprises:

- means for receiving an image of a manufactured part from the image sensor;
- means for providing the image to a neural network trained to identify the manufactured part within the image; and
- means for receiving an indication from the neural network whether the manufactured part comprises a defect.

20. The system of claim 16, further comprising:

- in response to receiving the indication from the neural network that the manufactured part comprises a defect, means for classifying the defect based on analysis from the neural network;
- means for identifying which project is associated with the manufactured part; and
- means for adding a defect classification code to the metric data for the project associated with the manufactured part.

* * * * *